(12) United States Patent
Arai et al.

(10) Patent No.: US 9,683,326 B2
(45) Date of Patent: Jun. 20, 2017

(54) PREPREG AND CARBON FIBER REINFORCED COMPOSITE MATERIAL

(71) Applicant: TORAY INDUSTRIES, INC., Tokyo (JP)

(72) Inventors: Nobuyuki Arai, Iyo-gun (JP); Tomoko Ichikawa, Iyo-gun (JP); Hiroshi Taiko, Iyo-gun (JP); Makoto Endo, Iyo-gun (JP); Masanobu Kobayashi, Iyo-gun (JP); Jun Misumi, Iyo-gun (JP)

(73) Assignee: TORAY INDUSTRIES, INC., Tokyo (JP)

( * ) Notice: Subject to any disclaimer, the term of this patent is extended or adjusted under 35 U.S.C. 154(b) by 0 days.

(21) Appl. No.: 14/416,234

(22) PCT Filed: Jul. 16, 2013

(86) PCT No.: PCT/JP2013/069317
§ 371 (c)(1),
(2) Date: Jan. 21, 2015

(87) PCT Pub. No.: WO2014/017339
PCT Pub. Date: Jan. 30, 2014

(65) Prior Publication Data
US 2015/0184333 A1    Jul. 2, 2015

(30) Foreign Application Priority Data

Jul. 25, 2012 (JP) ................................. 2012-165148
Jan. 28, 2013 (JP) ................................. 2013-013586

(51) Int. Cl.
*D06M 15/55* (2006.01)
*C08J 5/24* (2006.01)
(Continued)

(52) U.S. Cl.
CPC ............. *D06M 15/55* (2013.01); *C08G 59/38* (2013.01); *C08J 5/06* (2013.01); *C08J 5/10* (2013.01);
(Continued)

(58) Field of Classification Search
CPC .. C08G 59/38; D06M 2101/40; D06M 15/55; C08L 63/00; C08J 2363/00; C08J 5/06; C08J 5/10; C08J 5/24; Y10T 428/31511
(Continued)

(56) References Cited

U.S. PATENT DOCUMENTS 4,420,512 A    12/1983  Ogawa et al.
5,028,478 A     7/1991  Odagiri et al.
(Continued)

FOREIGN PATENT DOCUMENTS

CN    1946780 A    4/2007
CN  101501114 A    8/2009
(Continued)

OTHER PUBLICATIONS

Korean Notice of Allowance, dated May 20, 2015, for Korean Application No. 10-2015-7001547.
(Continued)

*Primary Examiner* — Camie Thompson
(74) *Attorney, Agent, or Firm* — Birch, Stewart, Kolasch & Birch, LLP

(57) ABSTRACT

A prepreg is formed by impregnating sizing agent-coated carbon fibers coated with a sizing agent with a thermosetting resin composition. The sizing agent contains an aliphatic epoxy compound (A) and an aromatic compound (B) at least containing an aromatic epoxy compound (B1). The sizing agent-coated carbon fibers has an (a)/(b) ratio of 0.50 to 0.90 where (a) is a height (cps) of a component at a binding energy (284.6 eV) assigned to CHx, C—C, and C═C and (Continued)

(b) is a height (cps) of a component at a binding energy (286.1 eV) assigned to C—O in a $C_{1s}$ core spectrum of a surface of the sizing agent applied onto the carbon fibers analyzed by X-ray photoelectron spectroscopy using $AlK\alpha_{1,2}$ as an X-ray source at a photoelectron takeoff angle of 15°.

18 Claims, 2 Drawing Sheets

(51) Int. Cl.
*C08G 59/38* (2006.01)
*C08L 63/00* (2006.01)
*C08J 5/06* (2006.01)
*C08J 5/10* (2006.01)
*C08K 7/06* (2006.01)
*D06M 101/40* (2006.01)

(52) U.S. Cl.
CPC ............... *C08J 5/24* (2013.01); *C08K 7/06* (2013.01); *C08L 63/00* (2013.01); *C08J 2363/00* (2013.01); *D06M 2101/40* (2013.01); *Y10T 428/254* (2015.01); *Y10T 428/31511* (2015.04)

(58) Field of Classification Search
USPC .................................. 428/327, 413
See application file for complete search history.

(56) References Cited

U.S. PATENT DOCUMENTS

| | | | |
|---|---|---|---|
| 5,462,799 A | 10/1995 | Kobayashi et al. | |
| 5,587,240 A | 12/1996 | Kobayashi et al. | |
| 5,589,055 A | 12/1996 | Kobayashi et al. | |
| 5,691,055 A | 11/1997 | Kobayashi et al. | |
| 6,103,211 A | 8/2000 | Matsuhisa et al. | |
| 2004/0191511 A1* | 9/2004 | Sugiura | D06M 7/00 428/357 |
| 2008/0166511 A1 | 7/2008 | Honma et al. | |
| 2010/0178487 A1* | 7/2010 | Arai et al. | 428/300.1 |
| 2014/0329075 A1 | 11/2014 | Ichikawa et al. | |

FOREIGN PATENT DOCUMENTS

| | | | |
|---|---|---|---|
| CN | 104011288 A | 8/2014 | |
| EP | 2053078 A1 | 4/2009 | |
| JP | 58-041973 A | 3/1983 | |
| JP | 59-071479 A | 4/1984 | |
| JP | 2-307979 A | 12/1990 | |
| JP | 3-026750 A | 2/1991 | |
| JP | 6-344519 A | 12/1994 | |
| JP | 7-279040 A | 10/1995 | |
| JP | 8-034864 A | 2/1996 | |
| JP | 2002-173873 A | 6/2002 | |
| JP | 2002-309487 A | 10/2002 | |
| JP | 2005-179826 A | 7/2005 | |
| JP | 2005-213687 | * 8/2005 | |
| JP | 2005-213687 A | 8/2005 | |
| JP | 2005-256226 A | 9/2005 | |
| JP | 2008-280624 A | 11/2008 | |
| JP | 2009-74075 A | 4/2009 | |
| WO | WO 97/45576 A1 | 12/1997 | |
| WO | WO 03/010383 A1 | 2/2003 | |

OTHER PUBLICATIONS

Extended European Search Report for European Application No. 13822867.1, dated Apr. 24, 2015.
International Search Report issued in PCT/JP2013/069317, mailed on Oct. 29, 2013.
Written Opinion in PCT/JP2013/069317, mailed on Oct. 29, 2013.
Chinese Office Action and Search Report dated Aug. 17, 2015, for Chinese Application No. 201380038854.2.

* cited by examiner

PREPREG AND CARBON FIBER REINFORCED COMPOSITE MATERIAL

FIELD

The present invention relates to a prepreg that is excellent in impact resistance, electrical conductivity, and long-term storage stability, and to a carbon fiber reinforced composite material.

BACKGROUND

Carbon fiber reinforced composite materials are useful because of being excellent in strength, rigidity, electrical conductivity, and the like and are widely deployed in aircraft structural members, windmill blades, automobile outer panels, computer applications such as IC trays and casings (housings) of notebook computers, and the like, leading to yearly increase in demand.

Carbon fiber reinforced composite materials are in general heterogeneous materials formed by molding a prepreg having carbon fibers as reinforcing fibers and a matrix resin as essential components. Owing to this structure, there is a large difference between mechanical characteristics in the arrangement direction of the reinforcing fibers and mechanical characteristics in other directions. It is known, for example, that impact resistance represented by resistance to drop-weight impact is governed by interlayer delamination strength quantified by interlayer plate-end delamination strength or the like, and improvement in the strength of the reinforcing fibers alone does not lead to radical improvement. In particular, carbon fiber reinforced composite materials having a thermosetting resin as a matrix resin are of such a nature that they are liable to be broken by stress in directions other than the arrangement direction of the reinforcing fibers, reflecting low toughness of the matrix resin. In view of this, various techniques have been disclosed for the purpose of improving the mechanical characteristics of composite materials so that they can withstand the stress in directions other than the arrangement direction of the reinforcing fibers.

As one of among them, a prepreg is disclosed that includes a resin layer in which resin particles are dispersed in the surface area of the prepreg. For example, a technique is disclosed that provides a high-toughness carbon fiber reinforced composite material having favorable heat resistance using a prepreg that includes a resin layer in which particles formed of a thermoplastic resin such as nylon are dispersed in the surface area of the prepreg (see Patent Literature 1). Apart therefrom, a technique is disclosed that causes a carbon fiber reinforced composite material to exhibit high toughness through a combination of a matrix resin whose toughness is improved by the addition of a polysulfone oligomer and particles formed of a thermosetting resin (see Patent Literature 2). However, while these techniques provide carbon fiber reinforced composite materials with high levels of impact resistance, they produce a resin layer as an insulating layer in an interlayer. This structure causes a drawback that electrical conductivity in the thickness direction out of electrical conductivity as one of the features of carbon fiber reinforced composite materials remarkably decreases, and it is difficult to achieve both excellent impact resistance and electrical conductivity in carbon fiber reinforced composite materials.

As a method for improving interlayer electrical conductivity, there are a method in which metallic particles are formulated in a matrix resin of a carbon fiber reinforced composite material (see Patent Literature 3) and a method in which carbon particles are formulated in a matrix resin (see Patent Literature 4). However, these literatures make no reference to achieving both impact resistance and electrical conductivity at a high level.

For the purpose of improving the adhesiveness and bindability of carbon fibers, various sizing agents for carbon fibers have been disclosed. Examples of the disclosed sizing agents include a compound having a plurality of epoxy groups of an aliphatic type, an epoxy adduct of a polyalkylene glycol, diglycidyl ether of bisphenol A, a polyalkyleneoxide adduct of bisphenol A, and a polyalkyleneoxide adduct of bisphenol A with an epoxy group added. However, any sizing agent formed of one type of epoxy compound imparts insufficient adhesiveness and bindability to carbon fibers. A method using two or more types of epoxy compounds in combination according to required functions has been disclosed in recent years.

For example, a disclosed sizing agent includes two or more epoxy compounds each having a defined surface energy (see Patent Literatures 5 to 8). Patent Literature 5 discloses a combination of an aliphatic epoxy compound and an aromatic epoxy compound. Patent Literature 5 describes that a sizing agent present in the outer layer in a large amount has an effect of shielding another sizing agent present in the inner layer in a large amount from air, and this prevents the epoxy group form undergoing ring-opening by water in air. Patent Literature 5 also describes that the sizing agent preferably contains the aliphatic epoxy compound and the aromatic epoxy compound in a ratio of 10/90 to 40/60, and the aromatic epoxy compound is preferably contained in a larger amount.

Patent Literatures 7 and 8 disclose sizing agents containing two or more types of epoxy compounds having different surface energy. Patent Literatures 7 and 8, which have an object of improving adhesiveness with a matrix resin, do not specify the combined use of an aromatic epoxy compound and an aliphatic epoxy compound as a combination of two or more types of epoxy compounds and provide no general exemplification of aliphatic epoxy compounds selected from the viewpoint of adhesiveness.

Another disclosed sizing agent contains a bisphenol A epoxy compound and an aliphatic polyepoxy resin in a mass ratio of 50/50 to 90/10 (see Patent Literature 9). However, the sizing agent disclosed in Patent Literature 9 also contains the bisphenol A epoxy compound as an aromatic epoxy compound in a large amount.

A disclosed sizing agent specifying the combination of an aromatic epoxy compound and an aliphatic epoxy compound is a combination of a multifunctional aliphatic compound on the surface of carbon fiber bundles and an epoxy resin, a condensate of an alkylene oxide adduct with an unsaturated dibasic acid, and an alkylene oxide adduct of a phenol on the surface of the multifunctional aliphatic compound (see Patent Literature 10).

A disclosed combination of two or more epoxy compounds is a combination of an aliphatic epoxy compound and a bisphenol A epoxy compound as an aromatic epoxy compound. The aliphatic epoxy compound is a cyclic aliphatic epoxy compound and/or a long chain aliphatic epoxy compound (see Patent Literature 11).

A combination of epoxy compounds having different properties has also been disclosed. A disclosed combination contains two epoxy compounds that are liquid and solid at 25° C. (see Patent Literature 12). Furthermore, a combination of epoxy resins having different molecular weights and a combination of a monofunctional aliphatic epoxy compound and an epoxy resin have been developed (see Patent Literatures 13 and 14).

However, the sizing agents (for example, Patent Literatures 11 to 14) containing two or more components practically fail to achieve both the adhesion between carbon fibers and a matrix resin and the stability of a prepreg during long-term storage. The reason is considered as follows: The following three requirements are needed to be satisfied in order to simultaneously achieve the high adhesion and the suppression of the reduction in mechanical characteristics of a prepreg during long-term storage, but a conventional combination of any epoxy resins has failed to satisfy these requirements. Of the tree requirements, the first is that an epoxy component having high adhesion is present in the inner side (carbon fiber side) of a sizing layer, and the carbon fibers and the epoxy compound in the sizing interact strongly; the second is that the surface layer (matrix resin side) of the sizing layer has a function of suppressing the reaction between a matrix resin and the epoxy compound that is present in the inner layer and that has high adhesion to carbon fibers; and the third is that the surface layer (matrix resin side) of the sizing agent necessitates a chemical composition capable of strongly interacting with a matrix resin in order to improve the adhesion to the matrix resin.

For example, Patent Literature 5 discloses a sizing agent having an inclined structure for increasing the adhesion between carbon fibers and the sizing agent, but Patent Literature 5 and any other literatures (for example, Patent Literatures 6 to 9) have no idea that the sizing layer surface simultaneously suppresses the reaction between an epoxy compound having high adhesion to carbon fibers and a component in a matrix and achieves high adhesion to the matrix resin.

Patent Literature 10 discloses a sizing agent including an inner layer containing a multifunctional aliphatic compound and an outer layer containing an aromatic epoxy resin and an aromatic reaction product each having low reactivity. The sizing agent should prevent a prepreg stored for a long period of time from suffering change with time, but the surface layer of the sizing agent contains no multifunctional aliphatic compound having high adhesion, and this makes it difficult to achieve high adhesion to a matrix resin.

CITATION LIST

Patent Literature

Patent Literature 1: U.S. Pat. No. 5,028,478
Patent Literature 2: Japanese Patent Application Laid-open No. 3-26750
Patent Literature 3: Japanese Patent Application Laid-open No. 6-344519
Patent Literature 4: Japanese Patent Application Laid-open No. 8-34864
Patent Literature 5: Japanese Patent Application Laid-open No. 2005-179826
Patent Literature 6: Japanese Patent Application Laid-open No. 2005-256226
Patent Literature 7: International Publication WO 03/010383
Patent Literature 8: Japanese Patent Application Laid-open No. 2008-280624
Patent Literature 9: Japanese Patent Application Laid-open No. 2005-213687
Patent Literature 10: Japanese Patent Application Laid-open No. 2002-309487
Patent Literature 11: Japanese Patent Application Laid-open No. 02-307979
Patent Literature 12: Japanese Patent Application Laid-open No. 2002-173873
Patent Literature 13: Japanese Patent Application Laid-open No. 59-71479
Patent Literature 14: Japanese Patent Application Laid-open No. 58-41973

SUMMARY

Technical Problem

In view of the above-described disadvantages, it is an object of the present invention to provide a prepreg that is excellent in adhesiveness between carbon fibers and a matrix resin and long-term storage stability and achieves both excellent impact resistance and electrical conductivity in the thickness direction and a carbon fiber reinforced composite material.

Solution to Problem

To solve the above-described problem and achieve the object, a prepreg according to the present invention is formed by impregnating sizing agent-coated carbon fibers coated with a sizing agent with a thermosetting resin composition, wherein the sizing agent contains an aliphatic epoxy compound (A) and an aromatic compound (B) at least containing an aromatic epoxy compound (B1), the sizing agent-coated carbon fibers has an (a)/(b) ratio of 0.50 to 0.90 where (a) is a height (cps) of a component at a binding energy (284.6 eV) assigned to CHx, C—C, and C=C and (b) is a height (cps) of a component at a binding energy (286.1 eV) assigned to C—O in a $C_{1s}$ core spectrum of a surface of the sizing agent applied onto the carbon fibers analyzed by X-ray photoelectron spectroscopy using $AlK\alpha_{1,2}$ as an X-ray source at a photoelectron takeoff angle of 15°, the thermosetting resin composition contains a thermosetting resin (D), a latent curing agent (E), and at least one of the following [1] and [2]: [1] thermoplastic resin particles or fibers (F) and conductive particles or fibers (G); and [2] conductive particles or fibers (H) whose thermoplastic resin nucleus or core is covered with a conductive substance, when containing [1], the thermosetting resin composition contains the thermoplastic resin particles or fibers (F) and the conductive particles or fibers (G) in a mass ratio of 1:1 to 1,000, and the prepreg includes an interlayer formative layer containing (F) and (G) and/or (H) on a surface of a layer formed of the carbon fibers.

Moreover, in the above-described prepreg according to the present invention, the thermosetting resin composition contains [1] and, the prepreg includes an interlayer formative layer containing (F) and (G) on the surface of the layer formed of the carbon fibers.

Moreover, in the above-described prepreg according to the present invention, the thermosetting resin composition contains [2], and the prepreg includes an interlayer formative layer containing (H) on the surface of the layer formed of the carbon fibers.

Moreover, in the above-described prepreg according to the present invention, an average diameter of a particle diameter or a fiber diameter of the conductive particles or fibers (G) is equal to or larger than a particle diameter or a fiber diameter of the thermoplastic resin particles or fibers (F) and is 150 μm or less.

Moreover, in the above-described prepreg according to the present invention, the conductive particles or fibers (G) are at least one selected from the group consisting of: carbon particles; particles whose inorganic material nucleus is covered with a conductive substance; particles whose organic material nucleus is covered with a conductive substance; carbon fibers; fibers whose inorganic material core is covered with a conductive substance; and fibers whose organic material core is covered with a conductive substance.

Moreover, in the above-described prepreg according to the present invention, the volume resistivities of the conductive particles or fibers (G) and the conductive particles or fibers (H) whose thermoplastic resin nucleus or core is covered with a conductive substance are each 10 to $10^{-9}$ Ωcm.

Moreover, in the above-described prepreg according to the present invention, an average diameter of the thermoplastic resin particles or fibers (F), the conductive particles or fibers (G), and the conductive particles or fibers (H) whose thermoplastic resin nucleus or core is covered with a conductive substance is 5 to 150 μm, and the thermosetting resin composition contains second conductive particles (I) having an average diameter of 1 μm or less.

Moreover, in the above-described prepreg according to the present invention, 90 to 100% by mass of the thermoplastic resin particles or fibers (F), the conductive particles or fibers (G), and the conductive particles or fibers (H) whose thermoplastic resin nucleus or core is covered with a conductive substance are localized within a depth range of 20% from both sides in a thickness direction of the prepreg.

Moreover, in the above-described prepreg according to the present invention, 90 to 100% by mass of the second conductive particles (I) are localized inside carbon fibers positioned closest to both sides in the thickness direction of the prepreg.

Moreover, in the above-described prepreg according to the present invention, the total mass of the thermoplastic resin particles or fibers (F), the conductive particles or fibers (G), and the conductive particles or fibers (H) whose thermoplastic resin nucleus or core is covered with a conductive substance is 1 to 20% by mass relative to the prepreg.

Moreover, in the above-described prepreg according to the present invention, specific gravity of the conductive particles or fibers (G) and the conductive particles or fibers (H) whose thermoplastic resin nucleus or core is covered with a conductive substance is 0.8 to 3.2.

Moreover, in the above-described prepreg according to the present invention, the conductive particles or fibers (G) and the conductive particles or fibers (H) whose thermoplastic resin nucleus or core is covered with a conductive substance are subjected to surface treatment.

Moreover, in the above-described prepreg according to the present invention, the surface treatment is at least one type of treatment selected from the group consisting of coupling treatment, oxidization treatment, ozone treatment, plasma treatment, corona treatment, and blast treatment.

Moreover, in the above-described prepreg according to the present invention, the latent curing agent (E) is an aromatic amine curing agent (E1).

Moreover, in the above-described prepreg according to the present invention, the aromatic amine curing agent (E1) contains a diphenyl sulfone skeleton.

Moreover, in the above-described prepreg according to the present invention, the sizing agent and the aromatic amine curing agent (E1) are used in a combination to give an increase in glass transition point of 25° C. or less after the sizing agent and the aromatic amine curing agent (E1) are mixed in an amine equivalent/epoxy equivalent ratio of 0.9 and then are stored in an atmosphere at 25° C. and 60% RH for 20 days.

Moreover, in the above-described prepreg according to the present invention, the epoxy equivalent of the applied sizing agent is 350 to 550 g/eq.

Moreover, in the above-described prepreg according to the present invention, the sizing agent at least contains the aliphatic epoxy compound (A) in an amount of 35 to 65% by mass and the aromatic compound (B) in an amount of 35 to 60% by mass relative to a total amount of the sizing agent except a solvent.

Moreover, in the above-described prepreg according to the present invention, a mass ratio of the aliphatic epoxy compound (A) and the aromatic epoxy compound (B1) is 52/48 to 80/20.

Moreover, in the above-described prepreg according to the present invention, the aliphatic epoxy compound (A) is a polyether polyepoxy compound having two or more epoxy groups in a molecule and/or a polyol polyepoxy compound having two or more epoxy groups in a molecule.

Moreover, in the above-described prepreg according to the present invention, the aliphatic epoxy compound (A) is a glycidyl ether epoxy compound obtained by a reaction of epichlorohydrin with one or more compounds selected from the group consisting of ethylene glycol, diethylene glycol, triethylene glycol, tetraethylene glycol, polyethylene glycol, propylene glycol, dipropylene glycol, tripropylene glycol, tetrapropylene glycol, polypropylene glycol, trimethylene glycol, 1,2-butanediol, 1,3-butanediol, 1,4-butanediol, 2,3-butanediol, polybutylene glycol, 1,5-pentanediol, neopentyl glycol, 1,6-hexanediol, 1,4-cyclohexanedimethanol, glycerol, diglycerol, polyglycerol, trimethylolpropane, pentaerythritol, sorbitol, and arabitol.

Moreover, in the above-described prepreg according to the present invention, the aromatic epoxy compound (B1) is a bisphenol A epoxy compound or a bisphenol F epoxy compound.

Moreover, in the above-described prepreg according to the present invention, the sizing agent contains an ester compound (C) having no epoxy group in a molecule in an amount of 2 to 35% by mass relative to the total amount of the sizing agent except the solvent.

Moreover, in the above-described prepreg according to the present invention, relation (III) is satisfied with (I) and (II) obtained from (a) and (b):

$$0.50 \le (I) \le 0.90 \text{ and } 0.60 < (II)/(I) < 1.0 \quad \text{(III)}$$

where (I) is a value of (a)/(b) of surfaces of the sizing agent-coated carbon fibers before ultrasonication, (II) is the value of (a)/(b) of the surfaces of the sizing agent-coated carbon fibers in which an adhesiveness amount of the sizing agent is reduced to 0.09 to 0.20% by mass by ultrasonication on the sizing agent-coated carbon fibers in an acetone solvent, and in a $C_{1s}$ core spectrum of the sizing agent-coated carbon fibers analyzed by X-ray photoelectron spectroscopy using an X-ray at 400 eV at a photoelectron takeoff angle of 55°, (a) is the height (cps) of a component at a binding energy (284.6 eV) assigned to CHx, C—C, and C═C, and (b) is the height (cps) of a component at a binding energy (286.1 eV) assigned to C—O.

Moreover, in the above-described prepreg according to the present invention, the sizing agent is a mixture of a water emulsion liquid containing at least the aromatic epoxy compound (B1) and a composition containing at least the aliphatic epoxy compound (A).

Moreover, a carbon fiber reinforced composite material according to the present invention is formed by molding one of the above-described prepregs.

Advantageous Effects of Invention

The present invention can provide a carbon fiber reinforced composite material that is excellent in the adhesiveness between the carbon fibers and the matrix resin, undergoes a small change with time during long-term storage, and has both excellent impact resistance and electrical conductivity in the thickness direction.

DESCRIPTION OF EMBODIMENTS

Figure 1:
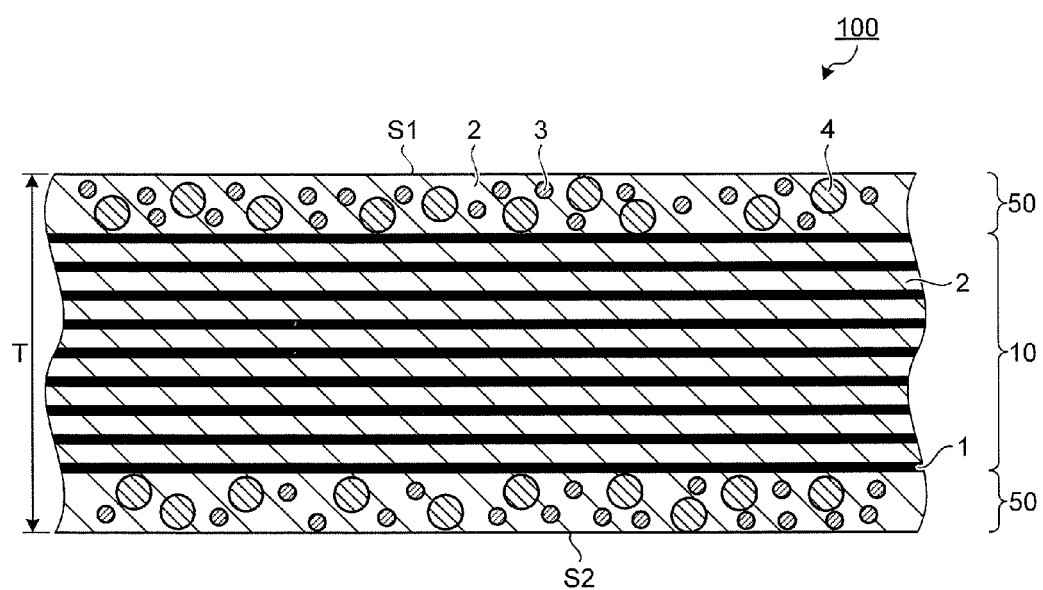
FIG. 1 is an example of the sectional view of a prepreg of the present invention.

Embodiments for achieving a prepreg and a carbon fiber reinforced composite material of the present invention will now be described in more detail.

The present invention provides a prepreg formed by impregnating sizing agent-coated carbon fibers coated with a sizing agent with a thermosetting resin composition. The sizing agent contains an aliphatic epoxy compound (A) and an aromatic compound (B) at least containing an aromatic epoxy compound (B1). The sizing agent-coated carbon fibers have an (a)/(b) ratio of 0.50 to 0.90 where (a) is a height (cps) of a component at a binding energy (284.6 eV) assigned to CHx, C—C, and C=O and (b) is a height (cps) of a component at a binding energy (286.1 eV) assigned to C—O in a $C_{1s}$ core spectrum of a surface of the sizing agent applied onto the carbon fibers analyzed by X-ray photoelectron spectroscopy using $AlK\alpha_{1,2}$ as an X-ray source at a photoelectron takeoff angle of 15°. The thermosetting resin composition contains a thermosetting resin (D), a latent curing agent (E), and at least one of the following [1] and [2]: [1] thermoplastic resin particles or fibers (F) and conductive particles or fibers (G); and [2] conductive particles or fibers (H) whose thermoplastic resin nucleus or core is covered with a conductive substance. When containing [1], the thermosetting resin composition contains the thermoplastic resin particles or fibers (F) and the conductive particles or fibers (G) in a mass ratio of 1:1 to 1,000 and has an interlayer formative layer containing (F) and (G) and/or (H) on a surface of a layer formed of the carbon fibers.

First, the sizing agent used in the prepreg of the present invention will be described. The sizing agent of the present invention includes an aliphatic epoxy compound (A) and an aromatic compound (B) containing at least an aromatic epoxy compound (B1).

On the basis of findings by the inventors of the present invention, a sizing agent within the range has excellent interfacial adhesion between carbon fibers and a matrix, and the sizing agent-coated carbon fibers are used to prepare a prepreg, which undergoes a small change with time during storage. The sizing agent is thus preferably used for carbon fibers for a composite material.

When the sizing agent of the present invention is applied to carbon fibers, the inner side (carbon fiber side) of the sizing layer contains the aliphatic epoxy compound (A) in a larger amount, and thus the carbon fibers and the epoxy compound (A) strongly interact to increase the adhesion. The surface layer (matrix resin side) of the sizing layer contains the aromatic compound (B) containing the aromatic epoxy compound (B1) in a larger amount, and this prevents the epoxy compound (A) in the inner layer from reacting with a matrix resin. In addition, the surface layer (matrix resin side) of the sizing agent contains the aromatic epoxy compound (B1) containing a certain number of epoxy groups and the aliphatic epoxy compound (A) containing a certain number of epoxy groups in a certain ratio as a chemical composition capable of achieving strong interaction with the matrix resin, and this also improves the adhesion to the matrix resin.

A sizing agent containing the aromatic epoxy compound (B1) alone but containing no aliphatic epoxy compound (A) advantageously has low reactivity with a matrix resin, and a prepreg to be prepared undergoes a small change in mechanical characteristics during long-term storage. Such a sizing agent also has an advantage of capable of forming a rigid interface layer. However, the aromatic epoxy compound (B1), which is a rigid compound, is ascertained to be slightly inferior in the adhesion between carbon fibers and a matrix resin to the aliphatic epoxy compound (A).

When coated with a sizing agent containing the aliphatic epoxy compound (A) alone, the carbon fibers are ascertained to have high adhesion to a matrix resin. Although not certain, the mechanism is supposed as follows: the aliphatic epoxy compound (A) has a flexible skeleton and a structure having a high degree of freedom; and thus the aliphatic epoxy compound can form a strong interaction with functional groups such as a carboxy group and a hydroxy group on the surface of carbon fibers. However, the aliphatic epoxy compound (A) exhibits high adhesion due to the interaction with the carbon fiber surface but has high reactivity with a compound having a functional group, such as a curing agent in the matrix resin. If the aliphatic epoxy compound (A) is stored in a prepreg state for a long period of time, it is ascertained that the interaction between the matrix resin and the sizing agent changes the structure of an interface layer, and this unfortunately reduces mechanical characteristics of a carbon fiber reinforced composite material obtained from the prepreg.

In the present invention, when the aliphatic epoxy compound (A) is mixed with the aromatic compound (B), the following phenomenon occurs: the aliphatic epoxy compound (A) having higher polarity is likely to be present in the carbon fiber side in a larger amount, and the aromatic compound (B) having lower polarity is likely to be present in a larger amount in the outermost layer of the sizing layer opposite to the carbon fibers. As a result of this inclined structure of the sizing layer, the aliphatic epoxy compound (A) present near the carbon fibers has a strong interaction with the carbon fibers and thus can increase the adhesion between the carbon fibers and a matrix resin. In addition, when the sizing agent-coated carbon fibers are processed into a prepreg, the aromatic compound (B) present in the outer layer in a large amount plays a roll of blocking the aliphatic epoxy compound (A) from a matrix resin. This prevents the aliphatic epoxy compound (A) from reacting with a component having high reactivity in the matrix resin, thus achieving stability during long-term storage. If the aliphatic epoxy compound (A) is almost completely covered with the aromatic compound (B), the interaction between the sizing agent and a matrix resin is reduced to lower the adhesion, and thus the ratio of the aliphatic epoxy compound (A) and the aromatic compound (B) present on the surface of the sizing agent is important.

The sizing agent of the present invention preferably contains the aliphatic epoxy compound (A) in an amount of 35 to 65% by mass and the aromatic compound (B) in an amount of 35 to 60% by mass relative to a total amount of the sizing agent except solvents. If containing 35% by mass or more of the aliphatic epoxy compound (A) relative to the total amount of the sizing agent except solvents, the adhesiveness between the carbon fibers and a matrix resin is improved. If containing 65% by mass or less of the aliphatic epoxy compound (A), even when a prepreg is stored in a long period of time, a carbon fiber reinforced composite material subsequently produced obtains good mechanical characteristics. The amount of the aliphatic epoxy compound (A) is more preferably 38% by mass or more and even more preferably 40% by mass or more. The amount of the aliphatic epoxy compound (A) is more preferably 60% by mass or less and even more preferably 55% by mass or less.

If the sizing agent of the present invention contains 35% by mass or more of the aromatic compound (B) relative to the total amount of the sizing agent except solvents, the outer layer of the sizing agent can maintain the aromatic compound (B) at a high composition, and this can suppress the deterioration of mechanical characteristics of a prepreg produced by using the sizing agent-coated carbon fibers during long-term storage due to the reaction of the aliphatic epoxy compound (A) having high reactivity with a reactive compound in the matrix resin. If containing 60% by mass or less of the aromatic compound (B), the sizing agent exhibits an inclined structure in the sizing agent and thus can maintain the adhesiveness between the carbon fibers and the matrix resin. The amount of the aromatic compound (B) is more preferably 37% by mass or more and even more preferably 39% by mass or more. The amount of the aromatic compound (B) is more preferably 55% by mass or less and even more preferably 45% by mass or less.

The sizing agent in the present invention includes, as epoxy components, an aromatic epoxy compound (B1) as the aromatic compound (B) in addition to the aliphatic epoxy compound (A). The mass ratio (A)/(B1) of the aliphatic epoxy compound (A) and the aromatic epoxy compound (B1) is preferably 52/48 to 80/20. A sizing agent having a ratio (A)/(B1) of 52/48 or more increases the ratio of the aliphatic epoxy compound (A) present on the surface of carbon fibers, and this improves the adhesion between the carbon fibers and a matrix resin. As a result, a carbon fiber reinforced composite material to be produced obtains higher mechanical characteristics such as tensile strength. A sizing agent having a ratio (A)/(B1) of 80/20 or less reduces the amount of the aliphatic epoxy compound (B) having high reactivity present on the surface of carbon fibers, and this can suppress the reactivity with a matrix resin. Such a ratio is thus preferred. The mass ratio (A)/(B1) is more preferably 55/45 or more and even more preferably 60/40 or more. The mass ratio (A)/(B1) is more preferably 75/35 or less and even more preferably 73/37 or less.

The aliphatic epoxy compound (A) in the present invention is an epoxy compound containing no aromatic ring. The epoxy compound, which has a flexible skeleton with a high degree of freedom, can have strong interaction with carbon fibers. As a result, the epoxy compound can improve the adhesion between carbon fibers coated with the sizing agent and a matrix resin.

In the present invention, the aliphatic epoxy compound (A) has one or more epoxy groups in the molecule. This allows a strong binding to be formed between carbon fibers and the epoxy group in the sizing agent. The number of the epoxy groups in the molecule is preferably two or more and more preferably three or more. In the aliphatic epoxy compound (A) that is an epoxy compound having two or more epoxy groups in the molecule, even when one epoxy group forms a covalent bond with an oxygen-containing functional group on the surface of carbon fibers, remaining epoxy groups can form a covalent bond or a hydrogen bond with a matrix resin, and this can further improve the adhesion between the carbon fibers and the matrix resin. Although the upper limit of the number of epoxy groups is not particular limited, a compound having ten epoxy groups is sufficient for the adhesion.

In the present invention, the aliphatic epoxy compound (A) is preferably an epoxy compound having two or more types of functional groups, where the number of the functional groups is three or more. The aliphatic epoxy compound (A) is more preferably an epoxy compound having two or more types of functional groups, where the number of the functional groups is four or more. The functional group contained in the epoxy compound is, in addition to the epoxy group, preferably selected from a hydroxy group, an amido group, an imido group, a urethane group, a urea group, a sulfonyl group, or a sulfo group. In the aliphatic epoxy compound (A) that is an epoxy compound having three or more epoxy groups or other functional groups in the molecule, even when one epoxy group forms a covalent bond with an oxygen-containing functional group on the surface of carbon fibers, two or more remaining epoxy groups or other functional groups can form a covalent bond or a hydrogen bond with a matrix resin. This further improves the adhesion between the carbon fibers and the matrix resin. Although the upper limit of the number of functional groups including epoxy groups is not particular limited, a compound having ten functional groups is sufficient for the adhesion.

In the present invention, the aliphatic epoxy compound (A) preferably has an epoxy equivalent of less than 360 g/eq., more preferably less than 270 g/eq., and even more preferably less than 180 g/eq. An aliphatic epoxy compound (A) having an epoxy equivalent of less than 360 g/eq. forms an interaction with carbon fibers at high-density and further improves the adhesion between the carbon fibers and a matrix resin. Although the lower limit of the epoxy equivalent is not particularly limited, an aliphatic epoxy compound having an epoxy equivalent of 90 g/eq. or more is sufficient for the adhesion.

In the present invention, specific examples of the aliphatic epoxy compound (A) include glycidyl ether epoxy compounds derived from polyols, glycidylamine epoxy compounds derived from amines having a plurality of active hydrogens, glycidyl ester epoxy compounds derived from polycarboxylic acids, and epoxy compounds obtained by oxidation of compounds having a plurality of double bonds in the molecule.

Examples of the glycidyl ether epoxy compound include glycidyl ether epoxy compounds obtained by reaction of polyols with epichlorohydrin. The glycidyl ether epoxy compound is exemplified by a glycidyl ether epoxy compound obtained by reaction of epichlorohydrin with a polyol selected from ethylene glycol, diethylene glycol, triethylene glycol, tetraethylene glycol, polyethylene glycol, propylene glycol, dipropylene glycol, tripropylene glycol, tetrapropylene glycol, polypropylene glycol, trimethylene glycol, 1,2-butanediol, 1,3-butanediol, 1,4-butanediol, 2,3-butanediol, polybutylene glycol, 1,5-pentanediol, neopentyl glycol, 1,6-hexanediol, 1,4-cyclohexanedimethanol, hydrogenated bisphenol A, hydrogenated bisphenol F, glycerol, diglycerol, polyglycerol, trimethylolpropane, pentaerythritol, sorbitol, and arabitol. The glycidyl ether epoxy compound is also exemplified by glycidyl ether epoxy compounds having a dicyclopentadiene skeleton.

Examples of the glycidylamine epoxy compound include 1,3-bis(aminomethyl)cyclohexane.

Examples of the glycidyl ester epoxy compound include glycidyl ester epoxy compounds obtained by reaction of dimer acids with epichlorohydrin.

Examples of the epoxy compound obtained by oxidation of a compound having a plurality of double bonds in the molecule include epoxy compounds having an epoxycyclohexane ring in the molecule. The epoxy compound is specifically exemplified by epoxidized soybean oil.

In addition to these epoxy compounds, the aliphatic epoxy compound (A) used in the present invention is exemplified by epoxy compounds such as triglycidyl isocyanurate.

The aliphatic epoxy compound (A) of the present invention preferably has one or more epoxy groups and at least one or more functional groups selected from a hydroxy group, an amido group, an imido group, a urethane group, a urea group, a sulfonyl group, a carboxy group, an ester group, and a sulfo group. Specific examples of the functional group of the aliphatic epoxy compound (A) include compounds having an epoxy group and a hydroxy group, compounds having an epoxy group and an amido group, compounds having an epoxy group and an imido group, compounds having an epoxy group and a urethane group, compounds having an epoxy group and a urea group, compounds having an epoxy group and a sulfonyl group, and compounds having an epoxy group and a sulfo group.

Examples of the aliphatic epoxy compound (A) having a hydroxy group in addition to an epoxy group include sorbitol polyglycidyl ethers and glycerol polyglycidyl ethers and specifically include Denacol (registered trademark) EX-611, EX-612, EX-614, EX-614B, EX-622, EX-512, EX-521, EX-421, EX-313, EX-314, and EX-321 (manufactured by Nagase ChemteX Corporation).

Examples of the aliphatic epoxy compound (A) having an amido group in addition to an epoxy group include amide-modified epoxy compounds. The amide-modified epoxy compound can be obtained by reaction of a carboxy group of an aliphatic dicarboxylic acid amide with an epoxy group of an epoxy compound having two or more epoxy groups.

Examples of the aliphatic epoxy compound (A) having an urethane group in addition to an epoxy group include urethane-modified epoxy compounds and specifically include Adeka Resin (registered trademark) EPU-78-135, EPU-6, EPU-11, EPU-15, EPU-16A, EPU-16N, EPU-17T-6, EPU-1348, and EPU-1395 (manufactured by ADEKA). In addition, the compound can be prepared by reacting the terminal hydroxy group of a polyethylene oxide monoalkyl ether with a polyvalent isocyanate in an amount equivalent to that of the hydroxy group and then reacting the isocyanate residue of the obtained reaction product with a hydroxy group of a polyvalent epoxy compound. Examples of the polyvalent isocyanate used here include hexamethylene diisocyanate, isophorone diisocyanate, and norbornane diisocyanate.

Examples of the aliphatic epoxy compound (A) having a urea group in addition to an epoxy group include urea-modified epoxy compounds. The urea-modified epoxy compound can be prepared by reacting a carboxy group of an aliphatic dicarboxylic acid urea with an epoxy group of an epoxy compound having two or more epoxy groups.

Among the compounds described above, from the viewpoint of high adhesion, the aliphatic epoxy compound (A) used in the present invention is more preferably a glycidyl ether epoxy compound obtained by reaction of epichlorohydrin with a compound selected from ethylene glycol, diethylene glycol, triethylene glycol, tetraethylene glycol, polyethylene glycol, propylene glycol, dipropylene glycol, tripropylene glycol, tetrapropylene glycol, polypropylene glycol, trimethylene glycol, 1,2-butanediol, 1,3-butanediol, 1,4-butanediol, 2,3-butanediol, polybutylene glycol, 1,5-pentanediol, neopentyl glycol, 1,6-hexanediol, glycerol, diglycerol, polyglycerol, trimethylolpropane, pentaerythritol, sorbitol, and arabitol.

Among them, the aliphatic epoxy compound (A) in the present invention is preferably a polyether polyepoxy compound and/or a polyol polyepoxy compound having two or more epoxy groups in the molecule from the viewpoint of high adhesion.

In the present invention, the aliphatic epoxy compound (A) is more preferably polyglycerol polyglycidyl ether.

In the present invention, the aromatic compound (B) has one or more aromatic rings in the molecule. The aromatic ring may be an aromatic hydrocarbon ring containing carbons alone or may be a heteroaromatic ring containing a hetero atom including nitrogen and oxygen, such as furan, thiophene, pyrrole, and imidazole. The aromatic ring may also be polycyclic aromatic rings such as naphthalene and anthracene. In a carbon fiber reinforced composite material including carbon fibers coated with a sizing agent and a matrix resin, what is called an interface layer near the carbon fibers is affected by the carbon fibers or the sizing agent and thus may have different characteristics from those of the matrix resin. When the sizing agent contains the aromatic compound (B) having one or more aromatic rings, a rigid interface layer is formed to improve the stress transmission capacity between the carbon fibers and the matrix resin, and this improves mechanical characteristics such as 0° tensile strength of a fiber-reinforced composite material. Due to the hydrophobicity of the aromatic ring, the aromatic compound (B) has a lower interaction with carbon fibers than that of the aliphatic epoxy compound (A). As a result of the interaction with carbon fibers, the carbon fiber side contains the aliphatic epoxy compound (A) in a larger amount, and the outer layer of the sizing layer contains the aromatic compound (B) in a larger amount. This is preferred because the aromatic compound (B) prevents the aliphatic epoxy compound (A) from reacting with a matrix resin, and this can suppress a change during long-term storage of a prepreg produced by using carbon fibers coated with the sizing agent of the present invention. By selecting an aromatic compound (B) having two or more aromatic rings, long-term stability of a prepreg to be produced can be further improved. Examples of the upper limit of the number of aromatic rings include, but are not limited to, ten, which is sufficient for mechanical characteristics and suppression of the reaction with a matrix resin.

In the present invention, the aromatic compound (B) may have one or more types of functional groups in the molecule. A single type of aromatic compound (B) may be used, or a plurality of compounds may be used in combination. The aromatic compound (B) at least contains an aromatic epoxy compound (B1) having one or more epoxy groups and one or more aromatic rings in the molecule. The functional group except the epoxy group is preferably selected from a hydroxy group, an amido group, an imido group, a urethane group, a urea group, a sulfonyl group, a carboxy group, an ester group, and a sulfo group, and two or more types of functional groups may be contained in one molecule. The aromatic compound (B) preferably contains, in addition to the aromatic epoxy compound (B1), an aromatic ester compound and an aromatic urethane compound because such a compound is stable and improves high-order processability.

In the present invention, the aromatic epoxy compound (B1) preferably has two or more epoxy groups and more preferably three or more epoxy groups. The aromatic epoxy compound (B1) preferably has ten or less epoxy groups.

In the present invention, the aromatic epoxy compound (B1) is preferably an epoxy compound having two or more types of functional groups, where the number of the functional groups is three or more. The aromatic epoxy compound (B1) is more preferably an epoxy compound having two or more types of functional groups, where the number of the functional groups is four or more. The functional group of the aromatic epoxy compound (B1) is preferably, in addition to the epoxy group, a functional group selected from a hydroxy group, an amido group, an imido group, a urethane group, a urea group, a sulfonyl group, and a sulfo group. In the aromatic epoxy compound (B1) that is an epoxy compound having three or more epoxy groups or having an epoxy group and two or more other functional groups in the molecule, even when one epoxy group forms a covalent bond with an oxygen-containing functional group on the surface of carbon fibers, two or more remaining epoxy groups or other functional groups can form a covalent bond or a hydrogen bond with a matrix resin. This further improves the adhesion between the carbon fibers and the matrix resin. Although the upper limit of the number of functional groups including epoxy groups is not particular limited, a compound having ten functional groups is sufficient for the adhesion.

In the present invention, the aromatic epoxy compound (B1) preferably has an epoxy equivalent of less than 360 g/eq., more preferably less than 270 g/eq., and even more preferably less than 180 g/eq. An aromatic epoxy compound (B1) having an epoxy equivalent of less than 360 g/eq. forms a covalent bond at high density and further improves the adhesion between carbon fibers and a matrix resin. Although the lower limit of the epoxy equivalent is not particularly limited, an aromatic epoxy compound having an epoxy equivalent of 90 g/eq. or more is sufficient for the adhesion.

In the present invention, specific examples of the aromatic epoxy compound (B1) include glycidyl ether epoxy compounds derived from aromatic polyols, glycidylamine epoxy compounds derived from aromatic amines having a plurality of active hydrogens, glycidyl ester epoxy compounds derived from aromatic polycarboxylic acids, and epoxy compounds obtained by oxidation of aromatic compounds having a plurality of double bonds in the molecule.

The glycidyl ether epoxy compound is exemplified by a glycidyl ether epoxy compound obtained by reaction of epichlorohydrin with a compound selected from bisphenol A, bisphenol F, bisphenol AD, bisphenol S, tetrabromobisphenol A, phenol novolac, cresol novolac, hydroquinone, resorcinol, 4,4'-dihydroxy-3,3',5,5'-tetramethylbiphenyl, 1,6-dihydroxynaphthalene, 9,9-bis(4-hydroxyphenyl)fluorene, tris(p-hydroxyphenyl)methane, and tetrakis(p-hydroxyphenyl)ethane. The glycidyl ether epoxy compound is also exemplified by a glycidyl ether epoxy compound having a biphenylaralkyl skeleton.

Examples of the glycidylamine epoxy compound include N,N-diglycidylaniline, N,N-diglycidyl-o-toluidine, and glycidyl ether epoxy compounds obtained by reaction of epichlorohydrin with a compound selected from m-xylenediamine, m-phenylenediamine, 4,4'-diaminodiphenylmethane, and 9,9-bis(4-aminophenyl)fluorene.

The glycidylamine epoxy compound is also exemplified by an epoxy compound obtained by reaction of epichlorohydrin with both a hydroxy group and an amino group of an aminophenol such as m-aminophenol, p-aminophenol, and 4-amino-3-methylphenol.

Examples of the glycidyl ester epoxy compound include glycidyl ester epoxy compounds obtained by reaction of epichlorohydrin with phthalic acid, terephthalic acid, and hexahydrophthalic acid.

Examples of the aromatic epoxy compound (B1) used in the present invention include, in addition to these epoxy compounds, epoxy compounds synthesized from the epoxy compound exemplified above as a raw material, and the epoxy compound is exemplified by an epoxy compound synthesized by an oxazolidone ring formation reaction of bisphenol A diglycidyl ether and tolylene diisocyanate.

In the present invention, the aromatic epoxy compound (B1) preferably has, in addition to one or more epoxy groups, at least one or more functional groups selected from a hydroxy group, an amido group, an imido group, a urethane group, a urea group, a sulfonyl group, a carboxy group, an ester group, and a sulfo group. Examples of the compound include compounds having an epoxy group and a hydroxy group, compounds having an epoxy group and an amido group, compounds having an epoxy group and an imido group, compounds having an epoxy group and a urethane group, compounds having an epoxy group and a urea group, compounds having an epoxy group and a sulfonyl group, and compounds having an epoxy group and a sulfo group.

Examples of the aromatic epoxy compound (B1) having an amido group in addition to an epoxy group include glycidylbenzamide and amide-modified epoxy compounds. The amide-modified epoxy compound can be obtained by reaction of a carboxy group of a dicarboxylic amide containing an aromatic ring with an epoxy group of an epoxy compound having two or more epoxy groups.

Examples of the aromatic epoxy compound (B1) having an imido group in addition to an epoxy group include glycidylphthalimide. Specific examples of the compound include Denacol (registered trademark) EX-731 (manufactured by Nagase ChemteX Corporation).

The aromatic epoxy compound (B1) having a urethane group in addition to an epoxy group can be prepared by reacting the terminal hydroxy group of a polyethylene oxide monoalkyl ether with a polyvalent isocyanate having an aromatic ring in an amount equivalent to that of the hydroxy group and then reacting the isocyanate residue of the obtained reaction product with a hydroxy group of a polyvalent epoxy compound. Examples of the polyvalent isocyanate used here include 2,4-tolylene diisocyanate, m-phenylene diisocyanate, p-phenylene diisocyanate, diphenylmethane diisocyanate, triphenylmethane triisocyanate, and biphenyl-2,4,4'-triisocyanate.

Examples of the aromatic epoxy compound (B1) having a urea group in addition to an epoxy group include urea-modified epoxy compounds. The urea-modified epoxy compound can be prepared by reacting a carboxy group of a dicarboxylic acid urea with an epoxy group of an aromatic ring-containing epoxy compound having two or more epoxy groups.

Examples of the aromatic epoxy compound (B1) having a sulfonyl group in addition to an epoxy group include bisphenol S epoxy.

Examples of the aromatic epoxy compound (B1) having a sulfo group in addition to an epoxy group include glycidyl p-toluenesulfonate and glycidyl 3-nitrobenzenesulfonate.

In the present invention, the aromatic epoxy compound (B1) is preferably any of a phenol novolac epoxy compound, a cresol novolac epoxy compound, and tetraglycidyldiaminodiphenylmethane. These epoxy compounds have a large number of epoxy groups, a small epoxy equivalent, and two or more aromatic rings, thus improve the adhesion between carbon fibers and a matrix resin, and also improve the mechanical characteristics such as 0° tensile strength of a carbon fiber reinforced composite material. The aromatic epoxy compound (B1) is more preferably a phenol novolac epoxy compound and a cresol novolac epoxy compound.

In the present invention, the aromatic epoxy compound (B1) is preferably a phenol novolac epoxy compound, a cresol novolac epoxy compound, tetraglycidyldiaminodiphenylmethane, a bisphenol A epoxy compound, or a bisphenol F epoxy compound from the viewpoint of the stability of a prepreg during long-term storage and adhesiveness between carbon fibers and a matrix resin, and is more preferably a bisphenol A epoxy compound or a bisphenol F epoxy compound.

The sizing agent used in the present invention may further include one or more components in addition to the aliphatic epoxy compound (A) and the aromatic epoxy compound (B1) as the aromatic compound (B). If including an adhesion promoting component that improves the adhesion between carbon fibers and the sizing agent or including a material that imparts bindability or flexibility to sizing agent-coated carbon fibers, the sizing agent can increase handleability, abrasion resistance, and fuzz resistance and can improve impregnation properties of a matrix resin. In the present invention, in order to improve the long-term storage stability of a prepreg, the sizing agent may contain additional compounds except the compounds (A) and (B1). The sizing agent may contain auxiliary components such as a dispersant and a surfactant in order to stabilize the sizing agent during long-term storage.

The sizing agent used in the present invention may include, in addition to the aliphatic epoxy compound (A) and the aromatic epoxy compound (B1), an ester compound (C) having no epoxy group in the molecule. The sizing agent of the present invention can contain the ester compound (C) in an amount of 2 to 35% by mass relative to the total amount of the sizing agent except solvents. The amount is more preferably 15 to 30% by mass. If including the ester compound (C), the sizing agent can improve the bindability and the handling properties and can suppress the deterioration of mechanical characteristics of a prepreg during long-term storage due to a reaction of a matrix resin with the sizing agent.

The ester compound (C) may be an aliphatic ester compound having no aromatic ring or may be an aromatic ester compound having one or more aromatic rings in the molecule. When an aromatic ester compound (C1) is used as the ester compound (C), the aromatic ester compound (C1) is included in both the ester compound (C) having no epoxy compound in the molecule and the aromatic compound (B) in the present invention. In such a case, the aromatic compound (B) is not composed of the aromatic ester compound (C1) alone, but the aromatic compound (B) includes the aromatic epoxy compound (B1) and the aromatic ester compound (C1). When the aromatic ester compound (C1) is used as the ester compound (C), the sizing agent-coated carbon fibers obtain higher handling properties, and the aromatic ester compound (C1), which has a small interaction with carbon fibers, is present in the outer layer of a matrix resin, and this improves the suppressive effect of deterioration of mechanical characteristics of a prepreg during long-term storage. The aromatic ester compound (C1) may have, in addition to the ester group, any functional groups except the epoxy group, such as a hydroxy group, an amido group, an imido group, a urethane group, a urea group, a sulfonyl group, a carboxy group, and a sulfo group. Specifically, the aromatic ester compound (C1) preferably used is an ester compound that is a condensate of an unsaturated dibasic acid and an alkylene oxide adduct of a bisphenol. The unsaturated dibasic acid includes lower alkyl esters of acid anhydrides, and fumaric acid, maleic acid, citraconic acid, and itaconic acid are preferably used, for example. Preferably used alkylene oxide adducts of bisphenols are an ethylene oxide adduct of bisphenol, a propylene oxide adduct of bisphenol, and a butylene oxide adduct of bisphenol, for example. Among the condensates, condensates of fumaric acid or maleic acid with an ethylene oxide adduct or/and a propylene oxide adduct of bisphenol A are preferably used.

The addition method of an alkylene oxide to a bisphenol is not limited, and a known method can be employed. The unsaturated dibasic acid may partly contain a saturated dibasic acid or a small amount of a monobasic acid, as necessary, as long as adhesiveness and other characteristics are not impaired. The alkylene oxide adduct of a bisphenol may contain, for example, a common glycol, a common polyether glycol, a small amount of a polyhydric alcohol, and a small amount of a monovalent alcohol as long as adhesiveness and other characteristics are not impaired. The alkylene oxide adduct of a bisphenol with the unsaturated dibasic acid may be condensed by a known method.

In order to increase the adhesion between carbon fibers and an epoxy compound in the sizing agent, the sizing agent of the present invention can contain at least one compound selected from tertiary amine compounds and/or tertiary amine salts, quaternary ammonium salts having a cation site, and quaternary phosphonium salts and/or phosphine compounds as a component accelerating the adhesion. The sizing agent of the present invention preferably contains the compound in an amount of 0.1 to 25% by mass relative to the total amount of the sizing agent except solvents. The amount is more preferably 2 to 8% by mass.

When the sizing agent containing the aliphatic epoxy compound (A) and the aromatic epoxy compound (B1) and further containing at least one compound selected from tertiary amine compounds and/or tertiary amine salts, quaternary ammonium salts having a cation site, and quaternary phosphonium salts and/or phosphine compounds as the adhesion promoting component is applied to carbon fibers and subjected to heat treatment under particular conditions, the adhesion to the carbon fibers is further improved. Although not certain, the mechanism is supposed as follows: First, the compound reacts with an oxygen-containing functional group such as a carboxy group and a hydroxy group of carbon fibers used in the present invention and abstracts a hydrogen ion contained in the functional group to form an anion; and then the anionic functional group undergoes a nucleophilic reaction with an epoxy group contained in the aliphatic epoxy compound (A) or the aromatic epoxy compound (B1). This is supposed to generate a strong binding between the carbon fibers used in the present invention and the epoxy group in the sizing agent, thus improving the adhesion.

Specific examples of the adhesion promoting component preferably include N-benzylimidazole, 1,8-diazabicyclo[5,4,0]-7-undecene (DBU) and salts thereof, and 1,5-diazabicyclo[4,3,0]-5-nonene (DBN) and salts thereof. In particular, 1,8-diazabicyclo[5,4,0]-7-undecene (DBU) and salts thereof and 1,5-diazabicyclo[4,3,0]-5-nonene (DBN) and salts thereof are preferred.

Specific examples of the DBU salt include a phenolate of DBU (U-CAT SA1, manufactured by San-Apro Ltd.), an octanoate of DBU (U-CAT SA102, manufactured by San-Apro Ltd.), a p-toluenesulfonate of DBU (U-CAT SA506, manufactured by San-Apro Ltd.), a formate of DBU (U-CAT SA603, manufactured by San-Apro Ltd.), an orthophthalate of DBU (U-CAT SA810), and a phenol novolac resin salt of DBU (U-CAT SA810, SA831, SA841, SA851, and 881, manufactured by San-Apro Ltd.).

In the present invention, the adhesion promoting component to be added to the sizing agent is preferably tributylamine, N,N-dimethylbenzylamine, diisopropylethylamine, triisopropylamine, dibutylethanolamine, diethylethanolamine, triisopropanolamine, triethanolamine, and N,N-diisopropylethylamine and particularly preferably triisopropylamine, dibutylethanolamine, diethylethanolamine, triisopropanolamine, and diisopropylethylamine.

In addition to the compounds above, examples of the additive such as a surfactant include nonionic surfactants including polyalkylene oxides such as polyethylene oxide and polypropylene oxide; adducts of higher alcohols, polyhydric alcohols, alkylphenols, styrenated phenols, and other adduct compounds with polyalkylene oxides such as polyethylene oxide and polypropylene oxide; and block copolymers of ethylene oxide and propylene oxide. A polyester resin, an unsaturated polyester compound, and other additives may be appropriately added to an extent not impairing the effect of the present invention.

Next, the carbon fibers used in the present invention will be described. Examples of the carbon fibers used in the present invention include polyacrylonitrile (PAN) carbon fibers, rayon carbon fibers, and pitch carbon fibers. Among them, the PAN carbon fibers are preferably used due to excellent balance between strength and elastic modulus.

The carbon fibers of the present invention give carbon fiber bundles that preferably have a strand strength of 3.5 GPa or more, more preferably 4 GPa or more, and even more preferably 5 GPa or more. The obtained carbon fiber bundles preferably have a strand elastic modulus of 220 GPa or more, more preferably 240 GPa or more, and even more preferably 280 GPa or more. The strand strength and the strand elastic modulus within the above ranges achieve a carbon fiber reinforced composite material with excellent impact resistance and having high rigidity and mechanical characteristics.

In the present invention, the strand tensile strength and the elastic modulus of carbon fiber bundles can be determined by the test method of resin-impregnated strand described in JIS-R-7608 (2004) in accordance with the procedure below. The resin formulation is "Celloxide (registered trademark)" 2021P (manufactured by Daicel Chemical Industries, Ltd.)/boron trifluoride monoethylamine (manufactured by Tokyo Chemical Industry Co., Ltd.)/acetone=100/3/4 (parts by mass), and the curing conditions are at normal pressure at 130° C. for 30 minutes. Ten strands of carbon fiber bundles are tested, and mean values are calculated as the strand tensile strength and the strand elastic modulus.

The carbon fibers used in the present invention preferably have a surface roughness (Ra) of 6.0 to 100 nm. The surface roughness (Ra) is more preferably 15 to 80 nm and even more preferably 30 to 60 nm. Carbon fibers having a surface roughness (Ra) of 6.0 to 60 nm have a surface with a highly active edge part, which increases the reactivity with an epoxy group and other functional groups of the sizing agent described above. This can improve the interfacial adhesion, and such carbon fibers are thus preferred. Carbon fibers having a surface roughness (Ra) of 6.0 to 100 nm have an uneven surface, which can improve the interfacial adhesion due to an anchor effect of the sizing agent. Such carbon fibers are thus preferred.

In order to control the surface roughness (Ra) of the carbon fibers within the above range, wet spinning is preferably used as a spinning method described below. The surface roughness (Ra) of the carbon fibers can also be controlled by combining the type (for example, an aqueous solution of an organic solvent such as dimethyl sulfoxide, dimethylformamide, and dimethylacetamide or an aqueous solution of an inorganic compound such as zinc chloride and sodium thiocyanate) and concentration of a coagulation liquid and the temperature of the coagulation liquid, a take-up speed and a draw ratio of coagulated yarn in a spinning process, and respective draw ratios in flameproofing, pre-carbonization, and carbonization processes. Furthermore, combining electrolytic treatment can control the carbon fibers to predetermined surface roughness (Ra).

The surface roughness (Ra) of carbon fibers can be determined by using an atomic force microscope (AFM). For example, carbon fibers are cut into pieces having a length of several millimeters; then the fiber pieces are fixed onto a substrate (silicon wafer) with a silver paste; and a three-dimensional surface shape image of the central part of each single fiber is observed under an atomic force microscope (AFM). Usable examples of the atomic force microscope include NanoScope IIIa with Dimension 3000 stage system manufactured by Digital Instruments, and the observation can be performed in the following observation conditions:

Scan mode: tapping mode
Probe: silicon cantilever
Scan field: 0.6 µm×0.6 µm
Scan speed: 0.3 Hz
Number of pixels: 512×512
Measurement environment: at room temperature in the atmosphere For each sample, in the image obtained by the observation of a single area on an individual single fiber, the curve of the fiber cross section is approximated with a three-dimensional curved surface. From the obtained whole image, the average roughness (Ra) is calculated. It is preferable that the average roughness (Ra) of five single fibers be determined, and the average is evaluated.

In the present invention, the carbon fibers preferably have a total fineness of 400 to 3,000 tex. The carbon fibers preferably have a filament number of 1,000 to 100,000 and more preferably 3,000 to 50,000.

In the present invention, the carbon fibers preferably have a single fiber diameter of 4.5 to 7.5 µm. If having a single fiber diameter of 7.5 µm or less, the carbon fibers can have high strength and high elastic modulus and thus are preferred. The single fiber diameter is more preferably 6 µm or less and even more preferably 5.5 µm or less. If having a single fiber diameter of 4.5 µm or more, the carbon fibers are unlikely to cause single fiber breakage and to reduce the productivity and thus are preferred.

In the present invention, the carbon fibers preferably have a surface oxygen concentration (O/C) ranging from 0.05 to 0.50, more preferably ranging from 0.06 to 0.30, and even more preferably ranging from 0.07 to 0.25, where the surface oxygen concentration (O/C) is the ratio of the number of oxygen (O) atoms and that of carbon (C) atoms on the surface of the fibers and is determined by X-ray photoelectron spectroscopy. If having a surface oxygen concentration (O/C) of 0.05 or more, the carbon fibers maintain an oxygen-containing functional group on the surface of the carbon fibers and thus can achieve a strong adhesion to a matrix resin. If having a surface oxygen concentration (O/C) of 0.50 or less, the carbon fibers can suppress the reduction in strength of the carbon fiber itself by oxidation.

The surface oxygen concentration of carbon fibers is determined by X-ray photoelectron spectroscopy in accordance with the procedure below. First, a solvent is used to remove dust and the like adhering to the surface of carbon fibers; then the carbon fibers are cut into 20-mm pieces; and the pieces are spread and arranged on a copper sample holder. The measurement is carried out by using $AlK\alpha_{1,2}$ as the X-ray source while the inside of a sample chamber is maintained at $1\times10^{-8}$ Torr. The photoelectron takeoff angle is adjusted to 90°. As the correction value for the peak associated with electrification during measurement, the binding energy value of the main peak (peak top) of $C_{1s}$ is set to 284.6 eV. The $C_{1s}$ peak area is determined by drawing a straight base line in a range from 282 to 296 eV. The $O_{1s}$ peak area is determined by drawing a straight base line in a range from 528 to 540 eV. The surface oxygen concentration (O/C) is expressed as an atom number ratio calculated by dividing the ratio of the $O_{1s}$ peak area by a sensitivity correction value inherent in an apparatus. For ESCA-1600 manufactured by Ulvac-Phi, Inc. used as the X-ray photoelectron spectrometer, the sensitivity correction value inherent in the apparatus is 2.33.

The carbon fibers used in the present invention preferably have a carboxy group concentration (COOH/C) on the surface of the carbon fibers ranging from 0.003 to 0.015, where the surface carboxy group concentration (COOH/C) is expressed by the ratio of the numbers of atoms of the carboxy group (COOH) and the carbon (C) on the surface of carbon fibers determined by chemical modification X-ray photoelectron spectroscopy. The carboxy group concentration (COOH/C) on the surface of carbon fibers is more preferably in a range from 0.004 to 0.010. The carbon fibers used in the present invention preferably have a surface hydroxy group concentration (COH/C) ranging from 0.001 to 0.050, where the surface hydroxy group concentration (COH/C) is expressed by the ratio of the numbers of atoms of the hydroxy group (OH) and the carbon (C) on the surface of carbon fibers determined by chemical modification X-ray photoelectron spectroscopy. The surface hydroxy group concentration (COH/C) on the surface of carbon fibers is more preferably in a range from 0.010 to 0.040.

The carboxy group concentration (COOH/C) and the hydroxy group concentration (COH/C) on the surface of carbon fibers are determined by X-ray photoelectron spectroscopy in accordance with the procedure below.

The surface hydroxy group concentration COH/C is determined by chemical modification X-ray photoelectron spectroscopy in accordance with the procedure below. First, carbon fiber bundles from which a sizing agent and the like have been removed with a solvent are cut into pieces, and the pieces are spread and arranged on a platinum sample holder. The pieces are exposed to a dry nitrogen gas containing 0.04 mol/L of trifluoroacetic anhydride gas at room temperature for 10 minutes, undergoing chemical modification treatment. Then, the treated pieces are mounted on an X-ray photoelectron spectrometer at a photoelectron takeoff angle of 35°. $AlK\alpha_{1,2}$ is used as the X-ray source, and the inside of the sample chamber is maintained at a degree of vacuum of $1\times10^{-8}$ Torr. As the correction for the peak associated with electrification during measurement, the binding energy value of the main peak of $C_{1s}$ is set to 284.6 eV, first. The $C_{1s}$ peak area $[C_{1s}]$ is determined by drawing a straight base line in a range from 282 to 296 eV, and the $F_{1s}$ peak area $[F_{1s}]$ is determined by drawing a straight base line in a range from 682 to 695 eV. The reaction rate r can be determined from $C_{1s}$ peak splitting of polyvinyl alcohol simultaneously subjected to chemical modification treatment.

The surface hydroxy group concentration (COH/C) is expressed by the value calculated in accordance with the equation below.

$$COH/C=\{[F_{1s}]/(3k[C_{1s}]-2[F_{1s}])r\}\times100(\%)$$

In the equation, k is a sensitivity correction value inherent in the apparatus for the $F_{1s}$ peak area relative to the $C_{1s}$ peak area, and the sensitivity correction value inherent in an apparatus is 3.919 for model SSX-100-206 manufactured by SSI, USA.

The surface carboxy group concentration COOH/C is determined by chemical modification X-ray photoelectron spectroscopy in accordance with the procedure below. First, carbon fiber bundles from which a sizing agent and the like have been removed with a solvent are cut into pieces, and the pieces are spread and arranged on a platinum sample holder. The pieces are is exposed to air containing 0.02 mol/L of trifluoroethanol gas, 0.001 mol/L of dicyclohexylcarbodiimide gas, and 0.04 mol/L of pyridine gas at 60° C. for 8 hours, undergoing chemical modification treatment. Then, the treated pieces are mounted on an X-ray photoelectron spectrometer at a photoelectron takeoff angle of 35°. $AlK\alpha_{1,2}$ is used as the X-ray source, and the inside of the sample chamber is maintained at a degree of vacuum of $1\times10^{-8}$ Torr. As the correction for the peak associated with electrification during measurement, the binding energy value of the main peak of $C_{1s}$ is set to 284.6 eV, first. The $C_{1s}$ peak area $[C_{1s}]$ is determined by drawing a straight base line in a range from 282 to 296 eV, and the $F_{1s}$ peak area $[F_{1s}]$ is determined by drawing a straight base line in a range from 682 to 695 eV. The reaction rate r can be determined from $C_{1s}$ peak splitting of polyacrylic acid simultaneously subjected to chemical modification treatment, and the residual rate m of a dicyclohexylcarbodiimide derivative can be determined from $O_{1s}$ peak splitting.

The surface carboxy group concentration COOH/C is expressed by the value calculated in accordance with the equation below.

$$COOH/C=\{[F_{1s}]/(3k[C_{1s}]-(2+13m)[F_{1s}])r\}\times100(\%)$$

In the equation, k is a sensitivity correction value inherent in the apparatus for the $F_{1s}$ peak area relative to the $C_{1s}$ peak area, and the sensitivity correction value inherent in an apparatus is 3.919 for model SSX-100-206 manufactured by SSI, USA.

The carbon fibers used in the present invention preferably have a polar component of surface free energy of 8 $mJ/m^2$ or more and 50 $mJ/m^2$ or less. Carbon fibers having a polar component of surface free energy of 8 $mJ/m^2$ or more are preferred because the aliphatic epoxy compound (A) comes closer to the surface of carbon fibers to improve the adhesion, and a sizing layer has an uneven structure. Carbon fibers having a polar component of surface free energy of 50 $mJ/m^2$ or less are preferred because the bindability among carbon fibers increases to improve impregnation properties with a matrix resin, and this expands the application of a carbon fiber reinforced composite material to be produced.

The surface of carbon fibers more preferably has a polar component of surface free energy of 15 mJ/m² or more and 45 mJ/m² or less and most preferably 25 mJ/m² or more and 40 mJ/m² or less. The polar component of surface free energy of carbon fibers is the polar component of surface free energy calculated by using the Owens equation for approximation on the basis of the contact angle of carbon fibers with a corresponding liquid of water, ethylene glycol, and tricresyl phosphate determined by the Wilhelmy method.

The aliphatic epoxy compound (A) used in the present invention may be employed as long as it has a polar component of surface free energy of 9 mJ/m² or more and 50 mJ/m² or less. The aromatic epoxy compound (B1) may be employed as long as it has a polar component of surface free energy of 0 mJ/m² or more and less than 9 mJ/m².

The polar components of surface free energy of the aliphatic epoxy compound (A) and the aromatic epoxy compound (B1) are determined as follows: carbon fiber bundles are immersed in a solution containing the aliphatic epoxy compound (A) or the aromatic epoxy compound (B1) alone and pulled up; the carbon fiber bundles are dried at 120 to 150° C. for 10 minutes; and each polar component of surface free energy is calculated by using the Owens equation for approximation on the basis of each contact angle of the carbon fiber bundles with a corresponding liquid of water, ethylene glycol, and tricresyl phosphate determined by the Wilhelmy method as described above.

In the present invention, the polar component of surface free energy of carbon fibers, $E_{CF}$, the polar component of surface free energy of an aliphatic epoxy compound (A), $E_A$, and the polar component of surface free energy of an aromatic epoxy compound (B1), $E_{B1}$, are preferably satisfy the relation, $E_{CF} \geq E_A > E_{B1}$.

A method for producing the PAN carbon fibers will next be described.

Usable examples of the spinning method for preparing precursor fibers of carbon fibers include dry spinning, wet spinning, and dry-wet spinning. To readily produce high-strength carbon fibers, the wet spinning or the dry-wet spinning is preferably employed.

In order to further improve the adhesion between carbon fibers and a matrix resin, the carbon fibers preferably have a surface roughness (Ra) of 6.0 to 100 nm, and in order to prepare carbon fibers having such a surface roughness, the wet spinning is preferably employed to spin precursor fibers.

A spinning solution to be used may be a solution in which a homopolymer or copolymer of polyacrylonitrile is dissolved in a solvent. The solvent used is an organic solvent such as dimethyl sulfoxide, dimethylformamide, and dimethylacetamide or an aqueous solution of an inorganic compound such as nitric acid, sodium rhodanate, zinc chloride, and sodium thiocyanate. Preferred solvents are dimethyl sulfoxide and dimethylacetamide.

The spinning solution is passed through a spinneret for spinning, discharged into a spinning bath or air, and then solidified in the spinning bath. The spinning bath to be used may be an aqueous solution of the same solvent as the solvent used for the spinning solution. The spinning liquid preferably contains the same solvent as the solvent for the spinning solution, and an aqueous dimethyl sulfoxide solution and an aqueous dimethylacetamide solution are preferred. The fibers solidified in the spinning bath are subjected to water-washing and drawing to yield precursor fibers. The obtained precursor fibers are subjected to flame resistant treatment and carbonization treatment and, if desired, further subjected to graphite treatment, yielding carbon fibers. The carbonization treatment and the graphite treatment are preferably carried out under conditions of a maximum heat treatment temperature of 1,100° C. or more and more preferably 1,400 to 3,000° C.

To improve the adhesion to a matrix resin, the obtained carbon fibers are typically subjected to oxidation treatment, which introduces an oxygen-containing functional group. The oxidation treatment method may be gas phase oxidation, liquid phase oxidation, and liquid phase electrolytic oxidation, and the liquid phase electrolytic oxidation is preferably employed from the viewpoint of high productivity and uniform treatment.

In the present invention, the electrolytic solution used for the liquid phase electrolytic oxidation is exemplified by an acid electrolytic solution and an alkaline electrolytic solution. From the viewpoint of adhesion between carbon fibers and a matrix resin, carbon fibers are more preferably subjected to the liquid phase electrolytic oxidation in an alkaline electrolytic solution and then coated with a sizing agent.

Examples of the acid electrolytic solution include inorganic acids such as sulfuric acid, nitric acid, hydrochloric acid, phosphoric acid, boric acid, and carbonic acid; organic acids such as acetic acid, butyric acid, oxalic acid, acrylic acid, and maleic acid; and salts such as ammonium sulfate and ammonium hydrogen sulfate. Among them, sulfuric acid and nitric acid, which exhibit strong acidity, are preferably used.

Examples of the alkaline electrolytic solution specifically include aqueous solutions of hydroxides such as sodium hydroxide, potassium hydroxide, magnesium hydroxide, calcium hydroxide, and barium hydroxide; aqueous solutions of carbonates such as sodium carbonate, potassium carbonate, magnesium carbonate, calcium carbonate, barium carbonate, and ammonium carbonate; aqueous solutions of hydrogen carbonates such as sodium hydrogen carbonate, potassium hydrogen carbonate, magnesium hydrogen carbonate, calcium hydrogen carbonate, barium hydrogen carbonate, and ammonium hydrogen carbonate; and aqueous solutions of ammonia, tetraalkylammonium hydroxide, and hydrazine. Among them, preferably used electrolytic solutions are aqueous solutions of ammonium carbonate and ammonium hydrogen carbonate because such a solution is free from an alkali metal that interferes with the curing of a matrix resin, or an aqueous solution of tetraalkylammonium hydroxide exhibiting strong alkalinity is preferably used.

The electrolytic solution used in the present invention preferably has a concentration ranging from 0.01 to 5 mol/L and more preferably ranging from 0.1 to 1 mol/L. If the electrolytic solution has a concentration of 0.01 mol/L or more, the electrolytic treatment can be performed at a lower electrical voltage, which is advantageous in operating cost. An electrolytic solution having a concentration of 5 mol/L or less is advantageous in terms of safety.

The electrolytic solution used in the present invention preferably has a temperature ranging from 10 to 100° C. and more preferably ranging from 10 to 40° C. An electrolytic solution having a temperature of 10° C. or more improves the efficiency of electrolytic treatment, and this is advantageous in operating cost. An electrolytic solution having a temperature of less than 100° C. is advantageous in terms of safety.

In the present invention, the quantity of electricity during liquid phase electrolytic oxidation is preferably optimized depending on the carbonization degree of carbon fibers, and the treatment of carbon fibers having a high elastic modulus necessitates a larger quantity of electricity.

In the present invention, the current density during liquid phase electrolytic oxidation is preferably in a range from 1.5 to 1,000 A/m² and more preferably from 3 to 500 A/m² relative to 1 m² of the surface area of carbon fibers in an electrolytic treatment solution. If the current density is 1.5 A/m² or more, the efficiency of electrolytic treatment is improved, and this is advantageous in operating cost. A current density of 1,000 A/m² or less is advantageous in terms of safety.

In the present invention, the carbon fibers after electrolytic treatment are preferably washed with water and dried. The washing method may be dipping or spraying, for example. Among them, from the viewpoint of easy washing, the dipping is preferably employed, and the dipping is preferably performed while carbon fibers are vibrated by ultrasonic waves. An excessively high drying temperature readily causes thermal decomposition of a functional group on the outermost surface of carbon fibers, thus decomposing the functional group. The drying is thus preferably performed at a temperature as low as possible. Specifically, the drying temperature is preferably 260° C. or less, more preferably 250° C. or less, and even more preferably 240° C. or less.

Next, sizing agent-coated carbon fibers prepared by coating the carbon fibers with a sizing agent will be described. The sizing agent of the present invention includes the aliphatic epoxy compound (A) and the aromatic compound (B) containing at least the aromatic epoxy compound (B1) and may contain additional components.

In the present invention, the method of coating carbon fibers with the sizing agent is preferably a method by single coating using a sizing liquid in which the aliphatic epoxy compound (A), the aromatic compound (B) at least containing the aromatic epoxy compound (B1), and other components are simultaneously dissolved or dispersed in a solvent and a method by multiple coating of carbon fibers using sizing liquids in which any of the compounds (A), (B1), and (B) and other components are selected and dissolved or dispersed in corresponding solvents. The present invention more preferably employs one step application of single coating of carbon fibers with a sizing liquid containing all the components of the sizing agent in terms of effect and simple treatment.

The sizing agent of the present invention can be used as a sizing liquid prepared by diluting sizing agent components with a solvent. Examples of the solvent include water, methanol, ethanol, isopropanol, acetone, methyl ethyl ketone, dimethylformamide, and dimethylacetamide. Specifically, an aqueous dispersion emulsified with a surfactant or an aqueous solution is preferably used from the viewpoint of handleability and safety.

The sizing liquid is prepared by emulsifying components at least containing the aromatic compound (B) with a surfactant to yield a water emulsion liquid and mixing a solution at least containing the aliphatic epoxy compound (A). For a water-soluble aliphatic epoxy compound (A), a method of previously dissolving the aliphatic epoxy compound (A) in water to give an aqueous solution and mixing a water emulsion liquid at least containing the aromatic compound (B) is preferably employed from the viewpoint of emulsion stability. Alternatively, a method of using a water dispersant in which the aliphatic epoxy compound (A), the aromatic compound (B), and other components are emulsified with a surfactant is preferably employed from the viewpoint of long-term storage stability of the sizing agent.

The sizing liquid typically contains the sizing agent at a concentration ranging from 0.2% by mass to 20% by mass.

Examples of the method of applying a sizing agent onto carbon fibers (the method of coating carbon fibers with a sizing agent) include a method of immersing carbon fibers in a sizing liquid through a roller, a method of bringing carbon fibers into contact with a roller onto which a sizing liquid adheres, and a method of spraying a sizing liquid onto carbon fibers. The method of applying a sizing agent may be either a batch-wise manner or a continuous manner, and the continuous manner is preferably employed due to good productivity and small variation. During the application, in order to uniformly apply an active component in the sizing agent onto carbon fibers within an appropriate amount, the concentration and temperature of a sizing liquid, the thread tension, and other conditions are preferably controlled. During the application of a sizing agent, carbon fibers are preferably vibrated by ultrasonic waves.

During the coating of carbon fibers with the sizing solution, the sizing liquid preferably has a liquid temperature ranging from 10 to 50° C. in order to suppress a concentration change of the sizing agent due to the evaporation of a solvent. Furthermore, by adjusting a throttle for extracting an excess sizing liquid after applying the sizing liquid, the adhesion amount of the sizing agent can be controlled, and the sizing agent can be uniformly infiltrated into carbon fibers.

After coated with a sizing agent, the carbon fibers are preferably heated at a temperature ranging from 160 to 260° C. for 30 to 600 seconds. The heat treatment conditions are preferably at a temperature ranging from 170 to 250° C. for 30 to 500 seconds and more preferably at a temperature ranging from 180 to 240° C. for 30 to 300 seconds. Heat treatment under conditions at lower than 160° C. and/or for less than 30 seconds fails to accelerate the interaction between the aliphatic epoxy compound (A) in the sizing agent and an oxygen-containing functional group on the surface of carbon fibers, and this may result in insufficient adhesion between the carbon fibers and a matrix resin or may insufficiently dry carbon fibers and remove a solvent. Heat treatment under conditions at higher than 260° C. and/or for more than 600 seconds causes the sizing agent to decompose and volatilize and thus fails to accelerate the interaction with carbon fibers, and this may result in insufficient adhesion between the carbon fibers and a matrix resin.

The heat treatment can be performed by microwave irradiation and/or infrared irradiation. When sizing agent-coated carbon fibers are treated with heat by microwave irradiation and/or infrared irradiation, microwaves enter the carbon fibers and are absorbed by the carbon fibers, and this can heat the carbon fibers as an object to be heated to an intended temperature in a short period of time. The microwave irradiation and/or the infrared irradiation can rapidly heat the inside of the carbon fibers. This can reduce the difference in temperature between the inner side and the outer side of carbon fiber bundles, thus reducing the uneven adhesion of a sizing agent.

The sizing agent-coated carbon fibers of the present invention produced as above are characterized by having an (a)/(b) ratio of 0.50 to 0.90 where (a) is the height (cps) of a component at a binding energy (284.6 eV) assigned to CHx, C—C, and C═C and (b) is the height (cps) of a component at a binding energy (286.1 eV) assigned to C—O in a $C_{1s}$ core spectrum of the surface of the sizing agent on the carbon fibers analyzed by X-ray photoelectron spectroscopy using $AlK\alpha_{1,2}$ as the X-ray source at a photoelectron takeoff angle of 15°. When the (a)/(b) ratio is within a particular range, that is, in a range from 0.50 to 0.90, the sizing agent-coated carbon fibers have excellent adhesion to a matrix resin and undergo a small deterioration of mechanical characteristics even when stored in a prepreg state for a long period of time, and on the basis of the findings, the present invention is accomplished.

The sizing agent-coated carbon fibers of the present invention preferably have an (a)/(b) ratio of 0.55 or more and more preferably 0.57 or more where (a) is the height (cps) of a component at a binding energy (284.6 eV) assigned to CHx, C—C, and C=C and (b) is the height (cps) of a component at a binding energy (286.1 eV) assigned to C—O in a $C_{1s}$ core spectrum of the surface of the sizing agent analyzed by X-ray photoelectron spectroscopy at a photoelectron takeoff angle of 15°. The (a)/(b) ratio is preferably 0.80 or less and more preferably 0.74 or less. A larger (a)/(b) ratio indicates that the surface contains larger amounts of compounds derived from aromatics and smaller amounts of compounds derived from aliphatics.

The X-ray photoelectron spectroscopy is an analytical method by irradiating carbon fibers as a sample with X-rays in an ultrahigh vacuum and analyzing the kinetic energy of photoelectrons discharged from the surface of carbon fibers with what is called an energy analyzer. By analyzing the kinetic energy of photoelectrons discharged from the surface of carbon fibers as the sample, the energy value of X-rays incident on the carbon fibers as the sample is converted to uniquely determine a binding energy, and on the basis of the binding energy and a photoelectron intensity, the types, concentrations, and chemical states of elements present in the outermost layer (the order of nanometers) of the sample can be analyzed.

In the present invention, the peak ratio of (a) and (b) of the surface of the sizing agent on sizing agent-coated carbon fibers can be determined by X-ray photoelectron spectroscopy in accordance with the procedure below. Sizing agent-coated carbon fibers are cut into 20-mm pieces, and the pieces are spread and arranged on a copper sample holder. $AlK\alpha_{1,2}$ is used as the X-ray source, and the measurement is carried out while the inside of a sample chamber is maintained at $1\times10^{-8}$ Torr. As the correction for the peak associated with electrification during measurement, the binding energy value of the main peak of $C_{1s}$ is set to 286.1 eV, first. At this time, the $C_{1s}$ peak area is determined by drawing a straight base line in a range from 282 to 296 eV. The straight base line from 282 to 296 eV for calculating the $C_{1s}$ peak area is defined as the origin point (zero point) for photoelectron intensity, then the height (b) (cps: photoelectron intensity per unit time) of the peak at a binding energy of 286.1 eV assigned to a C—O component and the height (a) (cps) of the peak at a binding energy of 284.6 eV assigned to CHx, C—C, and C=C are determined, and the (a)/(b) ratio is calculated.

The sizing agent-coated carbon fibers of the present invention preferably satisfy the relation (III) where (I) and (II) are determined from the (a)/(b) ratio, (a) is the height (cps) of a component at a binding energy (284.6 eV) assigned to CHx, C—C, and C=C, and (b) is the height (cps) of a component at a binding energy (286.1 eV) assigned to C—O in a $C_{1s}$ core spectrum of the surface of the sizing agent on the carbon fibers analyzed by X-ray photoelectron spectroscopy using an X-ray at 400 eV at a photoelectron takeoff angle of 55°.

$$0.50 \leq (I) \leq 0.90 \text{ and } 0.60 < (II)/(I) < 1.0 \quad \text{(III)}$$

where (I) is the value of (a)/(b) of the surface of sizing agent-coated carbon fibers before ultrasonication; and (II) is the value of (a)/(b) of the surface of sizing agent-coated carbon fibers that have been washed to have a sizing agent adhesion amount of 0.09 to 0.20% by mass by ultrasonication of the sizing agent-coated carbon fibers in an acetone solvent.

The value (I) as the value of (a)/(b) of the surface of sizing agent-coated carbon fibers before ultrasonication falling within the range indicates that the surface of the sizing agent contains larger amounts of compounds derived from aromatics and smaller amounts of compounds derived from aliphatics. The value (I) as the value of (a)/(b) before ultrasonication is preferably 0.55 or more and more preferably 0.57 or more. The value (I) as the value of (a)/(b) before ultrasonication is preferably 0.80 or less and more preferably 0.74 or less.

The ratio (II)/(I) as the ratio of the values of (a)/(b) of the surface of sizing agent-coated carbon fibers before and after ultrasonication falling within the range indicates that larger amounts of compounds derived from aliphatics are present in the inner layer of the sizing agent than in the surface of the sizing agent. The ratio (II)/(I) is preferably 0.65 or more. The ratio (II)/(I) is preferably 0.85 or less.

If the values (I) and (II) satisfy the relation (III), the sizing agent-coated carbon fibers have excellent adhesion to a matrix resin and undergo a small deterioration of mechanical characteristics even when stored in a prepreg state for a long period of time. Such carbon fibers are thus preferred.

In the present invention, the sizing agent applied onto carbon fibers preferably has an epoxy equivalent of 350 to 550 g/eq. A sizing agent having an epoxy equivalent of 550 g/eq. or less improves the adhesion between carbon fibers coated with the sizing agent and a matrix resin. When the carbon fibers coated with a sizing agent having an epoxy equivalent of 350 g/eq. or more are used to prepare a prepreg, the reaction between a matrix resin component used in the prepreg and the sizing agent can be suppressed, and thus a carbon fiber reinforced composite material to be produced has good mechanical characteristics even when the prepreg is stored in a long period of time. Such a sizing agent is thus preferred. The sizing agent applied preferably has an epoxy equivalent of 360 g/eq. or more and more preferably 380 g/eq. or more. The sizing agent applied preferably has an epoxy equivalent of 530 g/eq. or less and more preferably 500 g/eq. or less. In order to give a sizing agent applied having an epoxy equivalent within the range, a sizing agent having an epoxy equivalent of 180 to 470 g/eq. is preferably applied. If the epoxy equivalent is 313 g/eq. or less, the adhesion between carbon fibers coated with the sizing agent and a matrix resin is improved. If carbon fibers coated with a sizing agent having an epoxy equivalent of 222 g/eq. or more is used to prepare a prepreg, the reaction between a resin component used in the prepreg and the sizing agent can be suppressed, and thus a carbon fiber reinforced composite material to be produced has good mechanical characteristics even when the prepreg is stored in a long period of time.

The epoxy equivalent of the sizing agent in the present invention can be determined by dissolving a sizing agent from which a solvent is removed in a solvent typified by N,N-dimethylformamide, then cleaving the epoxy group with hydrochloric acid, and carrying out acid-base titration. The epoxy equivalent is preferably 220 g/eq. or more and more preferably 240 g/eq. or more. The epoxy equivalent is preferably 310 g/eq. or less and more preferably 280 g/eq. or less. The epoxy equivalent of the sizing agent applied to carbon fibers in the present invention can be determined by immersing sizing agent-coated carbon fibers in a solvent typified by N,N-dimethylformamide, carrying out ultrasonic cleaning to extract the sizing agent from the fibers, then cleaving the epoxy group with hydrochloric acid, and carrying out acid-base titration. The epoxy equivalent of the sizing agent applied to carbon fibers can be controlled by, for example, the epoxy equivalent of a sizing agent to be applied and heat history during drying or other steps after coating.

In the present invention, the adhesion amount of the sizing agent to carbon fibers is preferably in a range from 0.1 to 10.0 parts by mass and more preferably from 0.2 to 3.0 parts by mass relative to 100 parts by mass of the carbon fibers. If coated with the sizing agent in an amount of 0.1 parts by mass or more, the sizing agent-coated carbon fibers can withstand friction with metal guides or the like through which the carbon fibers pass during preparing a prepreg and weaving, and this prevents fluffs from generating, thus producing a carbon fiber sheet having excellent quality such as smoothness. If the adhesion amount of the sizing agent is 10.0 parts by mass or less, a matrix resin can infiltrate into carbon fibers without interference by a sizing agent coating around the sizing agent-coated carbon fibers. This prevents voids from generating in an intended carbon fiber reinforced composite material, and thus the carbon fiber reinforced composite material has excellent quality and excellent mechanical characteristics.

The adhesion amount of the sizing agent is a value (% by mass) calculated by weighing about 2±0.5 g of sizing agent-coated carbon fibers, subjecting the carbon fibers to heat treatment at 450° C. for 15 minutes in a nitrogen atmosphere, determining the change in mass before and after the heat treatment, and dividing the change in mass by the mass before the heat treatment.

In the present invention, the sizing agent layer applied onto carbon fibers and dried preferably has a thickness ranging from 9.0 to 20 nm and a maximum thickness of less than twice a minimum thickness. A sizing agent layer having such a uniform thickness can stably achieve a large adhesion improvement effect and can stably achieve excellent high-order processability.

In the present invention, the adhesion amount of the aliphatic epoxy compound (A) is preferably in a range from 0.05 to 5.0 parts by mass and more preferably from 0.2 to 2.0 parts by mass relative to 100 parts by mass of the carbon fibers. The amount is more preferably from 0.3 to 1.0 part by mass. When the adhesion amount of the aliphatic epoxy compound (A) is 0.05 part by mass or more, the adhesion between the sizing agent-coated carbon fibers and the matrix resin is improved, and thus such an amount is preferred.

In the process for producing the sizing agent-coated carbon fibers of the present invention, carbon fibers having a polar component of surface free energy of 8 mJ/m² or more and 50 mJ/m² or less are preferably coated with the sizing agent. Carbon fibers having a polar component of surface free energy of 8 mJ/m² or more are preferred because the aliphatic epoxy compound (A) comes closer to the surface of carbon fibers to improve the adhesion, and the sizing layer has an uneven structure. Carbon fibers having a polar component of surface free energy of 50 mJ/m² or less are preferred because the bindability among carbon fibers increases to improve impregnation properties with a matrix resin, and this expands the application of a carbon fiber reinforced composite material to be produced. The polar component of surface free energy of the surface of carbon fibers is more preferably 15 mJ/m² or more and 45 mJ/m² or less and most preferably 25 mJ/m² or more and 40 mJ/m² or less.

The sizing agent-coated carbon fibers of the present invention are used in shapes, for example, tows, woven fabrics, knits, braids, webs, mats, and chopped strands. In particular, for an application necessitating high specific strength and specific modulus, a tow prepared by arranging carbon fibers in one direction is most preferred, and a prepreg prepared by further impregnation with a matrix resin is preferably used.

Next, the thermosetting resin composition used in the prepreg of the present invention will be described.

The thermosetting resin composition used in the present invention contains the thermosetting resin (D), the latent curing agent (E), and at least one of the following [1] and [2]: [1] thermoplastic resin particles or fibers (F) and conductive particles or fibers (G); and [2] conductive particles or fibers (H) whose thermoplastic resin nucleus or core is covered with a conductive substance. When containing [1], the thermosetting resin composition contains the thermoplastic resin particles or fibers (F) and the conductive particles or fibers (G) in a mass ratio of 1:1 to 1,000 and has an interlayer formative layer containing (F) and (G) and/or (H) on a surface of a layer formed of the carbon fibers.

In an embodiment containing [1] in the present invention, the thermosetting resin composition contains the thermoplastic resin particles or fibers (F), the conductive particles or fibers (G), and the latent curing agent (E). In the present embodiment, it is preferable that the thermoplastic resin particles be used as (F) and that the conductive particles be used as (G). This is because a case in which both (F) and (G) are particle forms provides more favorable flow characteristics of the thermosetting resin and more excellent impregnation properties with the carbon fibers than a case in which either one is a fiber form or a case in which both are fiber forms. In addition, by combining the thermoplastic resin particles (F) and the conductive particles (G), at the time of drop-weight impact (or local impact) on the carbon fiber reinforced composite material, delamination that occurs caused by the local impact is reduced, leading to fewer delaminated parts caused by the local impact that serve as starting points of breakage caused by stress concentration when stress is applied to the carbon fiber reinforced composite material after the impact and higher contact probability between the conductive particles and the carbon fibers within the laminated layer, and thus a conductive path is easily formed. These circumstances achieve a carbon fiber reinforced composite material that exhibits high impact resistance and electrical conductivity.

In an embodiment containing [2], the thermosetting resin contains conductive particles whose thermoplastic resin nucleus is covered with a conductive substance or conductive fibers whose thermoplastic resin core is covered with a conductive substance (H) and the latent curing agent (E). (H) is (G) having a specific embodiment, that is, the conductive particles whose thermoplastic resin nucleus is covered with a conductive substance or the conductive fibers whose thermoplastic resin core is covered with a conductive substance. By using (H) having the specific embodiment, the effect achieved through the combination of (F) and (G) can be achieved with only (H).

The embodiment containing [1] is more excellent than the embodiment containing [2] in that, when formed into a prepreg, as a result of excellent toughness caused by (G) thermoplastic particles or fibers in a laminated interlayer part of the carbon fiber layer, delamination strength is high at the time of drop-weight impact on the carbon fiber reinforced composite material, and thus impact resistance is higher. The embodiment containing [2] is more excellent than the embodiment containing [1] in that fewer components are used, and thus lower cost and increased productivity are expected.

The thermosetting resin (D) used in the present invention may be any resin that undergoes cross-linking reaction by heat and at least partially forms a three-dimensional cross-linked structure. Examples of such a thermosetting resin include unsaturated polyester resins, vinyl ester resins, epoxy resins, benzoxazine resins, phenol resins, urea resins, melamine resins, and polyimide resins and also include modified resins thereof and blending resins of two or more of them. These thermosetting resins may be self-curable by heat and may contain a curing agent, a curing accelerator, and other additives.

Among these thermosetting resins, epoxy resins are preferably used, which are excellent in the balance among heat resistance, mechanical characteristics, and adhesiveness to the carbon fibers. In particular, epoxy resins whose precursors are amines, phenols, or compounds having a carbon-carbon double bond are preferably used. Specific examples of the epoxy resin, as glycidylamine epoxy resins whose precursors are amines include tetraglycidyldiaminodiphenylmethane, tetraglycidyldiaminodiphenyl ether, tetraglycidyldiaminodiphenyl sulfone, triglycidyl-p-aminophenol, triglycidyl-m-aminophenol, and various isomers of triglycidylaminocresol. Tetraglycidyldiaminodiphenylmethane is excellent in heat resistance and is thus preferable as a resin for carbon fiber reinforced composite materials as aircraft structural members.

Glycidyl ether epoxy resins whose precursors are phenols are also preferably used as the thermosetting resin (D). Examples of such epoxy resins include bisphenol A epoxy resins, bisphenol F epoxy resins, bisphenol S epoxy resins, phenol novolak epoxy resins, cresol novolak epoxy resins, and resorcinol epoxy resins.

Liquid bisphenol A epoxy resins, bisphenol F epoxy resins, and resorcinol epoxy resins are low in viscosity, and they are preferably used in combination with other epoxy resins.

A bisphenol A epoxy resin that is solid at room temperature (around 25° C.) gives a structure having lower cross-linking density in a cured resin than a bisphenol A epoxy resin that is liquid at room temperature (around 25° C.), and thus the cured resin of the former bisphenol A epoxy resin is lower in heat resistance but is higher in toughness. Given this situation, the former bisphenol A epoxy resin is preferably used in combination with a glycidylamine epoxy resin or the liquid bisphenol A epoxy resin or bisphenol F epoxy resin.

Epoxy resins having a naphthalene skeleton gives a cured resin having low water absorptivity and high heat resistance. Biphenyl epoxy resins, dicyclopentadiene epoxy resins, phenol aralkyl epoxy resins, and diphenyl fluorene epoxy resins are also preferably used, because they give cured resins having low water absorptivity.

Urethane-modified epoxy resins and isocyanate-modified epoxy resins are preferably used in order to give cured resins having high fracture toughness and ductility.

These epoxy resins may be used singly or in an appropriate combination. Using at least an epoxy resin having two epoxy groups and an epoxy resin having three or more epoxy groups in combination is preferred, because of the capability of achieving both resin fluidity and heat resistance after curing. Combining a glycidyl amine epoxy and a glycidyl ether epoxy in particular can achieve both heat resistance and water resistance and processability. Combining at least an epoxy resin that is liquid at room temperature and an epoxy resin that is solid at room temperature is effective in appropriately controlling the tackiness and drape properties of a prepreg.

The phenol novolak epoxy resins and the cresol novolak epoxy resins have high heat resistance and low water absorptivity and thus give cured resins having high heat and water resistance. Using these phenol novolak epoxy resins and cresol novolak epoxy resins can adjust the tackiness and drape properties of a prepreg while improving heat and water resistance.

The thermosetting resin (D) of the present invention is used with the latent curing agent (E) contained. The latent curing agent (E) described in this here is a curing agent for the thermosetting resin (D) used in the present invention. The curing agent is activated by heat to react with a reactive group of the thermosetting resin (D) such as an epoxy group, and the reaction is preferably activated at 70° C. or more. Here, the activation at 70° C. means that a reaction initiation temperature is 70° C. The reaction initiation temperature (hereinafter called activation temperature) can be determined by differential scanning calorimetry (DSC), for example. When an epoxy resin is used as the thermosetting resin (D), specifically, to 100 parts by mass of a bisphenol A epoxy compound having an epoxy equivalent of about 184 to 194, 10 parts by mass of a curing agent to be evaluated is added to produce an epoxy resin composition; the epoxy resin composition is analyzed by differential scanning calorimetry to give an exothermic curve; and the point of intersection of a tangent line at an inflection point of the exothermic curve with a tangent line of the base line is determined to be the reaction initiation temperature.

The latent curing agent (E) is preferably an aromatic amine curing agent (E1) or dicyandiamide or a derivative thereof. The aromatic amine curing agent may be any aromatic amines that are used as the epoxy resin curing agent, and specific examples include 3,3'-diaminodiphenyl sulfone (3,3'-DDS), 4,4'-diaminodiphenyl sulfone (4,4'-DDS), diaminodiphenylmethane (DDM), 3,3'-diisopropyl-4,4'-diaminodiphenylmethane, 3,3'-di-t-butyl-4,4'-diaminodiphenylmethane, 3,3'-diethyl-5,5'-dimethyl-4,4'-diaminodiphenylmethane, 3,3'-diisopropyl-5,5'-dimethyl-4,4'-diaminodiphenylmethane, 3,3'-di-t-butyl-5,5'-dimethyl-4,4'-diaminodiphenylmethane, 3,3',5,5'-tetraethyl-4,4'-diaminodiphenylmethane, 3,3'-diisopropyl-5,5'-diethyl-4,4'-diaminodiphenylmethane, 3,3'-di-t-butyl-5,5'-diethyl-4,4'-diaminodiphenylmethane, 3,3',5,5'-tetraisopropyl-4,4'-diaminodiphenylmethane, 3,3'-di-t-butyl-5,5'-diisopropyl-4,4'-diaminodiphenylmethane, 3,3',5,5'-tetra-t-butyl-4,4'-diaminodiphenylmethane, diaminodiphenyl ether (DADPE), bisaniline, benzyldimethylaniline, 2-(dimethylaminomethyl)phenol (DMP-10), 2,4,6-tris(dimethylaminomethyl)phenol (DMP-30), and 2,4,6-tris(dimethylaminomethyl)phenol 2-ethylhexanoate. These aromatic amine curing agents may be used singly or as a mixture of two or more of them.

Examples of the commercially available aromatic amine curing agent (E1) include SEIKACURE S (manufactured by Wakayama Seika Kogyo Co., Ltd.), MDA-220 (manufactured by Mitsui Chemicals, Inc.), "jER Cure (registered trademark)" W (manufactured by Japan Epoxy Resin Co., Ltd.), 3,3'-DAS (manufactured by Mitsui Chemicals, Inc.), Lonzacure (registered trademark) M-DEA, M-DIPA, M-MIPA, and DETDA 80 (manufactured by Lonza). Examples of the commercially available dicyandiamide include DICY-7 and DICY-15 (manufactured by Japan Epoxy Resin Co., Ltd.).

As the curing agent except the aromatic amine curing agent (E1), amines such as alicyclic amines, phenol compounds, acid anhydrides, polyaminoamides, organic acid hydrazides, and isocyanates may be used in combination with the aromatic amine curing agent.

A preferred combination of the sizing agent of the present invention and the latent curing agent (E) is as below. The sizing agent and the latent curing agent (E) are mixed so that the amine equivalent/epoxy equivalent rate of the sizing agent to be applied and the latent curing agent (E) would be 0.9, and the glass transition point is determined immediately after the mixing and after storage in an environment at a temperature of 25° C. and 60% RH for 20 days. A preferred combination of the sizing agent and the latent curing agent (E) has an increase in glass transition point of 25° C. or less after 20 days. When the combination having an increase in glass transition point of 25° C. or less is used to produce a prepreg, the reaction of the outer layer of the sizing agent with the inside of a matrix resin is suppressed, and this suppresses the deterioration of mechanical characteristics such as tensile strength of a carbon fiber reinforced composite material produced after the prepreg is stored for a long period of time. Such a combination is thus preferred. The increase in glass transition point is more preferably 15° C. or less. The increase in glass transition point is even more preferably 10° C. or less. The glass transition point can be determined by differential scanning calorimetry (DSC).

When an epoxy resin is used as the thermosetting resin (D), the latent curing agent (E) are preferably contained in a total amount so as to give an amount of an active hydrogen group ranging from 0.6 to 1.2 equivalents and more preferably ranging from 0.7 to 0.9 equivalent relative to 1 equivalent of epoxy group in all the epoxy resin components. Here, the active hydrogen group is a functional group that can react with the epoxy group of a curing agent component. If the amount of the active hydrogen group is less than 0.6 equivalent, a cured product may have insufficient reaction rate, heat resistance, and elastic modulus, and a carbon fiber reinforced composite material may have insufficient glass transition temperature and strength. If the amount of the active hydrogen group is more than 1.2 equivalents, a cured product has sufficient reaction rate, glass transition temperature, and elastic modulus but has insufficient plastic deformability, and thus a carbon fiber reinforced composite material may have insufficient impact resistance.

A curing accelerator may be contained in order to accelerate the curing.

Examples of the curing accelerator include urea compounds, tertiary amines and salts thereof, imidazole and salts thereof, triphenylphosphine and derivatives thereof, metal carboxylates, and Lewis acids, Bronsted acids, and salts thereof. Among them, urea compounds are suitably used from the viewpoint of the balance between long-term storage stability and catalytic ability. In particular, a combination of a urea compound and dicyandiamide as the latent curing agent (E) is suitably used.

Examples of the urea compound include N,N-dimethyl-N'-(3,4-dichlorophenyl)urea, toluene bis(dimethylurea), 4,4'-methylene bis(phenyldimethylurea), and 3-phenyl-1,1-dimethylurea. Examples of the commercially available urea compound include DCMU99 (manufactured by Hodogaya Chemical Co., Ltd.) and "Omicure (registered trademark)" 24, 52, and 94 (manufactured by Emerald Performance Materials, LLC).

The urea compound is preferably contained in an amount of 1 to 4 parts by mass relative to 100 parts by mass of all the epoxy resin components. If the urea compound is contained in an amount of less than 1 part by mass, a reaction may insufficiently proceed to give a cured product having insufficient elastic modulus and heat resistance. If the urea compound is contained in an amount of more than 4 parts by mass, the self-polymerization of the thermosetting resin (D) interferes with the reaction between the thermosetting resin (D) and the latent curing agent (E), and thus the cured product may have insufficient toughness or a lower elastic modulus.

In addition, the composition may contain the thermosetting resin (D) and the latent curing agent (E) or a prereacted product of some of them. The technique may be effective in viscosity control or improvement in long-term storage stability.

In the present invention, dissolving a thermoplastic resin in the thermosetting resin composition is also preferable. The thermoplastic resin is in general preferably a thermoplastic resin having a bond selected from the group consisting of a carbon-carbon bond, an amido bond, an imide bond, an ester bond, an ether bond, a carbonate bond, a urethane bond, a thioether bond, a sulfone bond, and a carbonyl bond in its main chain. The thermoplastic resin may partially have a cross-linked structure, may have crystallinity, and may be amorphous. In particular, it is preferable that at least one resin selected from the group consisting of polyamide, polycarbonate, polyacetal, polyphenylene oxide, polyphenylene sulfide, polyalylate, polyester, polyamideimide, polyimide, polyetherimide, polyimide having a phenylene trimethylindan structure, polysulfone, polyether sulfone, polyether ketone, polyether ether ketone, polyaramide, polyether nitrile, and polybenzimidazole be dissolved in an epoxy resin.

Among them, in order to achieve favorable heat resistance, the thermoplastic resin to be dissolved has a glass transition temperature (Tg) of at least 150° C. or more and preferably 170° C. or more. If the glass transition temperature of the thermoplastic resin to be contained is less than 150° C., it may be liable to cause deformation by heat when it is used as a molded body. Furthermore, a hydroxy group, a carboxy group, a thiol group, an acid anhydride, or the like can react with a cation-polymerizable compound and is thus preferably used as a terminal functional group of the thermoplastic resin. Examples of the thermoplastic resin having a hydroxy group include polyvinyl acetal resins such as polyvinyl formal and polyvinyl butyral, polyvinyl alcohol, and phenoxy resins. Examples of the thermoplastic resin having a sulfonyl group include polyether sulfone.

Specifically, usable examples include "SUMIKAEXCEL (registered trademark)" PES3600P, PES5003P, PES5200P, PES7600P, and PES7200P (manufactured by Sumitomo Chemical Co., Ltd.), "Ultrason (registered trademark)" E2020P SR and E2021SR (manufactured by BASF), and "Virantage" (registered trademark) PESU VW-10200 and PESU VW-10700 (registered trademark, manufactured by Solvay Advanced Polymers), which are commercially available products of polyether sulfone. Other examples include copolymerized oligomers of polyether sulfone and polyether ether sulfone as disclosed in Japanese Translation of PCT Application No. 2004-506789 and "Ultem (registered trademark)" 1000, 1010, and 1040 (manufactured by SABIC Innovative Plastics Japan), which are commercially available products of polyether imide. The oligomer indicates a polymer having a relatively low molecular weight in which a finite number of, that is, about 10 to 100 monomers are bonded.

When the thermosetting resin (D), in particular an epoxy resin as the thermosetting resin (D) is used, and when the epoxy resin and a thermoplastic resin are dissolved, a more favorable result is likely to be given than in a case where they are used singly. The brittleness of the epoxy resin is complemented by the toughness of the thermoplastic resin, whereas the difficulty in molding of the thermoplastic resin is complemented by the epoxy resin, thus forming a well-balanced base resin. As for the use ratio (% by mass) of the epoxy resin and the thermoplastic resin, in view of a balance, the thermoplastic resin is preferably contained in a ratio of 1 to 40% by mass, more preferably 5 to 30% by mass, and even more preferably 8 to 20% by mass relative to 100% by mass of the thermosetting resin composition. If the amount of the thermoplastic resin is too large, the thermosetting resin composition increases in viscosity, which may impair the manufacturing processability and handling of the thermosetting resin composition and the prepreg. If the amount of the thermoplastic resin is too small, a cured product of the thermosetting resin has insufficient toughness, and thus a carbon fiber reinforced composite material may have insufficient impact resistance.

The embodiment containing [1] of the present invention uses the thermoplastic resin particles or fibers (F) as essential components, thereby achieving excellent impact resistance. The material of the thermoplastic resin particles or fibers (F) used in the present invention may be the same as the various thermoplastic resins exemplified above as the thermoplastic resins to be mixed and dissolved in the thermosetting resin composition. Among them, polyamide is most preferred, which can remarkably improve impact resistance because of its excellent toughness. Among the polyamides, nylon 12, nylon 6, nylon 11, nylon 6/12 copolymer, and a nylon (semi-IPN nylon) modified to have a semi-IPN (interpenetrating polymer network) with an epoxy compound disclosed in Example 1 of Japanese Patent Application Laid-open No. H01-104624 are preferred because the nylons can impart particularly good adhesive strength with the epoxy resin, thus provide a carbon fiber reinforced composite material having high delamination strength at the time of drop-weight impact, and achieve high improvement effect of impact resistance. Examples of the commercially available polyamide particles include SP-500, SP-10, TR-1, TR-2, 842P-48, and 842P-80 (manufactured by Toray Industries Inc.), "Toraypearl (registered trademark)" TN (manufactured by Toray Industries Inc.), and "Orgasol (registered trademark)" 1002D, 2001UD, 2001EXD, 2002D, 3202D, 3501D, and 3502D (manufactured by Arkema, Inc.).

When the thermoplastic resin particles are used as (F), the shape of the thermoplastic resin particles may be spherical, nonspherical, porous, needle-like, whisker-like, or flake-like. The spherical shape is preferred. The spherical shape does not reduce the flow characteristics of the thermosetting resin and is thus excellent in impregnation properties with the carbon fibers and, at the time of drop-weight impact (or local impact) on the carbon fiber reinforced composite material, reduces delamination caused by the local impact, leading to fewer delaminated parts caused by the local impact that serve as starting points of breakage caused by stress concentration when stress is applied to the carbon fiber reinforced composite material after the impact. It is thus preferred that a carbon fiber reinforced composite material that exhibits higher impact resistance can be achieved.

When the thermoplastic resin fibers are used as (F), the shape of the thermoplastic resin fibers may be short fibers or long fibers. For the short fibers, available methods include a method that uses short fibers in a similar manner as particles as disclosed in Japanese Patent Application Laid-open No. H02-69566 and a method that uses short fibers processed into a mat. For the long fibers, available methods include a method that arranges long fibers parallel to the surface of a prepreg as disclosed in Japanese Patent Application Laid-open No. H04-292634 and a method that randomly arranges them as disclosed in WO 94016003. The thermoplastic resin fibers can also be used after being processed into a sheet-shaped base material such as a woven fabric as disclosed in Japanese Patent Application Laid-open No. H02-32843, a nonwoven fabric as disclosed in WO 94016003, or a knitted fabric. As another available method, short fiber chops, chopped strands, milled fibers, or short fibers are processed into pieces of spun yarn and are processed into a woven fabric or a knitted fabric in which the pieces of spun yarn are arranged in parallel or randomly.

When the conductive particles are used as (G) in the present invention, the conductive particles may be any particles that behave as electrically favorable conductors and are not limited to particles including only conductors. They are particles having a volume resistivity of preferably 10 to $10^{-9}$ $\Omega$cm, more preferably 1 to $10^{-9}$ $\Omega$cm, and even more preferably $10^{-1}$ to $10^{-9}$ $\Omega$cm. If the volume resistivity is too high, a carbon fiber reinforced composite material may not have sufficient electrical conductivity. Examples of the conductive particles include metallic particles; conductive polymer particles such as, polyacetylene particles, polyaniline particles, polypyrrole particles, polythiophene particles, polyisothianaphthene particles, and polyethylene dioxythiophene particles; carbon particles; particles whose inorganic material nucleus is covered with a conductive substance; and particles whose organic material nucleus is covered with a conductive substance. Among them, the carbon particles, the particles whose inorganic material nucleus is covered with a conductive substance, and the particles whose organic material nucleus is covered with a conductive substance exhibit high electrical conductivity and long-term storage stability and thus are particularly preferably used.

In particular, when using a thermoplastic resin as the organic material and employing the particles whose thermoplastic resin nucleus is covered with a conductive substance as the embodiment containing [2] of the present invention described below, a carbon fiber reinforced composite material to be obtained can achieve more excellent impact resistance, and such an embodiment is thus preferred.

When the conductive fibers are used as (G) in the present invention, the conductive fibers may be any fibers that behave as electrically favorable conductors and are not limited to fibers including only conductors. They are fibers having a volume resistivity of preferably 10 to $10^{-9}$ $\Omega$cm, more preferably 1 to $10^{-9}$ $\Omega$cm, and even more preferably $10^{-1}$ to $10^{-9}$ $\Omega$cm. If the volume resistivity is too high, a carbon fiber reinforced composite material may not have sufficient electrical conductivity. Examples of the conductive fibers include metallic fibers, carbon fibers, fibers whose inorganic material core is covered with a conductive material, and fibers whose organic material core is covered with a conductive material. In particular, when using a thermoplastic resin as the organic material and employing the fibers whose thermoplastic resin core is covered with a conductive substance as the embodiment containing [2] of the present invention described below, a carbon fiber reinforced composite material to be obtained can achieve more excellent impact resistance.

The volume resistivity referred to here is volume resistivity obtained by setting a sample in a cylindrical cell having four-probe electrodes, measuring the thickness and resistance value of the sample with a pressure of 60 MPa applied to the sample, and calculating from those values.

In the conductive particles or fibers (G) of the type covered with a conductive substance, the conductive particles or fibers include an inorganic material or an organic material as a nucleus or core and a conductive layer formed of the conductive substance and may include an adhesive layer described below between the nucleus or core and the conductive layer as necessary.

In the conductive particles or fibers (G) of the type covered with a conductive substance, examples of the inorganic material used as the nucleus or core include inorganic oxides, inorganic organic composites, and carbon.

Examples of the inorganic oxide include single inorganic oxides and two or more types of composite inorganic oxides such as silica, alumina, zirconia, titania, silica alumina and silica zirconia.

Examples of the inorganic organic composite include polyorganosiloxane obtained through the hydrolytic degradation of metal alkoxides and/or metal alkylalkoxides.

Crystalline carbon or amorphous carbon is preferably used as the carbon. Examples of the amorphous carbon include "Bellpearl (registered trademark)" C-600, C-800, and C-2000 (manufactured by Air Water Inc.), "NICABEADS (registered trademark)" ICB, PC, and MC (manufactured by Nippon Carbon Co., Ltd.), Glassy Carbon (manufactured by Tokai Carbon Co., Ltd.), high-purity artificial graphite SG series, SGB series, and SN series (manufactured by SEC Carbon, Limited), and spherical carbon (manufactured by Gun Ei Chemical Industry Co., Ltd.).

In the conductive particles or fibers (G) of the type covered with a conductive substance, when an organic material is used as the nucleus or core, examples of the organic material used as the nucleus or core include thermosetting resins such as unsaturated polyester resins, vinyl ester resins, epoxy resins, benzoxazine resins, phenol resins, urea resins, melamine resins, and polyimide resins and thermoplastic resins such as polyamide resins, phenol resins, amino resins, acryl resins, ethylene-vinyl acetate resins, polyester resins, urea resins, melamine resins, alkyd resins, polyimide resins, urethane resins, and divinylbenzene resins. Two or more types of these materials may be used in combination. Among them, preferably used are acryl resins and divinylbenzene resins, which have excellent heat resistance, and polyamide resins, which have excellent impact resistance.

When the particles are used as the conductive particles or fibers (G), the shape may be spherical, nonspherical, porous, needle-like, whisker-like, or flake-like. The spherical shape is preferred. The spherical shape does not reduce the flow characteristics of the thermosetting resin and is thus excellent in impregnation properties with the carbon fibers. At the time of drop-weight impact (or local impact) on the carbon fiber reinforced composite material, delamination caused by the local impact is reduced, leading to fewer delaminated parts caused by the local impact that serve as starting points of breakage caused by stress concentration when stress is applied to the carbon fiber reinforced composite material after the impact and higher contact probability between the conductive particles and the carbon fibers within the laminated layer, and thus a conductive path is easily formed. It is thus preferred that a carbon fiber reinforced composite material that exhibits high impact resistance and electrical conductivity can be achieved.

When the fibers are used as the conductive particles or fibers (G), the shape may be short fibers or long fibers. For the short fibers, available methods include a method that uses short fibers in a similar manner as particles as disclosed in Japanese Patent Application Laid-open No. H02-69566 and a method that uses short fibers processed into a mat. For the long fibers, available methods include a method that arranges long fibers parallel to the surface of a prepreg as disclosed in Japanese Patent Application Laid-open No. H04-292634 and a method that randomly arranges them as disclosed in WO 94016003. The thermoplastic resin fibers can also be used after being processed into a sheet-shaped base material such as a woven fabric as disclosed in Japanese Patent Application Laid-open No. H02-32843, a nonwoven fabric as disclosed in WO 94016003, or a knitted fabric. As another available method, short fiber chops, chopped strands, milled fibers, or short fibers are processed into pieces of spun yarn and are processed into a woven fabric or a knitted fabric in which the pieces of spun yarn are arranged in parallel or randomly.

In the conductive fibers (G) of the type covered with a conductive substance, when the core of the material is covered with the conductive substance, there is one method that processes the core of the conductive fibers into the above shape and then covers it with the conductive substance, and there is another method that covers the core of the conductive fibers with the conductive substance and then processes it into the above shape. For short fibers, long fibers, chopped strands, milled fibers, or the like, both methods are preferably used. For woven fabrics, knitted fabrics, and nonwoven fabrics, preferred is a method that covers the core of the conductive fibers with the conductive substance and then processes it into the above shape. The method that processes the core of the conductive fibers into the above shape and then covers it with the conductive substance may produce uneven covering and decrease the electrical conductivity of the conductive fibers to be used as (G), and is thus not preferred.

The embodiment containing [2] of the present invention uses the conductive particles or fibers (H) whose thermoplastic resin nucleus or core is covered with a conductive substance as an essential component and thus can exhibit high impact resistance and electrical conductivity in the carbon fiber reinforced composite material without adding the thermoplastic resin particles or fibers (F). The thermoplastic resin used as the material of the nucleus or core of the conductive particles or fibers in (H) used in the present invention may be the same as the various thermoplastic resins exemplified above as the thermoplastic resins to be mixed and dissolved in the epoxy resin. Among them, a thermoplastic resin having a stain energy release rate (G1c) of 1,500 to 50,000 J/m$^2$ is preferably used as the material of the nucleus or core. The stain energy release rate (G1c) is more preferably 3,000 to 40,000 J/m$^2$ and even more preferably 4,000 to 30,000 J/m$^2$. If the stain energy release rate (G1c) is too small, the carbon fiber reinforced composite material may have insufficient impact resistance. If the stain energy release rate (G1c) is too large, the carbon fiber reinforced composite material may have decreased rigidity. Preferably used as the thermoplastic resin are, for example, polyamide, polyamideimide, polyether sulfone, and polyether imide. Polyamide is particularly preferred. Among the polyamides, preferably used are nylon 12, nylon 6, nylon 11, nylon 6/12 copolymer, and a nylon (epoxy-modified nylon) modified with an epoxy compound. The evaluation of G1c is performed by the compact tension method or the double tension method prescribed in ASTM D 5045-96 using a resin plate formed of the thermoplastic resin as the material of the nucleus or core of (H).

When the conductive particles whose thermoplastic resin nucleus is covered with a conductive substance are used as (H), the shape of the nucleus of the thermoplastic resin particles may be spherical, nonspherical, porous, needle-like, whisker-like, or flake-like. The spherical shape is preferred. The spherical shape does not reduce the flow characteristics of the thermosetting resin and is thus excellent in impregnation properties with the carbon fibers. At the time of drop-weight impact (or local impact) on the carbon fiber reinforced composite material, delamination caused by the local impact is reduced, leading to fewer delaminated parts caused by the local impact that serve as starting points of breakage caused by stress concentration when stress is applied to the carbon fiber reinforced composite material after the impact and higher contact probability between the conductive particles and the carbon fibers within the laminated layer, and thus a conductive path is easily formed. It is thus preferred that a carbon fiber reinforced composite material that exhibits high impact resistance and electrical conductivity can be achieved.

When the conductive fibers whose thermoplastic resin nucleus is covered with a conductive substance are used as (H), the shape of the core of the thermoplastic resin fibers may be short fibers or long fibers.

For the short fibers, available methods include a method that uses short fibers in a similar manner as particles as disclosed in Japanese Patent Application Laid-open No. H02-69566 and a method that uses short fibers processed into a mat. For the long fibers, available methods include a method that arranges long fibers parallel to the surface of a prepreg as disclosed in Japanese Patent Application Laid-open No. H04-292634 and a method that randomly arranges them as disclosed in WO 94016003. The thermoplastic resin fibers can also be used after being processed into a sheet-shaped base material such as a woven fabric as disclosed in Japanese Patent Application Laid-open No. H02-32843, a nonwoven fabric as disclosed in WO 94016003, or a knitted fabric. As another available method, short fiber chops, chopped strands, milled fibers, or short fibers are processed into pieces of spun yarn and are processed into a woven fabric or a knitted fabric in which the pieces of spun yarn are arranged in parallel or randomly.

When the core of the thermoplastic resin fibers is covered with the conductive material, there is one method that processes the core of the thermoplastic resin fibers into the above shape and then covers it with the conductive substance, and there is another method that covers the core of the thermoplastic resin fibers with the conductive substance and then processes it into the above shape. For short fibers, long fibers, chopped strands, milled fibers, or the like, both methods are preferably used. For woven fabrics, knitted fabrics, and nonwoven fabrics, preferred is a method that covers the core of the thermoplastic resin fibers with the conductive substance and then processes it into the above shape. This is because, for woven fabrics, knitted fabrics, and nonwoven fabrics, the method that processes the core of the thermoplastic resin fibers into the above shape and then covers it with the conductive substance may produce uneven covering and decrease the electrical conductivity of (H), and is thus not preferably used.

In the conductive particles or fibers (H) whose thermoplastic resin nucleus or core is covered with a conductive substance, examples of the conductive substance covering the nucleus or core include metals or carbon. In (H), the conductive substance on the surface of the thermoplastic resin nucleus or core forms the conductive layer. The conductive layer may be a continuous film of metal or carbon or may be an aggregate of a fibrous or particulate conductive substance such as conductive fibers, carbon black, and metallic fine particles. An adhesive layer described below may be formed between the thermoplastic resin as the nucleus or core and the conductive layer.

In the conductive particles or fibers (G) of the type covered with a conductive substance and the conductive particles or fibers (H) whose thermoplastic resin nucleus or core is covered with a conductive substance, the conductive substance forming the conductive layer may be any substance that behave as electrically favorable conductors and are not limited to a substance including only conductors. It is a substance having a volume resistivity of preferably 10 to $10^{-9}$ $\Omega$cm, more preferably 1 to $10^{-9}$ $\Omega$cm, and even more preferably $10^{-1}$ to $10^{-9}$ $\Omega$cm. If the volume resistivity is too high, the carbon fiber reinforced composite material may not have sufficient electrical conductivity. Examples of the substance include carbon and metals. The conductive layer may be a continuous film of metal or carbon or may be an aggregate of a fibrous or particulate conductive substance.

When using carbon as the conductive substance, preferably used are carbon black such as channel black, thermal black, furnace black, and ketjen black, hollow carbon fibers, or the like. Among them, the hollow carbon fibers are preferably used, and their outer diameter is preferably 0.1 to 1,000 nm and more preferably 1 to 100 nm. Hollow carbon fibers having both a too small and a too large outer diameter are often difficult to be manufactured.

The hollow carbon fibers may form a graphite layer on the surface thereof. In that case, the total number of constituting graphite layers is preferably 1 to 100, more preferably 1 to 10, even more preferably 1 to 4, and particularly preferably 1 to 2.

When using a metal as the conductive substance, any metal can be used; its standard electrode potential is preferably −2.0 to 2.0 V and more preferably −1.8 to 1.8 V. If the standard electric potential is too low, it is unstable and thus may be unfavorable in terms of safety. If it is too high, processability and productivity may decrease. The standard electrode potential referred to here is represented by the difference between an electrode potential when the metal is immersed into a solution containing its metal ions and the potential of a standard hydrogen electrode (an electrode formed of platinum immersed into a 1 N HCl solution being in contact with hydrogen gas at 1 atm). Ti: −1.74 V, Ni: −0.26 V, Cu: 0.34 V, Ag: 0.80 V, and Au: 1.52 V, for example.

When using the above metal, the metal is preferably plated. Preferable examples of the metal include platinum, gold, silver, copper, tin, nickel, titanium, cobalt, zinc, iron, chromium, and aluminum, because of the capability of preventing the corrosion of the metal caused by a potential difference with the carbon fibers. Among them, platinum, gold, silver, copper, tin, nickel, or titanium is particularly preferably used, because of their high electrical conductivity represented by their volume resistivity of 10 to $10^{-9}$ $\Omega$cm and long-term storage stability. These metals may be used singly or may be used as alloys containing these metals as main components.

Wet plating and dry plating are preferably used as a method for applying metal plating using the above metals. Examples of the wet plating include methods such as electroless plating, displacement plating, and electric plating. Among them, the method by electroless plating is preferably used, because it can apply plating onto even nonconductors. Examples of the dry plating include methods such as vacuum deposition, plasma chemical vapor deposition (CVD), optical CVD, ion plating, and sputtering. Among them, the method by sputtering is preferably used, because it can achieve excellent adhesiveness even at low temperatures.

The metal plating may be a film of a single metal or may be a film including a plurality of layers formed of a plurality of metals. When applying metal plating, it is preferable that a plating film whose outermost surface is a layer formed of gold, nickel, copper, or titanium be formed. The outermost surface formed of the above metal can reduce a connection resistance value and stabilize the surface. When forming a gold layer, for example, a method is preferably used that forms a nickel layer by electroless nickel plating and then forms the gold layer by displacement gold plating.

Metallic fine particles are also preferably used as the conductive substance forming the conductive layer. In this case, as for a metal used as the metallic fine particles, preferably used are platinum, gold, silver, copper, tin, nickel, titanium, cobalt, zinc, iron, chromium, aluminum, alloys containing theses metals as main components, tin oxide, indium, oxide, indium tin oxide (ITO), or the like, because they prevent corrosion caused by a potential difference with the carbon fibers. Among them, particularly preferably used are platinum, gold, silver, copper, tin, nickel, titanium, or alloys containing these metals as main components, because they have high electrical conductivity and long-term storage stability. The fine particles herein refer to particles having an average diameter that is smaller (generally referring to being a tenth or less) than the average diameter of the conductive particles or fibers (G) and the conductive particles or fibers (H) whose thermoplastic resin nucleus or core is covered with a conductive substance.

Mechanochemical bonding is preferably used as a method for covering a nucleus or core with the above metallic fine particles. Mechanochemical bonding is a method that mechanochemically bonds a plurality of different material particles at a molecular level by applying mechanical energy and creates strong nano bonding at their interfaces to create composite particles. In the present invention, the metallic fine particles are bonded to the nucleus or core of an inorganic material or organic material to cover the nucleus or core with the metallic fine particles.

When the nucleus of the inorganic material or organic material (including thermoplastic resins) is covered with the metallic fine particles, the particle diameter of the metallic fine particles is preferably 1/1,000 to 1/10 and more preferably 1/500 to 1/100 of the average particle diameter of the nucleus. Metallic fine particles having a too small particle diameter may be difficult to be manufactured. If the particle diameter of the metallic fine particles is too large, uneven covering may occur. Furthermore, when the core of the inorganic material or organic material is covered with the metallic fine particles, the particle diameter of the metallic fine particles is preferably 1/1,000 to 1/10 and more preferably 1/500 to 1/100 of the average fiber diameter of the core. Metallic fine particles having a too small particle diameter may be difficult to be manufactured. If the particle diameter of the metallic fine particles is too large, uneven covering may occur.

In the conductive particles or fibers (G) of the type covered with a conductive substance and the conductive particles or fibers (H) whose thermoplastic resin nucleus or core is covered with a conductive substance, an adhesive layer may be or may not be present between the nucleus or core and the conductive layer. When the nucleus or core and the conductive layer are liable to be separated from each other, the adhesive layer may be present. Preferable examples of the main component of the adhesive layer in this case include vinyl acetate resins, acryl resins, vinyl acetate-acryl resins, vinyl acetate-vinyl chloride resins, ethylene-vinyl acetate resins, ethylene-acryl resins, polyamide, polyvinyl acetal, polyester, polyurethane, urea resins, melamine resins, phenol resins, resorcinol resins, epoxy resins, polyimide, natural rubber, chloroprene rubber, nitrile rubber, urethane rubber, SBR, reclaimed rubber, butyl rubber, aqueous vinyl urethane, α-olefins, cyanoacrylate, modified acryl resins, epoxy resins, epoxy-phenol, butyral-phenol, and nitrile-phenol. Examples among them include vinyl acetate resins, acryl resins, vinyl acetate-acryl resins, vinyl acetate-vinyl chloride resins, ethylene-vinyl acetate resins, ethylene-acryl resins, and epoxy resins.

In the conductive particles or fibers (G) of the type covered with a conductive substance and the conductive particles or fibers (H) whose thermoplastic resin nucleus or core is covered with a conductive substance, the conductive particles or fibers covered with a conductive substance preferably have a volume ratio represented by [the volume of the nucleus or core]/[the volume of the conductive layer] of preferably 0.1 to 500, more preferably 1 to 300, even more preferably 5 to 100. If the volume ratio is less than 0.1, not only a carbon fiber reinforced composite material to be obtained increases in mass, but also they may not be able to be uniformly dispersed during resin production. If the volume ratio exceeds 500, the carbon fiber reinforced composite material to be obtained may not have sufficient electrical conductivity.

The conductive particles or fibers (the conductive particles or fibers (G) and the conductive particles or fibers (H) whose thermoplastic resin nucleus or core is covered with a conductive substance) used in the present invention preferably have a specific gravity of at least 3.2. If the specific gravity of the conductive particles or fibers exceeds 3.2, not only a carbon fiber reinforced composite material to be obtained increases in mass, but also they may not be able to be uniformly dispersed during resin preparation. On this account, the conductive particles or fibers preferably have a specific gravity of 0.8 to 2.2. If the specific gravity of the conductive particles or fibers is less than 0.8, they may not be able to be uniformly dispersed during resin preparation.

In the embodiment containing [1] of the present invention (both the thermoplastic resin particles or fibers (F) and the conductive particles or fibers (G) are used), a mass ratio represented by [the amount of the thermoplastic resin particles or fibers (F) (parts by mass)]/[the amount of the conductive particles or fibers (G) (parts by mass)] is 1 to 1,000, preferably 10 to 500, and more preferably 10 to 100. If the mass ratio is less than 1, a carbon fiber reinforced composite material to be obtained cannot have sufficient impact resistance. If the mass ratio exceeds 1,000, the carbon fiber reinforced composite material to be obtained cannot have sufficient electrical conductivity.

In the embodiment containing [1] of the present invention (both the thermoplastic resin particles or fibers (F) and the conductive particles or fibers (G) are used), it is preferable that the average diameter (the average particle diameter or average fiber diameter) of the conductive particles or fibers (G) be the same as or larger than the average diameter (the average particle diameter or average fiber diameter) of the thermoplastic resin particles or fibers (F) and that the average diameter be 150 μm or less. If the average diameter of the conductive particles or fibers (G) is smaller than the average diameter of the thermoplastic resin particles or fibers (F), the conductive particles or fibers (G) are buried in the thermoplastic resin particles or fibers (F), which are insulative, in the interlayer, and thus a conductive path between the carbon fibers and the conductive particles or fibers (G) within the layer is difficult to be formed, which may not cause a sufficient effect of improving electrical conductivity.

In the present invention, the thermoplastic resin particles or fibers (F), the conductive particles or fibers (G), and the conductive particles or fibers (H) whose thermoplastic resin nucleus or core is covered with a conductive substance preferably have an average diameter of 150 µm or less. If the average diameter exceeds 150 µm, when the arrangement of the carbon fibers are disturbed or when a particle layer is formed near the surface of the prepreg as described below, the thickness of the interlayer of a carbon fiber reinforced composite material to be obtained increases more than necessary, and thus when the carbon fiber reinforced composite material is formed, its mechanical characteristics may decrease. The average diameter is preferably 5 to 150 µm, more preferably 10 to 70 µm, and particularly preferably 20 to 40 µm. If the average diameter is too small, particles invade into among the fibers of the carbon fibers and are not localized in the interlayer part of a prepreg laminate, and the presence effect of the particles is insufficient, and thus impact resistance may decrease.

Methods for measuring the average diameter will be described for particles and fibers separately.

As for the average diameter (average particle diameter) of the particles, for example, the particles are magnified 1,000 times or more by a microscope such as a scanning electron microscope and are photographed, the particles are randomly selected, the diameter of a circle circumscribing each of the particles is determined to be a particle diameter, and the average of the particle diameter (n=50) can be determined to be the average diameter. When determining the volume ratio represented by [the volume of the nucleus]/[the volume of the conductive layer] of the conductive particles covered with the conductive substance, first the average particle diameter of the nucleus of the conductive particles is measured by the above method, or the average diameter (average particle diameter) of the conductive particles is determined by the above method. After that, a cross section of the conductive particles covered with the conductive substance is magnified 10,000 times by a scanning electron microscope and is photographed. The thickness of the conductive layer is measured (n=10), and its average value is calculated. The measurement is performed for the above randomly selected conductive particles (n=50). Adding the average particle diameter of the nucleus of the conductive particles and the double of the average of the thickness of the conductive layer gives the average diameter (average particle diameter) of the conductive particles, or subtracting the double of the average of the thickness of the conductive layer from the average particle diameter of the conductive particles gives the average diameter (average particle diameter) of the nucleus of the conductive particles. Using the average diameter (average particle diameter) of the nucleus of the conductive particles and the average diameter (average particle diameter) of the conductive particles, the volume ratio represented by [the volume of the nucleus]/[the volume of the conductive layer] can be calculated.

As for the average diameter (average fiber diameter) of the fibers, for example, fiber cross sections are magnified 1,000 times or more by a microscope such as a scanning electron microscope and are photographed, the fiber cross sections are randomly selected, the diameter of a circle circumscribing each of the fiber cross sections is determined to be a fiber diameter, and the average of the fiber diameter (n=50) can be determined to be the average diameter. When determining the volume ratio represented by [the volume of the core]/[the volume of the conductive layer] of the conductive fibers covered with the conductive substance, first the average fiber diameter of the core of the conductive fibers is measured by the above method, or the average diameter (average fiber diameter) of the conductive fibers is determined by the above method. After that, a cross section of the conductive fibers covered with the conductive substance is magnified 10,000 times by a scanning electron microscope and is photographed. The thickness of the conductive layer is measured (n=10), and its average value is calculated. The measurement is performed for the above randomly selected conductive fibers (n=50). Adding the average particle diameter of the core of the conductive fibers and the double of the average of the thickness of the conductive layer gives the average diameter (average fiber diameter) of the conductive fibers, or subtracting the double of the average of the thickness of the conductive layer from the average fiber diameter of the conductive fibers gives the average diameter (average fiber diameter) of the core of the conductive fibers. Using the average diameter (average fiber diameter) of the core of the conductive fibers and the average diameter (average fiber diameter) of the conductive fibers, the volume ratio represented by [the volume of the core]/[the volume of the conductive layer] can be calculated.

In the present invention, some of the conductive particles or fibers (G) and the conductive particles or fibers (H) whose thermoplastic resin nucleus or core is covered with a conductive substance have low adhesiveness with the thermosetting resin. Surface treatment on these can achieve strong adhesiveness with the thermosetting resin and further improve impact resistance. On this account, it is preferable to use at least one type of treatment selected from the group consisting of coupling treatment, oxidization treatment, ozone treatment, plasma treatment, corona treatment, and blast treatment. Among them, surface treatment by coupling treatment, oxidization treatment, and plasma treatment that can form chemical bonding or hydrogen bonding with the thermosetting resin can achieve strong adhesiveness with the thermosetting resin, and is thus preferably used.

In the surface treatment, in order to reduce a surface treatment time and help disperse the conductive particles or fibers (G) and the conductive particles or fibers (H) whose thermoplastic resin nucleus or core is covered with a conductive substance, the surface treatment is preferably performed while applying heat and ultrasonication. The heating temperature is at most 200° C. or less and preferably 30 to 120° C. In other words, a too high temperature may give a stronger odor, exacerbate an environment, or increase operation costs.

A coupling agent used in the coupling treatment is silane-based, titanium-based, or aluminum-based one. These coupling agents may be used singly or in combination. An inappropriate coupling agent causes insufficient adhesion between the treated particles or fibers and the thermosetting resin and thus may decrease impact resistance. In order to avoid these disadvantages, it is preferable to use a coupling agent that has strong affinity with or chemically bonds to the thermosetting resin used to achieve strong adhesion. In order to increase the affinity with the thermosetting resin, it is preferable to select a coupling agent whose molecular structure and polarity are similar to the molecular structure and polarity of the thermosetting resin used.

In order to further surely increase adhesiveness, a coupling agent that can form chemical bonding with the thermosetting resin as the matrix resin is preferably used. When a resin that performs radical polymerization such as an unsaturated polyester resin, a diaryl phthalate resin, and a maleimide resin is used as the matrix resin, preferable coupling agents have a substituent such as a vinyl group, an allyl group, an acryloyl group, a mathacryloyl group, and a cyclohexenyl group having a double bond. When an epoxy resin is the matrix resin, preferable coupling agents have an epoxy group, a phenolic hydroxy group, a carboxy group, a mercapto group, an amino group, or a monosubstituted amino group. When a phenol resin is the matrix resin, preferable coupling agents have an epoxy group or a phenolic hydroxy group. When a urethane resin is the matrix resin, preferable coupling agents have a hydroxy group, an amino group, or a monosubstituted amino group. When a melamine resin or a urea resin is the matrix resin, preferable coupling agents have an amido group, a ureide group, an amino group, or a monosubstituted amino group. When a maleimide resin is the matrix resin, preferable coupling agents have an amino group or a monosubstituted amino group, in addition to a double bond. When a cyanate resin is the matrix resin, preferable coupling agents have a carboxy group, an epoxy group, a hydroxy group, an amino group, or a monosubstituted amino group.

As for the coupling treatment, silane coupling treatment is preferred, because silane coupling agents having various functional groups are easily available. Specific examples of the silane coupling agents include as amino silane, 3-aminopropyltrimethoxysilane, 3-aminopropyltriethoxysilane, 3-(2-aminoethyl)aminopropyltrimethoxysilane, 3-(phenylamino)propyltrimethoxysilane, and 3-(2-aminoethyl)aminopropylmethyldimethoxysilane; as epoxy silane, 3-glycidoxypropyltrimethoxysilane, 3-glycidoxypropyltriethoxysilane, 3-glycidoxypropylmethydimethoxysilane, 2-(3,4-epoxycyclohexyl)ethyltrimethoxysilane, and γ-methacryloxypropyltrimethoxysilane; and as vinyl silane, vinyltrichlorosilane, vinyltrimethoxysilane, vinyltriethoxysilane, vinyltris(2-methoxyethoxy)silane, and vinyltriacetoxysilane. In particular, any silane coupling agent having an epoxy group, an amino group, or monosubstituted amino group in the molecule can be used in wide range of resins and has high reactivity, and is thus particularly preferably used.

In the present invention, when performing coupling treatment on the conductive particles or fibers (G) and the conductive particles or fibers (H) whose thermoplastic resin nucleus or core is covered with a conductive substance (hereinafter, may be referred to an object to be treated), a coupling agent is preferably contained in an amount of 0.01 to 30 parts by mass and more preferably 0.1 to 10 parts by mass relative to 100 parts by mass of the particles or fibers. If the amount of the coupling agent is too small, adhesiveness with the thermosetting resin may not be sufficiently exhibited. If the amount is too large, the mechanical characteristics of a cured product may decrease.

In the present invention, as for the coupling treatment, the coupling agent is caused to adhere to the object to be treated, and heat treatment is directly performed to perform the coupling treatment, or the object to be treated and the coupling agent are added to the thermosetting resin in advance, and the coupling treatment may be performed through heat treatment when a prepreg is cured.

The oxidation treatment may be any treatment that can oxidize the surface of the object to be treated. Examples of the oxidation treatment include, but not limited to, chemical liquid oxidation treatment and electrolytic oxidization treatment. Among them, the chemical liquid oxidation treatment is preferably used.

The chemical liquid oxidation treatment is a method for performing oxidation treatment in an acid aqueous solution. The acid aqueous solution may use singly or in combination an aqueous solution containing sulfuric acid, fuming sulfuric acid, nitric acid, fuming nitric acid, hydrochloric acid, phosphoric acid, carbonic acid, boric acid, oxalic acid, hydrofluoric acid, formic acid, butyric acid, acetic acid, boric sulfuric acid, chlorosulfuric acid, chloroacetic acid, sulfosalicylic acid, sulfo acetic acid, maleic acid, chromic anhydride, hypochlorous acid, acrylic acid, sulfonic acid, fluorosulfuric acid, trifluoromethane sulfuric acid, trifluoromethane sulfonic acid, ammonium sulfate, ammonium formate, ammonium dihydrogen phosphate, ammonium oxalate, ammonium hydrogen sulfate, or the like. By performing the oxidation treatment, functional groups such as a hydroxy group and a carboxy group are chemically generated on the surface of the object to be treated, and the functional groups form chemical bonding and/or hydrogen bonding with the matrix resin, thereby achieving strong adhesion. Among them, sulfuric acid and nitric acid, which show strong acidity, and their mixed acid are preferably used.

The acid aqueous solution preferably has a concentration of preferably 0.01% by mass or more, more preferably 10% by mass or more, and even more preferably 50% by mass or more. A higher concentration reduces a treatment time and produces an effect of disentangling the coagulation of the object to be treated. Adding an oxidizer such as ozone, hydrogen peroxide, and lead dioxide boosts oxidizing power, and is thus preferred.

As for the surface treatment with ozone, a method is generally used that introduces ozone into a chamber having a heater and subjects the object to be treated to heat treatment. In this case, the surface of the object to be treated is modified into an activated surface, surface wettability with a matrix resin remarkably increases, and thus strong adhesion is achieved. Furthermore, a method is also preferably used that irradiates the object to be treated with ultraviolet rays in an ozone atmosphere to perform photooxidation treatment.

As for the surface treatment with plasma, a method is preferably used that introduces a reactive gas into a chamber and performs plasma treatment under a reduced pressure. Examples of the reactive gas include helium, neon, argon, nitrogen, ammonium, oxygen, nitrous oxide, nitrogen monoxide, nitrogen dioxide, carbon monoxide, carbon dioxide, bromine cyanide, hydrogen cyanide, hydrogen, water vapor, air, sulfurous acid gas, and hydrogen sulfide; they may be used singly or in combination. Performing the plasma treatment on the object to be treated modifies it into the activated surface, remarkably increases the surface wettability with the matrix resin, and thus achieves strong adhesion.

When plasma is generated by discharge, high frequency waves, low frequency waves, microwaves, and DC can also be used. Examples of the treatment apparatus include an internal electrode type one that installs electrodes in a vacuum apparatus and an external electrode type one that installs electrodes outside a vacuum apparatus. The present invention can use both types. The shape of the electrodes may be plate-shaped, rod-shaped, cylindrical, or the like, which can be used in combination in accordance with an object. When using glass-coated metal as a discharge electrode and metal such as plate-shaped or dram-shaped stainless steel as an earth electrode with an inter-electrode distance of preferably 0.5 to 30 cm and more preferably 2 to 10 cm, the discharge is uniform to enable uniform treatment, and thus such a configuration is preferred. The electrodes are preferably cooled with water or the like as necessary.

Examples of the surface treatment by the corona treatment include methods disclosed in Japanese Examined Patent Application Publication No. S48-5043, Japanese Examined Patent Application Publication No. S47-51905, Japanese Patent Application Laid-open No. S47-28067, Japanese Patent Application Laid-open No. S49-83767, Japanese Patent Application Laid-open No. S51-41770, and Japanese Patent Application Laid-open No. S51-131576. Performing the corona treatment on the object to be treated modifies it into the activated surface, remarkably increases the surface wettability with the matrix resin, and thus achieves strong adhesion.

The surface treatment by the blast treatment, which includes a wet process and a dry process, is performed by spraying a particulate blast material onto the surface of the object to be treated and is a treatment method preferably used for the conductive fibers of (G) and (H). This method forms fine roughness on the surface to expand the surface area and can increase the adhesiveness between the matrix resin and the object to be treated. Examples of the blast material include glass beads, silicic anhydride, alumina, diamond, and red iron oxide. The blast material is often used in a particle diameter of about 100 to 5,000 μm. In general, the type and particle diameter of the blast material and the injection pressure of the blast material are changed in accordance with an object, whereby surface treatment with optimum surface roughness is possible.

The thermosetting resin composition used in the present invention preferably further contains second conductive particles (I) having an average particle diameter of 1 μm or less. The material of the second conductive particles (I) may be the same as (G). Also can be used as the second conductive particles (I) are metallic particles, conductive polymers such as polyacetylene particles, carbon particles, particles whose inorganic material nucleus is covered with a conductive substance, and particles whose organic material nucleus is covered with a conductive substance, if they can be prepared to have an average particle diameter of 1 μm or less. Among them, preferred are carbon particles, particles whose inorganic material nucleus is covered with a conductive substance, and particles whose organic material nucleus is covered with a conductive substance, because of their high electric conductivity and long-term storage stability.

When carbon particles are used as the second conductive particles (I) in particular, examples of the carbon black include channel black, thermal black, acetylene black, furnace black, and ketjen black.

The average particle diameter of the second conductive particles (I) is preferably 1 μm or less and more preferably 0.5 μm or less. If the average particle diameter of the second conductive particles (I) is small, they are efficiently dispersed among the carbon fibers and thus produces an effect of improving the electrical conductivity of the carbon fiber reinforced composite material. The particle diameter of the second conductive particles (I) is preferably 0.01 μm or more.

The second conductive particles (I) of the present invention are preferably contained in a ratio of 0.05 to 3% by mass and more preferably 0.3 to 1.5% by mass relative to 100% by mass of the thermosetting resin composition. If the ratio of the second conductive particles (I) is too high, the viscosity of the thermosetting resin composition increases, and thus a prepreg may be difficult to be manufactured. If the ratio of the second conductive particles (I) is too low, the effect of improving the electrical conductivity of a carbon fiber reinforced composite material to be obtained may be small.

The thermosetting resin composition used in the present invention may contain thermosetting resin particles, insoluble rubber particles such as core-shell rubber particles, and inorganic fillers such as silica gel, nano-silica, and clay to an extent not impairing the effect of the present invention.

Next, a prepreg and a method for manufacturing a prepreg of the present invention will be described.

In the prepreg of the present invention, the conductive particles or fibers (G) are additionally arranged in a specific mass ratio in the laminated interlayer part including the thermosetting resin (D) containing the thermoplastic resin particles or fibers (F), or the conductive particles or fibers (H) whose thermoplastic resin nucleus or core is covered with a conductive substance are arranged in the laminated interlayer part. A carbon fiber reinforced composite material that has both excellent impact resistance and electrical conductivity in a high level can be thus achieved without a decrease in a carbon fiber content.

In general, the prepreg is a molding intermediate base in which reinforcing fibers are impregnated with a matrix resin. In the present invention, the carbon fibers are used as the reinforcing fibers, whereas the thermosetting resin composition is used as the matrix resin. In the prepreg, the thermosetting resin (D) in the thermosetting resin composition is in an uncured state, and laminating and curing prepregs gives a carbon fiber reinforced composite material. It is understood that the carbon fiber reinforced composite material is also obtained by curing a prepreg monolayer. In the carbon fiber reinforced composite material formed by laminating and curing a plurality of prepregs, the surface part of the prepregs forms into the laminated interlayer part of the carbon fiber reinforced composite material, whereas the inside of the prepregs forms into the inside of the laminated layers of the carbon fiber reinforced composite material.

The prepreg of the present invention can be manufactured by such known methods as disclosed in Japanese Patent Application Laid-open No. H01-26651, Japanese Patent Application Laid-open No. S63-170427, or Japanese Patent Application Laid-open No. S63-170428.

The prepreg of the present invention is prepared by impregnating sizing agent-coated carbon fiber bundles with a thermosetting resin composition as a matrix resin. The prepreg can be prepared, for example, by a wet method of dissolving a thermosetting resin composition in a solvent such as methyl ethyl ketone and methanol to reduce the viscosity and impregnating carbon fiber bundles with the solution and a hot melting method of heating a thermosetting resin composition to reduce the viscosity and impregnating carbon fiber bundles with the resin.

In the wet method, a prepreg is prepared by immersing sizing agent-coated carbon fiber bundles in a solution containing a thermosetting resin composition, then pulling up the carbon fiber bundles, and evaporating the solvent with an oven or other units.

In the hot melting method, a prepreg is prepared by a method of directly impregnating sizing agent-coated carbon fiber bundles with a thermosetting resin composition having a viscosity lowered by heat or a method of once preparing a coating film of a thermosetting resin composition on a release paper or the like, next superimposing the film on each side or one side of sizing agent-coated carbon fiber bundles, and applying heat and pressure to the film to impregnate the sizing agent-coated carbon fiber bundles with the thermosetting resin composition. The hot melting method is preferred because no solvent remains in the prepreg.

The prepreg of the present invention preferably has a carbon fiber mass fraction of 40 to 90% by mass and more preferably 50 to 80% by mass. If the carbon fiber mass fraction is too low, a carbon fiber reinforced composite material to be obtained excessively increases in mass, and thus the advantages of the carbon fiber reinforced composite material being excellent in specific intensity and specific modulus of elasticity may be impaired. If the carbon fiber mass fraction is too high, an impregnation failure of the thermosetting resin composition occurs, a carbon fiber reinforced composite material to be obtained is liable to have many voids, and thus its mechanical characteristics may largely decrease.

In the prepreg of the present invention, it is preferable that the thermoplastic resin particles or fibers (F), the conductive particles or fibers (G), and the conductive particles or fibers (H) whose thermoplastic resin nucleus or core is covered with a conductive substance be all localized in the surface part of the prepreg. In other words, it is preferable that a layer rich in the particles or fibers of (F), (G), and (H), that is, a layer (hereinafter, occasionally referred to as an interlayer formative layer) in which a state in which the particles or fibers of (F), (G), and (H) are localized can be clearly recognized when its cross section is observed be formed in the surface part of the prepreg. Owing to this structure, when the prepregs are laminated, and the matrix resin is cured to form a carbon fiber reinforced composite material, an interlayer in which the particles or fibers of (F), (G), and (H) are localized is formed between the carbon fiber layers. This formation increases the toughness between the carbon fiber layers and enables the particles or fibers of (G) and (H) contained in the interlayer formative layer to form a conductive path between the carbon fiber layers. Thus, a high degree of impact resistance and electrical conductivity are exhibited in the carbon fiber reinforced composite material to be obtained.

FIG. 1 is an example of the sectional view of a representative prepreg of the present invention. The prepreg of the present invention will now be described more specifically with reference to FIG. 1.

This prepreg 100 of the present invention includes a carbon fiber layer 10 mainly containing carbon fibers 1 and a thermosetting resin (epoxy resin) 2 and includes interlayer formative layers 50 that contain no carbon fiber on the surface layers of both principal faces S1, S2 of the prepreg. The interlayer formative layer 50 contains the thermosetting resin 2, thermoplastic resin particles 3, and conductive particles 4. Through the formation of the interlayer formative layers 50, the toughness across the carbon fiber layer 10 increases, and the conductive particles 4 contained in the interlayer formative layers 50 can form a conductive path across the carbon fiber layer 10. High impact resistance and electrical conductivity are thus exhibited in a carbon fiber reinforced composite material obtained by curing the prepreg 100 of the present invention.

From this viewpoint, the interlayer formative layers 50 are preferably present in a depth range of 20%, more preferably 10% from at least one surface of the prepreg 100 relative to 100% thickness of the prepreg 100. From the viewpoint of improving convenience when the carbon fiber reinforced composite material is manufactured, the interlayer formative layers 50 are preferably present on both the front and back sides of the prepreg 100.

The particles or fibers of (F), (G), and (H) are preferably localized in the interlayer formative layers 50 in an amount of 90 to 100% by mass and more preferably 95 to 100% by mass relative to their respective total amounts.

Figure 2:
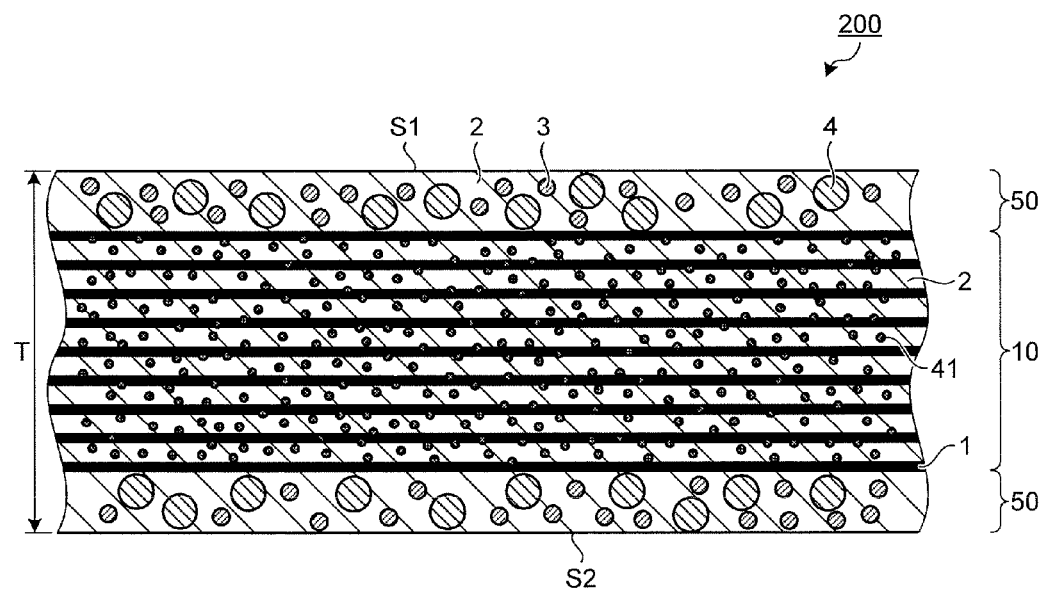
FIG. 2 is an example of the sectional view of a prepreg of a modification of the present invention.

The present invention may be a form as illustrated in FIG. 2. FIG. 2 is a sectional view of a prepreg according to a modification of the present invention.

In this prepreg 200 of the modification, the carbon fiber layer 10 mainly contains the carbon fibers 1, the thermosetting resin (epoxy resin) 2, and second conductive particles 41. The second conductive particles 41 have a particle diameter of 1 μm or less. It is preferable that 90 to 100% by mass of the second conductive particles 41 relative to the total amount of the contained second conductive particles 41 be localized in the carbon fiber layer 10, that is, inside the carbon fibers 1 positioned closest to both principal faces S1, S2 in the thickness direction of the prepreg 200. Preferably 95 to 100% by mass thereof are preferably localized in the carbon fiber layer 10.

The prepreg 200 of the modification of the present invention is preferably manufactured by a method including a process of causing a plurality of carbon fibers 1 arranged in a sheet shape to contain a first resin containing the epoxy resin (D), the latent curing agent (E), and the second conductive particles 41 to obtain a sheet-shaped primary prepreg and a process of arranging a layer of a second resin containing the thermoplastic resin particles or fibers (F), the conductive particles or fibers (G), and the conductive particles or fibers (H) whose thermoplastic resin nucleus or core is covered with a conductive substance on one side or both sides of the primary prepreg.

The first resin and the second resin can be prepared by a normal method that contains and kneads the respective components. In the first resin and the second resin, the components and ratios other than the particles of (F), (G), (H), and (G) may be the same as each other or may be different from each other.

The primary prepreg can be obtained by, for example, a method including a process of applying the first resin onto a substrate such as a release paper to form a film of the first resin and a process of bringing the film of the first resin into contact with one side or both sides of a plurality of carbon fibers arranged in a sheet shape, and applying heat and pressure to impregnate the carbon fibers with the first resin.

The layer of the second resin (mainly the interlayer formative layer) is formed by, for example, a method including a process of applying the second resin onto a substrate such as a release paper to form a film of the second resin and a process of laminating the film of the second resin onto one side or both sides of the primary prepreg.

Although the above modification describes an example in which the second conductive particles 41 are localized in the carbon fiber layer 10, that is not limiting, and the second conductive particles 41 can be contained in the carbon fiber layer 10 mainly containing the carbon fibers 1 and the thermosetting resin (epoxy resin) 2 and the interlayer formative layers 50 that do not contain carbon fibers 1. This structure enables the second conductive particles 41 in the carbon fiber layer 10 to form a conductive path with the carbon fibers 1 and enables the second conductive particles 41 in the interlayer formative layers 50 to form a conductive path between the second conductive particles 41 and the carbon fibers 1 and a conductive path among the conducive particles 4, the second conductive particles 41, and the carbon fibers 1. This structure therefore produces an effect of improving the electrical conductivity of a carbon fiber reinforced composite material to be obtained.

Furthermore, in the prepreg 200 of the above modification, 90 to 100% by mass of the second conductive particles 41 can be contained in the interlayer formative layers 50, not mainly contained in the carbon fiber layer 10. Preferably, 95 to 100% by mass thereof can be contained in the interlayer formative layers 50. This structure enables the second conductive particles 41 in the interlayer formative layers 50 to form a conductive path between the second conductive particles 41 and the carbon fibers 1 and to form a conductive path among the conductive particles 4, the second conductive particles 41, and the carbon fibers 1. This structure therefore produces an effect of improving the electrical conductivity of a carbon fiber reinforced composite material to be obtained.

In the present invention, the thickness of the interlayer formative layer relative to the prepreg and the presence ratio of the particles or fibers of (F), (G), and (H) contained in the interlayer formative layer can be determined by the following method, for example.

Figure 3:
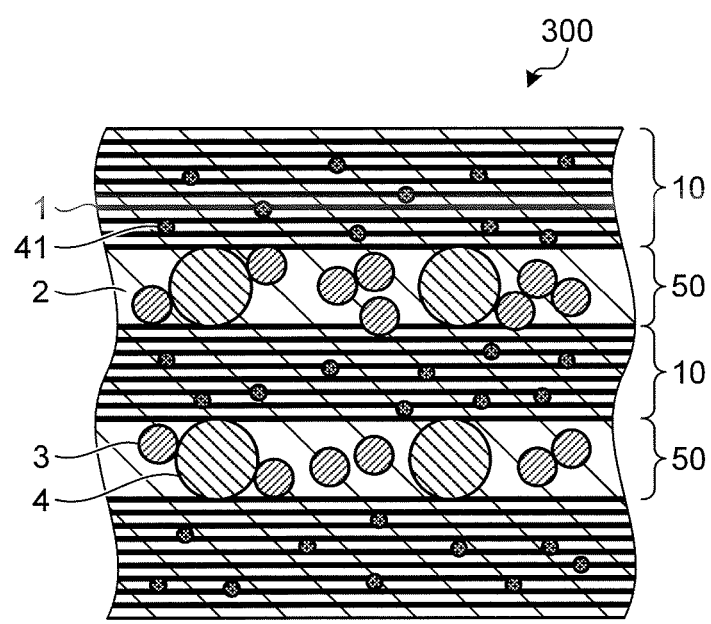
FIG. 3 is a schematic diagram when a cross section of a cured product of the prepreg of the present invention is photographed.

As for the thickness of the interlayer formative layer relative to the prepreg, a plurality of laminated prepregs are held between two polytetrafluoroethylene resin plates having flat surfaces to be brought into intimate contact therewith, and the temperature is gradually raised up to a curing temperature over seven days to cause gelation and curing to produce a plate-shaped prepreg cured product. For this cured prepreg, its cross section is photographed in an enlarged manner. Using this cross section photograph, the thickness of the interlayer formative layer relative to the prepreg is measured. FIG. 3 is a schematic diagram of the cross section photograph of the prepreg cured product in which the prepregs are laminated and cured. Specifically, at least ten arbitrary points are selected from the interlayer formative layer 50 between the carbon fiber layers 10 on a photograph as shown in FIG. 3, the thicknesses at the points are measured, and their average is determined to be the thickness of the interlayer formative layer 50.

As for the presence ratio of particles or fibers of (F), (G), and (H) contained in the interlayer formative layer, a single prepreg layer is held between two polytetrafluoroethylene resin plates having flat surfaces to be brought into intimate contact therewith, and the temperature is gradually raised up to a curing temperature over seven days to achieve gelation and curing to produce a plate-shaped prepreg cured product. On both faces of this prepreg cured product, two lines parallel to the surface of the prepreg are drawn at 20% depth positions in the thickness from the surface of the prepreg cured product. Next, the total area of the particles or fibers present between the surface of the prepreg and the lines and the total area of the particles or fibers present across the thickness of the prepreg are determined, and the presence ratio of particles or fibers present in a depth range of 20% from the surface of the prepreg relative to 100% thickness of the prepreg is calculated. The total area of the particles or fibers is determined by cutting the part of the particles or fibers out of the cross section photograph and performing conversion from the mass of the part. When the determination of the particles dispersed in the resin after photographing is difficult, means dyeing the particles can be employed.

In the present invention, the total amount of the thermoplastic resin particles or fibers (F), the conductive particles or fibers (G), and the conductive particles or fibers (H) whose thermoplastic resin nucleus or core is covered with a conductive substance is preferably in the range of 20% by mass relative to the prepreg. If the total amount of the particles or fibers of (F), (G), and (H) exceeds 20% by mass relative to the prepreg, mixing with the base resin is difficult, and the tuck and drape properties of the prepreg may decrease. In other words, in order to impart impact resistance while maintaining the characteristics of the base resin, the total amount of the particles or fibers of (F), (G), and (H) is preferably 20% by mass or less and more preferably 15% by mass or less relative to the prepreg. In order to further improve the handling of the prepreg, the total amount is even more preferably 10% by mass or less. In order to obtain high impact resistance and electrical conductivity, the total amount of the particles or fibers of (F), (G), and (H) is preferably 1% by mass or more and more preferably 2% by mass or more relative to the prepreg.

The carbon fiber reinforced composite material of the present invention has a laminated structure including two or more prepregs of the present invention. Although the carbon fiber reinforced composite material may include a layer derived from a prepreg other than the prepreg of the present invention, it preferably includes only the prepreg of the present invention. "The prepreg of the present invention" included in the carbon fiber reinforced composite material includes a prepreg obtained by the method of manufacture of the present invention.

The carbon fiber reinforced composite material can be manufactured by a method including a process of forming a laminate including two or more prepregs of the present invention and a process of heating and pressurizing the laminate and curing the first resin and the second resin in the laminate. In the laminate, at least two prepregs among the two or more prepregs of the present invention are laminated adjacent to each other.

The method for forming a carbon fiber reinforced composite material by using the prepreg of the present invention is exemplified by a method of stacking prepregs and thermally curing a thermosetting resin while applying pressure to the laminate.

Examples of the method of applying heat and pressure include press molding, autoclave molding, bagging molding, a wrapping tape method, and internal pressure molding method. To specifically produce sporting goods, the wrapping tape method and the internal pressure molding method are preferably employed. For aircraft application necessitating a high quality and high performance carbon fiber reinforced composite material, the autoclave molding is preferably employed. To produce various vehicle exteriors, the press molding is preferably employed.

In the present invention, in addition to the method of using a prepreg, a carbon fiber reinforced composite material can be produced by any molding method such as a hand lay-up method, RTM, "SCRIMP" (registered trademark), filament winding, a pultrusion method, and a resin film infusion method, which are appropriately selected for a purpose. Any of the molding method can be employed to produce a carbon fiber reinforced composite material containing the sizing agent-coated carbon fibers and a cured product of the thermosetting resin composition.

The carbon fiber reinforced composite material of the present invention is preferably used for aircraft structural members, windmill blades, automotive outer panel, computer applications such as IC trays and casings (housings) of notebook computers, and sporting goods such as golf shafts, bats, and rackets for tennis and badminton.

EXAMPLES

The present invention will next be specifically described with reference to examples, but the invention is not limited to these examples. The production environment and evaluation of the prepregs of the examples were performed in an atmosphere of a temperature of 25±2° C. and 50% RH (relative humidity) unless otherwise specified.

(1) X-Ray Photoelectron Spectroscopy for Sizing Agent Surface of Sizing Agent-Coated Carbon Fibers In the present invention, the peak ratio of (a) and (b) on the surface of a sizing agent of sizing agent-coated carbon fibers was determined by X-ray photoelectron spectroscopy in accordance with the procedure below. Sizing agent-coated carbon fibers were cut into 20-mm pieces, and the pieces were spread and arranged on a copper sample holder. $AlK\alpha_{1,2}$ was used as the X-ray source, and the measurement was carried out while the inside of a sample chamber was maintained at $1\times10^{-8}$ Torr. The measurement was carried out at a photoelectron takeoff angle of 15°. As the correction for the peak associated with electrification during measurement, the binding energy value of the main peak of $C_{1s}$ was set to 286.1 eV, first. At this time, the $C_{1s}$ peak area was determined by drawing a straight base line in a range from 282 to 296 eV. The straight base line from 282 to 296 eV for calculating the $C_{1s}$ peak area was defined as the origin point (zero point) for photoelectron intensity, the height (b) (cps: photoelectron intensity per unit time) of the peak at a binding energy of 286.1 eV assigned to a C—O component and the height (a) (cps) of the component at a binding energy of 284.6 eV assigned to CHx, C—C, and C=C were determined, and the (a)/(b) ratio was calculated.

If the peak height (b) is larger than the peak height (a) where the binding energy value of the main peak of $C_{1s}$ is set to 286.1, peaks of $C_{1s}$ do not fall within a range of 282 to 296 eV. In such a case, the binding energy value of the main peak of $C_{1s}$ was set to 284.6 eV, and then the (a)/(b) ratio was calculated in accordance with the procedure above.

(2) Washing of Sizing Agent of Sizing Agent-Coated Carbon Fibers

In 50 ml of acetone, 2 g of sizing agent-coated carbon fibers were immersed and subjected to ultrasonic cleaning for 30 minutes three times. Subsequently, the carbon fibers were immersed in 50 ml of methanol and subjected to ultrasonic cleaning for 30 minutes once, and were dried.

(3) X-Ray Photoelectron Spectroscopy of Sizing Agent-Coated Carbon Fibers at 400 eV In the present invention, the peak ratio of (a) and (b) on the surface of a sizing agent of sizing agent-coated carbon fibers was determined by X-ray photoelectron spectroscopy in accordance with the procedure below. Sizing agent-coated carbon fibers and sizing agent-coated carbon fibers from which the sizing agent was washed were cut into 20-mm pieces, and the pieces were spread and arranged on a copper sample holder. Saga synchrotron radiation was used as an X-ray source, and the measurement was carried out at an excitation energy of 400 eV while the inside of a sample chamber was maintained at $1\times10^{-8}$ Torr. The measurement was carried out at a photoelectron takeoff angle of 55°. As the correction for the peak associated with electrification during measurement, the binding energy value of the main peak of $C_{1s}$ was set to 286.1 eV, first. At this time, the $C_{1s}$ peak area was determined by drawing a straight base line in a range from 282 to 296 eV. The straight base line from 282 to 296 eV for calculating the $C_{1s}$ peak area was defined as the origin point (zero point) for photoelectron intensity, the height (b) (cps: photoelectron intensity per unit time) of the peak at a binding energy of 286.1 eV assigned to a C—O component and the height (a) (cps) of the component at a binding energy of 284.6 eV assigned to CHx, C—C, and C=C were determined, and the (a)/(b) ratio was calculated.

If the peak height (b) is larger than the peak height (a) where the binding energy value of the main peak of $C_{1s}$ is set to 286.1, peaks of $C_{1s}$ do not fall within a range of 282 to 296 eV. In such a case, the binding energy value of the main peak of $C_{1s}$ was set to 284.6 eV, and then the (a)/(b) ratio was calculated in accordance with the procedure above.

(4) Strand Tensile Strength and Elastic Modulus of Carbon Fiber Bundles

The strand tensile strength and the strand elastic modulus of carbon fiber bundles were determined by the test method of resin-impregnated strand described in JIS-R-7608 (2004) in accordance with the procedure below. The resin formulation was "Celloxide (registered trademark)" 2021P (manufactured by Daicel Chemical Industries, Ltd.)/boron trifluoride monoethylamine (manufactured by Tokyo Chemical Industry Co., Ltd.)/acetone=100/3/4 (parts by mass), and the curing conditions were at normal pressure at a temperature of 125° C. for 30 minutes. Ten strands of carbon fiber bundles were tested, and mean values were calculated as the strand tensile strength and the strand elastic modulus.

(5) Surface Oxygen Concentration (O/C) of Carbon Fibers

The surface oxygen concentration (O/C) of carbon fibers was determined by X-ray photoelectron spectroscopy in accordance with the procedure below. First, a solvent was used to remove dust adhering to the surface of carbon fibers, then the carbon fibers were cut into about 20-mm pieces, and the pieces were spread on a copper sample holder. Next, the sample holder was set in a sample chamber, and the inside of the sample chamber was maintained at $1\times10^{-8}$ Torr. $AlK\alpha_{1,2}$ was used as the X-ray source, and the measurement was carried out at a photoelectron takeoff angle of 90°. As the correction value of the peak associated with electrification during measurement, the binding energy value of the main peak (peak top) of $C_{1s}$ was set to 284.6 eV. The $C_{1s}$ peak area was determined by drawing a straight base line in a range from 282 to 296 eV. The $O_{1s}$ peak area was determined by drawing a straight base line in a range from 528 to 540 eV. Here, the surface oxygen concentration is determined as an atom number ratio, using a sensitivity correction value inherent in an apparatus, from the ratio of the $O_{1s}$ peak area and the $C_{1s}$ peak area. The X-ray photoelectron spectrometer used was ESCA-1600 manufactured by Ulvac-Phi, Inc., and the sensitivity correction value inherent in the apparatus was 2.33.

(6) Surface Carboxy Group Concentration (COOH/C) and Surface Hydroxy Group Concentration (COH/C) of Carbon Fibers A surface hydroxy group concentration (COH/C) was determined by chemical modification X-ray photoelectron spectroscopy in accordance with the procedure below.

First, carbon fiber bundles from which a sizing agent and the like had been removed with a solvent were cut into pieces, and the pieces were spread and arranged on a platinum sample holder. The pieces were exposed to a dry nitrogen gas containing 0.04 mol/L of trifluoroacetic anhydride gas at room temperature for 10 minutes, undergoing chemical modification treatment. Then, the treated pieces were mounted on an X-ray photoelectron spectrometer at a photoelectron takeoff angle of 35°. $AlK\alpha_{1,2}$ was used as the X-ray source, and the inside of the sample chamber was maintained at a degree of vacuum of $1\times10^{-8}$ Torr. As the correction for the peak associated with electrification during measurement, the binding energy value of the main peak of $C_{1s}$ was set to 284.6 eV, first. The $C_{1s}$ peak area $[C_{1s}]$ was determined by drawing a straight base line in a range from 282 to 296 eV, and $F_{1s}$ peak area $[F_{1s}]$ was determined by drawing a straight base line in a range from 682 to 695 eV. The reaction rate r was determined from $C_{1s}$ peak splitting of polyvinyl alcohol simultaneously subjected to chemical modification treatment.

The surface hydroxy group concentration (COH/C) is expressed by the value calculated in accordance with the equation below.

COH/C={[$F_{1s}$]/(3k[$C_{1s}$]−2[$F_{1s}$])r}×100(%)

In the equation, k is a sensitivity correction value inherent in the apparatus for the $F_{1s}$ peak area relative to the $C_{1s}$ peak area, and the sensitivity correction value inherent in the apparatus was 3.919 for model SSX-100-206 manufactured by SSI, USA.

A surface carboxy group concentration (COOH/C) was determined by chemical modification X-ray photoelectron spectroscopy in accordance with the procedure below. First, carbon fiber bundles from which a sizing agent and the like had been removed with a solvent were cut into pieces, and the pieces were spread and arranged on a platinum sample holder. The pieces were exposed to air containing 0.02 mol/L of trifluoroethanol gas, 0.001 mol/L of dicyclohexylcarbodiimide gas, and 0.04 mol/L of pyridine gas at 60° C. for 8 hours, undergoing chemical modification treatment. Then, the treated pieces were mounted on a X-ray photoelectron spectrometer at a photoelectron takeoff angle of 35°. AlKα$_{1,2}$ was used as the X-ray source, and the inside of the sample chamber was maintained at a degree of vacuum of $1 \times 10^{-8}$ Torr. As the correction for the peak associated with electrification during measurement, the binding energy value of the main peak of $C_{1s}$ was set to 284.6 eV, first. The $C_{1s}$ peak area [$C_{1s}$] was determined by drawing a straight base line in a range from 282 to 296 eV, and the $F_{1s}$ peak area [$F_{1s}$] was determined by drawing a straight base line in a range from 682 to 695 eV. The reaction rate r was determined from $C_{1s}$ peak splitting of polyacrylic acid simultaneously subjected to chemical modification treatment, and the residual rate m of a dicyclohexylcarbodiimide derivative was determined from $O_{1s}$ peak splitting.

The surface carboxy group concentration COOH/C is expressed by the value calculated in accordance with the equation below.

COOH/C={[$F_{1s}$]/(3k[$C_{1s}$]−(2+13m)[$F_{1s}$])r}×100(%)

In the equation, k is a sensitivity correction value inherent in the apparatus for the $F_{1s}$ peak area relative to the $C_{1s}$ peak area, and the sensitivity correction value inherent in the apparatus was 3.919 for model SSX-100-206 manufactured by SSI, USA.

(7) Epoxy Equivalent of Sizing Agent and Epoxy Equivalent of Sizing Agent Applied onto Carbon Fibers The epoxy equivalent of a sizing agent was determined by dissolving a sizing agent from which a solvent was removed in N,N-dimethylformamide, then cleaving the epoxy group with hydrochloric acid, and carrying out acid-base titration. The epoxy equivalent of a sizing agent applied onto carbon fibers was determined by immersing sizing agent-coated carbon fibers in N,N-dimethylformamide, carrying out ultrasonic cleaning to extract the sizing agent from the fibers, then cleaving the epoxy group with hydrochloric acid, and carrying out acid-base titration.

(8) Increase in Glass Transition Point

A sizing agent and the latent curing agent (E) were mixed so as to give an amine equivalent/epoxy equivalent ratio of 0.9, and the glass transition temperature of the prepared mixture was determined with a differential scanning calorimeter (DSC) in accordance with JIS K7121 (1987). Into a sealable sample container having a volume of 50 μl, 3 to 10 mg of a sample (test piece) was charged, then the temperature was raised at a rate of temperature rise of 10° C./min from 30 to 350° C., and the glass transition temperature was determined. The measurement equipment used here was a differential scanning calorimeter (DSC) manufactured by TA Instruments.

Specifically, in a steplike change area in the DSC curve obtained, a temperature at the intersection point of a straight line vertically equidistant from straight lines extending from base lines, and a curve in the steplike change area of glass transition was regarded as the glass transition temperature.

Next, the prepared mixture was stored in an environment at a temperature of 25° C. and 60% RH for 20 days, and the glass transition temperature was determined by the procedure above. An increase in temperature from the initial state was regarded as the increase in glass transition point (corresponding to "ΔTg with a curing agent" in Tables).

(9) Method of Determining Adhesion Amount of Sizing Agent

About 2 g of sizing agent-coated carbon fiber bundles were weighed (W1) (to the fourth decimal place) and then placed in an electric furnace (a volume of 120 cm$^3$) set at a temperature of 450° C. for 15 minutes in a nitrogen stream of 50 mL/min, and consequently the sizing agent was completely thermally decomposed. Next, the carbon fiber bundles were transferred into a container in a dry nitrogen stream of 20 L/min, then cooled for 15 minutes, and weighed (W2) (to the fourth decimal place). The adhesion amount of the sizing agent was calculated in accordance with the equation, W1-W2. The adhesion amount of the sizing agent was converted into a value (round off the number to the second decimal place) relative to 100 parts by mass of the carbon fiber bundles to be parts by mass of the sizing agent coated. The measurement was carried out twice, and the mean value was regarded as the parts by mass of the sizing agent.

(10) Measurement of Interfacial Shear Strength (IFSS)

The interfacial shear strength (IFSS) was determined in accordance with the procedures (I) to (IV).

(I) Preparation of Resin

Into corresponding containers, 100 parts by mass of bisphenol A epoxy compound "jER (registered trademark)" 828 (manufactured by Mitsubishi Chemical Corporation) and 14.5 parts by mass of m-phenylenediamine (manufactured by Sigma-Aldrich Japan) were placed. Then, in order to reduce the viscosity of jER828 and to dissolve m-phenylenediamine, each was heated at a temperature of 75° C. for 15 minutes. Then, both were mixed, and the mixture was degassed in vacuo at a temperature of 80° C. for about 15 minutes.

(II) Fixation of Single Carbon Fiber onto Special Mold

From carbon fiber bundles, a single fiber was taken out, and both ends of the single fiber were fixed onto the longitudinal ends of a dumbbell mold while a constant tension was applied to the single fiber. Then, in order to remove water on the carbon fiber and the mold, the single fiber and the mold were subjected to vacuum drying at a temperature of 80° C. for 30 minutes or more. The dumbbell mold was made of silicone rubber and had a cast molding shape with a central width of 5 mm, a length of 25 mm, an end width of 10 mm, and a total length of 150 mm.

(III) From Casting to Curing of Resin

Into the mold after vacuum drying in accordance with the procedure (II), the resin prepared in accordance with the procedure (I) was cast. By using an oven, the temperature of the mold was raised at a rate of temperature rise of 1.5°

C./min to 75° C., and the temperature was maintained for 2 hours. Next, the temperature was raised at a rate of temperature rise of 1.5° C./min to 125° C., and the temperature was maintained for 2 hours. Then, the temperature was dropped at a rate of temperature drop of 2.5° C./min to 30° C. Subsequently, the mold was removed to give a test piece.

(IV) Measurement of Interfacial Shear Strength (IFSS)

To the test piece obtained in the procedure (III), a tensile force was applied in a fiber axis direction (longitudinal direction) to cause a distortion of 12%, and the number N of fiber breakages was determined in a central region of 22 mm on the test piece. Next, an average length of broken fibers la was calculated in accordance with the equation, la (μm)=22× 1,000 (μm)/N. Then, from the average length of broken fibers la, a critical fiber length lc was calculated in accordance with the equation, lc (μm)=(4/3)×la (μm). The strand tensile strength σ and the diameter d of a single carbon fiber were determined, and an interfacial shear strength, IFSS, was calculated as an index of the adhesive strength between carbon fibers and a resin interface in accordance with the equation below. In Examples, the test result was the average of results of the measurement number n=5.

Interfacial shear strength IFSS(MPa)=σ(MPa)×$d$ (μm)/(2×$lc$)(μm)

(11) Definition of 0° of Carbon Fiber Reinforced Composite Material

As described in JIS K7017 (1999), the fiber direction of a unidirectional carbon fiber reinforced composite material is regarded as an axis direction; the axis direction is defined as a 0° axis; and a direction orthogonal to the axis is defined as 90°.

(12) Measurement of 0° Tensile Strength of Carbon Fiber Reinforced Composite Material A unidirectional prepreg within 24 hours after preparation was cut into pieces with a predetermined size, and six prepreg pieces were stacked in one direction. The stacked prepreg pieces were subjected to vacuum bagging and cured at a temperature of 180° C. and a pressure of 6 kg/cm$^2$ for 2 hours in an autoclave, thus yielding a unidirectional reinforced material (carbon fiber reinforced composite material). The unidirectional reinforced material was cut into a piece with a width of 12.7 mm and a length of 230 mm, and to each end, a glass fiber-reinforced plastic tab with 1.2 mm and a length of 50 mm was bonded, thus yielding a test piece. The test piece obtained in this manner was subjected to a tensile test at a crosshead speed of 1.27 mm/min with a universal tester manufactured by Instron.

In the present invention, the 0° tensile strength value was divided by the strand strength value determined in (B) to indicate a strength translation rate (%) in accordance with the equation below.

Strength translation rate=tensile strength/((CF areal weight/190)×Vf/100×strand strength)×100

CF (carbon fiber) areal weight=190 g/m$^2$
Vf (volume fraction of carbon fiber)=56%

(13) Decreasing Rate of 0° Tensile Strength of Prepreg after Storage

A prepreg was stored at a temperature of 25° C. and 60% RH for 20 days, and then the 0° tensile strength was measured in the same manner as in (12) to calculate strength translation rate.

(14) Presence Ratio of Particles Present in Depth Range of 20% of Thickness of Prepreg The prepreg was held between two polytetrafluoroethylene resin plates having flat surfaces to be brought into intimate contact therewith, and the temperature was gradually raised up to 150° C. over seven days to cause gelation and curing to produce a plate-shaped resin cured product. After being cured, the resin cured product was cut from a direction perpendicular to the intimate contact surface. The cross section was polished, was magnified 200 times or more by an optical microscope, and was photographed so that the upper and lower faces of the prepreg were within the field of view. By similar operation, the spacing between the polytetrafluoroethylene resin plates was measured at five points in the lateral direction of the cross section photograph, and its average value (n=5) was determined to be the thickness of the prepreg. For both faces of the prepreg, two lines parallel to the surface of the prepreg were drawn at 20% depth positions in the thickness from the surface of the prepreg. Next, the total area of the particles present between the surface of the prepreg and the lines and the total area of the particles present across the thickness of the prepreg were determined, and the presence ratio of the particles present in a depth range of 20% from the surface of the prepreg relative to 100% thickness of the prepreg was calculated. The total area of the particles was determined by cutting the part of the particles out of the cross section photograph and performing conversion from the mass of the part.

(15) Measurement of Average Particle Diameter or Average Fiber Diameter of Thermoplastic Resin Particles or Fibers (F), Conductive Particles or Fibers (G), Conductive Particles or Fibers (H) Whose Thermoplastic Resin Nucleus or Core is Covered with Conductive Substance, and Second Conductive Particles (I)

As for the average particle diameter of the particles, the particles were magnified 1,000 times or more by a microscope such as a scanning electron microscope and were photographed, the particles were randomly selected, the diameter of a circle circumscribing each of the particles was determined to be a particle diameter, and the average of the particle diameter (n=50) was determined to be the average diameter.

As for the average diameter (average fiber diameter) of the fibers, fiber cross sections were magnified 1,000 times or more by a microscope such as a scanning electron microscope and are photographed, the fiber cross sections are randomly selected, the diameter of a circle circumscribing each of the fiber cross sections was determined to be a fiber diameter, and the average of the fiber diameter (n=50) was determined to be the average diameter.

(16) Measurement of Compression after Impact of Carbon Fiber Reinforced Composite Material Unidirectional prepregs were laminated in 24 plies in a pseudo-isotropic manner with a configuration of [+45°/0°/−45°/90°]$_3$S and were molded at a temperature of 180° C. for two hours under a pressure of 0.59 MPa at a temperature rising rate of 1.5° C./minute by an autoclave to produce a pseudo-isotropic material (a carbon fiber reinforced composite material). A sample 150 mm long and 100 mm wide (4.5 mm thick) was cut out of the pseudo-isotropic material, and in compliance with SACMA SRM 2R-94, a drop-weight impact of 6.7 J/mm was applied to the central part of the sample, and compression after impact was determined.

(17) Measurement of Electrical Conductivity of Carbon Fiber Reinforced Composite Material Unidirectional prepregs were laminated in 24 plies in a pseudo-isotropic manner with each configuration of [+45°/0°/−45°/90°]$_{3S}$ and were molded at a temperature of 180° C. for two hours under a pressure of 0.59 MPa at a temperature rising rate of 1.5° C./minute by an autoclave to produce laminates. Samples 50 mm long and 50 mm wide were cut out of the respective laminates, and samples whose both faces were coated with a conductive paste "Dotite (registered trademark)" D-550 (manufactured by Fujikura Kasei Co., Ltd.) were produced. For these samples, resistance in the lamination direction was measured by the four-probe method to determine volume resistivity using R6581 Digital Multimeter manufactured by Advantest Corporation.

(18) Measurement of Volume Resistivity of Conductive Particles or Fibers

Using a powder resistance measuring system of the MCP-PD51 type manufactured by Dia Instruments Co., Ltd., a sample was set in a cylindrical cell having four-probe electrodes, the thickness and resistance value of the sample were measured with a pressure of 60 MPa applied to the sample, and then volume resistivity was calculated from those values.

The materials and the components shown below were used in each example and each comparative example.

Component (A): A-1 to A-3

A-1: "Denacol (registered trademark)" EX-810 (manufactured by Nagase ChemteX Corporation)

Diglycidyl ether of ethylene glycol
Epoxy equivalent: 113 g/eq., the number of epoxy groups: 2

A-2: "Denacol (registered trademark)" EX-611 (manufactured by Nagase ChemteX Corporation)

Sorbitol polyglycidyl ether
Epoxy equivalent: 167 g/eq., the number of epoxy groups: 4
The number of hydroxy groups: 2

A-3: "Denacol (registered trademark)" EX-521 (manufactured by Nagase ChemteX Corporation)

Polyglycerin polyglycidyl ether
Epoxy equivalent: 183 g/eq., the number of epoxy groups: 3 or more Component (B1): B-1 to B-4

B-1: "jER (registered trademark)" 152 (manufactured by Mitsubishi Chemical Corporation)

Glycidyl ether of phenol novolac
Epoxy equivalent: 175 g/eq., the number of epoxy groups: 3

B-2: "jER (registered trademark)" 828 (manufactured by Mitsubishi Chemical Corporation)

Diglycidyl ether of bisphenol A
Epoxy equivalent: 189 g/eq., the number of epoxy groups: 2

B-3: "jER (registered trademark)" 1001 (manufactured by Mitsubishi Chemical Corporation)

Diglycidyl ether of bisphenol A
Epoxy equivalent: 475 g/eq., the number of epoxy groups: 2

B-4: "jER (registered trademark)" 807 (manufactured by Mitsubishi Chemical Corporation)

Diglycidyl ether of bisphenol F
Epoxy equivalent: 167 g/eq., the number of epoxy groups: 2

(D) Epoxy resin component: D-1 and D-2

D-1: bisphenol A epoxy resin, "Epikote (registered trademark)" 825 (manufactured by Japan Epoxy Resin Co., Ltd.)
D-2: tetraglycidyldiaminodiphenylmethane, ELM434 (manufactured by Sumitomo Chemical Co., Ltd.)

(E) Latent curing agent component

"SEIKACURE" (registered trademark)-S (4,4'-diaminodiphenyl sulfone, manufactured by Wakayama Seika Kogyo Co., Ltd.)

(F) Thermoplastic resin particles or fibers: F-1 to F-3

F-1: Nylon 12 particles SP-10 (manufactured by Toray Industries Inc., shape: spherical, average particle diameter: 10.2 μm)

F-2: Epoxy-modified nylon particles A produced by the following method of manufacture:

To a mixed solvent of 300 parts by weight of chloroform and 100 parts by weight of methanol were added 90 parts by weight of transparent polyamide (trade name "Grilamid (registered trademark)"-TR55, manufactured by Emser Werke AG), 7.5 parts by weight of an epoxy resin (trade name "Epikote (registered trademark)" 828, manufactured by Yuka Shell Epoxy Co. Ltd.), and 2.5 parts by weight of a curing agent (trade name "Tomide (registered trademark)" #296, manufactured by Fuji Kasei Kogyo Kaisha, Ltd.) to obtain a uniform solution. Next, the obtained uniform solution was atomized using a spray gun for coating, was well stirred, and was sprayed onto the liquid surface of 3,000 parts by weight of n-hexane to precipitate a solute. The precipitated solute was filtered off, was well washed with n-hexane, and was vacuum-dried for 24 hours at 100° C. to obtain spherical epoxy-modified nylon particles A.

The epoxy-modified nylon particles A were press-molded to be formed into a resin plate, and the $G_{1C}$ value by the compact tension method was measured based on ASTM D 5045-96 to be 4,420 J/m$^2$. The average particle diameter was 12.5 μm.

F-3: TR-55 short fibers obtained by the following method of manufacture:

A fiber of transparent polyamide (trade name "Grilamid (registered trademark)" TR55, manufactured by Emser Werke AG) discharged from a spinneret having one orifice was cut to obtain a TR-55 short fiber (fiber length 1 mm) having circular cross section. TR-55 was press-molded to be formed into a rein plate, and the $G_{10}$ value by the compact tension method was measured based on ASTM D 5045-96 to be 4,540 J/m$^2$. The average fiber diameter was 5.4 μm.

(G) Conductive particles or fibers: G-1 to G-7

G-1: "Micropearl (registered trademark)" AU215, particles produced by plating divinylbenzene polymer particles with nickel and further plating the particles with gold (manufactured by Sekisui Chemical Co., Ltd., shape: spherical, specific gravity: 1.8 g/cm$^3$, the thickness of the conductive layer: 110 nm, [the volume of the core]/[the volume of the conductive layer]: 22.8, average particle diameter: 15.5 μm, volume resistivity: $1.4 \times 10^{-3}$ Ωcm)

G-2: "Micropearl (registered trademark)" AU225, particles produced by plating divinylbenzene polymer particles with nickel and further plating the particles with gold (manufactured by Sekisui Chemical Co., Ltd., shape: spherical, specific gravity: 2.4 g/cm$^3$, the thickness of the conductive layer: 200 nm, [the volume of the core]/[the volume of the conductive layer]: 20.2, average particle diameter: 25.0 μm, volume resistivity: $1.6 \times 10^{-3}$ Ωcm)

G-3: Glassy carbon particles "Bellpearl (registered trademark)" C-2000 (manufactured by Air Water Inc., shape: spherical, specific gravity: 1.5 g/cm$^3$, average particle diameter: 15.3 μm, volume resistivity: $2.0 \times 10^{-2}$ Ωcm)

G-4: Carbon particles "NICABEADS" (registered trademark) ICB-2020 (manufactured by Nippon Carbon Co., Ltd., shape: spherical, specific gravity: 1.5 g/cm$^3$, average particle diameter: 26.69 μm, volume resistivity: $2.5 \times 10^{-2}$ Ωcm)

G-5: Conductive particles A obtained by the following method of manufacture:

One hundred grams of the epoxy-modified nylon particles A was added to 1,000 ml of an electroless copper plating solution MK-430 (manufactured by Muromachi Chemicals Inc.). Next, plating treatment was performed at 50° C. for 45 minutes to produce conductive particles A. As for the conductive particles A, the shape was spherical, the specific gravity was 1.4 g/cm³, the thickness of the conductive layer was 120 nm, and [the volume of the nucleus]/[the volume of the conductive layer] was 17.0. The average particle diameter was 12.7 μm. The volume resistivity was $4.5 \times 10^{-4}$ Ωcm. The conductive particles A are the conductive particles or fibers (G) and correspond to the conductive particles or fibers (H) whose thermoplastic resin nucleus or core is covered with a conductive substance.

G-6: Surface-treated particles B of "Micropearl (registered trademark)" AU215 obtained by the following method of manufacture:

Two parts by weight of 3-(phenylamino) propyltrimethoxysilane was sprayed onto 100 parts by weight of "Micropearl (registered trademark)" AU215 while being stirred, and heat treatment at 100° C. for 12 hours gave a surface-treated product I of "Micropearl (registered trademark)" AU215. The average particle diameter was 15.5 μm. The volume resistivity was $1.4 \times 10^{-3}$ Ωcm.

G-7: "Torayca (registered trademark)" milled fiber MLD-30 (manufactured by Toray Industries Inc., sectional shape: spherical, specific gravity: 1.8 g/cm³, fiber length: 30 μm, volume ratio: 7.2 μm, volume resistivity: $6.6 \times 10^{-2}$ Ωcm)

Second conductive particles (I) (conductive particles having an average particle diameter of 1 μm or less)

I-1: Mitsubishi carbon black #3230B (carbon black, manufactured by Mitsubishi Chemical Corporation, particle diameter: 35 nm)

Another component (thermoplastic resin): polyether sulfone having a hydroxy group at its terminal "SUMIKAEXCEL (registered trademark)" PES5003P (manufactured by Sumitomo Chemical Co., Ltd.)

Example 1

Example includes Process I, Process II, and Process III.

Process I

Process for Producing Carbon Fibers as Raw Material

A copolymer made from 99% by mol of acrylonitrile and 1% by mol of itaconic acid was spun and burned to give carbon fibers having a total filament number of 24,000, a total fineness of 1,000 tex, a specific gravity of 1.8, a strand tensile strength of 5.9 GPa, and a strand tensile elastic modulus of 295 GPa. Next, the carbon fibers were subjected to electrolytic surface treatment using an aqueous ammonium hydrogen carbonate solution having a concentration of 0.1 mol/L as an electrolytic solution at a quantity of electricity of 80 coulomb per gram of carbon fibers. The electrolytic surface-treated carbon fibers were subsequently washed with water and dried in hot air at a temperature of 150° C. to yield carbon fibers as a raw material. At this time, the surface oxygen concentration O/C was 0.15, the surface carboxylic acid concentration COOH/C was 0.005, and the surface hydroxy group concentration COH/C was 0.018. The obtained carbon fibers were regarded as carbon fibers A.

Process II

Process for Bonding Sizing Agent to Carbon Fibers

An aqueous dispersion emulsion containing 20 parts by mass of (B-1) as a component (B1), 20 parts by mass of a component (C), and 10 parts by mass of an emulsifier was produced, and then 50 parts by mass of (A-3) was mixed as the component (A) to produce a sizing solution. The component (C) used was a condensate of 2 mol of an adduct of bisphenol A with 2 mol of EO, 1.5 mol of maleic acid, and 0.5 mol of sebacic acid, and the emulsifier used was polyoxyethylene (70 mol) styrenated (5 mol) cumylphenol. Both the component (C) and the emulsifier are aromatic compounds and correspond to the component (B). The epoxy equivalent of the sizing agent except the solutions in the sizing solution is as shown in Table 1. The sizing agent was applied onto surface-treated carbon fibers by immersing. The coated carbon fibers were then treated with heat at a temperature of 210° C. for 75 seconds to yield sizing agent-coated carbon fiber bundles. The adhesiveness amount of the sizing agent was adjusted so as to be 1.0% by mass relative to 100 parts by mass of the sizing agent-coated carbon fibers. Subsequently, the epoxy equivalent of the sizing agent, the X-ray photoelectron spectrum of the sizing agent surface, the interfacial shear strength (IFSS) of the sizing agent-coated carbon fibers, and the temperature increase of glass transition point (ΔTg) of a mixture of the sizing agent and a latent curing agent (E) were determined. The results are listed in Table 1. The result indicated that all of the epoxy equivalent of the sizing agent, the chemical composition of the sizing agent surface, ΔTg, and the extraction amount of the aliphatic epoxy compound (A) were as expected. The IFSS measurement also revealed a sufficiently high adhesiveness.

Process III

Production, Molding, and Evaluation of Unidirectional Prepreg

In a kneader, 40 parts by mass of (D-1) and 40 parts by mass of (D-2) as the thermosetting resin components (D) and 10 parts by mass of PES5003P as a thermoplastic resin were mixed, and the whole was dissolved. Then, 40 parts by mass of 4,4'-diaminodiphenyl sulfone (E-1) as a curing agent component (E) was kneaded, producing a primary epoxy resin composition except the thermoplastic resin particles (F) and the conductive particles (G). The obtained primary resin composition was applied onto a release paper with a knife coater so as to give a resin pass per unit area of 32 g/m², thus yielding a primary resin film. The primary resin film was superimposed on each side of sizing agent-coated carbon fibers (an areal weight of 190 g/m²) arranged in one direction, and heat and pressure were applied with a heat roll at a temperature of 100° C. and a pressure of 1 atm to impregnate the sizing agent-coated carbon fibers with the thermosetting resin composition, thus yielding a primary prepreg. Next, a secondary resin composition produced by adding (F-2) as the thermoplastic resin particles (F) and (G-3) as the conductive particles (G) so that the thermoplastic resin composition of a final prepreg for a carbon fiber reinforced composite material has the amounts listed in Table 1 was applied onto a release paper so as to give a resin pass per unit area of 20 g/m², thus yielding a secondary resin film. The secondary resin film was superimposed on each side of the first prepreg, and heat and pressure were applied with a heat roll at a temperature of 100° C. and a pressure of 1 atm to impregnate with a thermosetting resin composition for a carbon fiber reinforced composite material, thus yielding a target prepreg. Using the obtained prepreg, the 0° tensile strength test and 0° tensile test after long-term storage of the carbon finer reinforced composite material and the measurement of compression after impact and the volume resistivity of the carbon finer reinforced composite material were performed and measured. Table 1 shows the results. The result revealed a sufficiently high 0° tensile strength translation rate and a sufficiently low volume resistivity at the initial state and a small decrease in the tensile strength translation rate after 20 days.

Examples 2 to 8

Process I

Process for Producing Carbon Fibers as Raw Material

Carbon fibers were produced in the same manner as in Example 1.

Process II

Process for Bonding Sizing Agent to Carbon Fibers

Sizing agent-coated carbon fibers were obtained in the same manner as in Example 1 except that the component (A) and the component (B1) shown in Table 1 were used as the sizing agent. Subsequently, the epoxy equivalent of the sizing agent, the X-ray photoelectron spectrum of the sizing agent surface, and the interfacial shear strength (IFSS) and ΔTg of the sizing agent-coated carbon fibers were determined. All of the epoxy equivalent of the sizing agent, the chemical composition of the sizing agent surface, and ΔTg were as expected, and the IFSS measurement also revealed a sufficiently high adhesiveness. Table 1 shows the results.

Process III

Production, Molding, and Evaluation of Unidirectional Prepreg

A prepreg was produced, molded, and evaluated in the same manner as in Example 1. The result revealed a sufficiently high 0° tensile strength translation rate and a sufficiently low volume resistivity at the initial state and a small decrease in the tensile strength translation rate after 20 days.

TABLE 1

| | | | Example 1 | Example 2 | Example 3 | Example 4 | Example 5 | Example 6 | Example 7 | Example 8 |
|---|---|---|---|---|---|---|---|---|---|---|
| Carbon fibers | | Carbon fibers | A | A | A | A | A | A | A | A |
| Sizing agent | (A) | EX-810 | | | | | | 50 | | |
| | | EX-611 | | | | | | | 50 | 25 |
| | | EX-521 | 50 | 50 | 50 | 50 | 50 | | | 25 |
| | (B1) | jER152 | 20 | | | | | | | |
| | | jER828 | | 20 | | | 10 | 20 | 20 | 20 |
| | | jER1001 | | | 20 | | 10 | | | |
| | | jER807 | | | | 20 | | | | |
| | (C) | Aromatic polyester | 20 | 20 | 20 | 20 | 20 | 20 | 20 | 20 |
| | Others | Emulsifier (nonionic surfactant) | 10 | 10 | 10 | 10 | 10 | 10 | 10 | 10 |
| | Ratios | (A) (% by mass) | 71 | 71 | 71 | 71 | 71 | 71 | 71 | 71 |
| | | (B1) (% by mass) | 29 | 29 | 29 | 29 | 29 | 29 | 29 | 29 |
| | | (A) (% by mass) | 50 | 50 | 50 | 50 | 50 | 50 | 50 | 50 |
| | | (B) (% by mass) | 50 | 50 | 50 | 50 | 50 | 50 | 50 | 50 |
| | | Epoxy equivalent (g/eq.) | 260 | 265 | 320 | 250 | 290 | 255 | 290 | 275 |
| Thermosetting resin composition | Thermosetting resin (D) | Epikote825 | 50 | 50 | 50 | 50 | 50 | 50 | 50 | 50 |
| | | ELM434 | 50 | 50 | 50 | 50 | 50 | 50 | 50 | 50 |
| | Thermoplastic resin | PES5003P | 10 | 10 | 10 | 10 | 10 | 10 | 10 | 10 |
| | Hardener (E) | 4,4'-Diaminodiphenyl sulfone | 40 | 40 | 40 | 40 | 40 | 40 | 40 | 40 |
| | Thermoplastic resin particles or fibers (F) | SP-10 Epoxy-modified nylon particles A | 18 | 18 | 18 | 18 | 18 | 18 | 18 | 18 |
| | | TR-55 short fibers | | | | | | | | |
| | Conductive particles or fibers (G) | "Micropearl" AU215 | | | | | | | | |
| | | "Micropearl" AU225 | | | | | | | | |
| | | "Bellpearl" C-2000 | 2 | 2 | 2 | 2 | 2 | 2 | 2 | 2 |
| | | "NICABEADS" ICB-2020 | | | | | | | | |
| | | Conductive particles A Surface-treated | | | | | | | | |

TABLE 1-continued

| | | | Example 1 | Example 2 | Example 3 | Example 4 | Example 5 | Example 6 | Example 7 | Example 8 |
|---|---|---|---|---|---|---|---|---|---|---|
| | Second conductive particles (I) | product B of Micropearl AU215 MLD-30 #3230B | | | | | | | | |
| | | Amount of [F] (parts by mass)/Amount of [G] (parts by mass) | 9 | 9 | 9 | 9 | 9 | 9 | 9 | 9 |
| Evaluation item | Sizing agent-coated carbon fibers | Epoxy equivalent of sizing agent (g/eq.) | 420 | 430 | 530 | 410 | 470 | 415 | 475 | 450 |
| | | X-ray photoelectron spectroscopy analysis of sizing agent surface (a)/(b) | 0.65 | 0.64 | 0.71 | 0.63 | 0.67 | 0.56 | 0.60 | 0.62 |
| | | ΔTg with a hardener | 19 | 20 | 18 | 20 | 19 | 16 | 21 | 21 |
| | | Interfacial adhesion: IFSS (MPa) | 43 | 44 | 41 | 46 | 43 | 40 | 43 | 44 |
| | Prepreg characteristics | Presence rate of particles present in 20% depth range | 99 | 97 | 96 | 98 | 99 | 99 | 98 | 96 |
| | Carbon fiber reinforced composite material | 0° Tensile test (0 days): strength translation rate (%) | 83 | 84 | 82 | 84 | 83 | 81 | 83 | 83 |
| | | 0° Tensile test (20 days): strength translation rate (%) | 78 | 79 | 80 | 76 | 78 | 80 | 79 | 78 |
| | | Compression after impact (MPa) | 330 | 337 | 325 | 361 | 330 | 319 | 329 | 339 |
| | | Volume resistivity (Ωcm) | $1.6 \times 10^3$ | $1.6 \times 10^3$ | $1.6 \times 10^3$ | $1.6 \times 10^3$ | $1.6 \times 10^3$ | $1.6 \times 10^3$ | $1.6 \times 10^3$ | $1.6 \times 10^3$ |

Examples 9 to 13

Process I

Process for Producing Carbon Fibers as Raw Material

Carbon fibers were produced in the same manner as in Example 1.

Process II

Process for Bonding Sizing Agent to Carbon Fibers

Sizing agent-coated carbon fibers were obtained in the same manner as in Example 2 except that the sizing agent had the mass ratio shown in Table 2. Subsequently, the epoxy equivalent of the sizing agent, the X-ray photoelectron spectrum of the sizing agent surface, and the interfacial shear strength (IFSS) and ΔTg of the sizing agent-coated carbon fibers were determined. All of the epoxy equivalent of the sizing agent, the chemical composition of the sizing agent surface, and ΔTg were as expected, and the IFSS measurement also revealed a sufficiently high adhesiveness. Table 2 shows the results.

Process III

Production, Molding, and Evaluation of Unidirectional Prepreg

A prepreg was produced, molded, and evaluated in the same manner as in Example 1. The result revealed a sufficiently high 0° tensile strength translation rate and a sufficiently low volume resistivity at the initial state and a small decrease in the tensile strength translation rate after 20 days. Table 2 shows the results.

Example 14

Process I

Process for Producing Carbon Fibers as Raw Material

Carbon fibers were produced in the same manner as in Example 1.

Process II

Process for Bonding Sizing Agent to Carbon Fibers

In DMF, 55 parts by mass of (A-3) as the component (A), 22.5 parts by mass of (B-2) as the component (B1), and 22.5 parts by mass of the component (C) were dissolved to yield a sizing solution. The component (C) used was a condensate of 2 mol of an adduct of bisphenol A with 2 mol of EO, 1.5 mol of maleic acid, and 0.5 mol of sebacic acid. The epoxy equivalent of the sizing agent except the solutions in the sizing solution is as shown in Table 2. In the same manner as in Example 1, the sizing agent was applied onto surface-treated carbon fibers by immersing. The coated carbon fibers were then treated with heat at a temperature of 210° C. for 75 seconds to yield sizing agent-coated carbon fiber bundles. The amount of the sizing agent adhered was adjusted so as to be 1.0 part by mass relative to 100 parts by mass of the surface-treated carbon fibers. Subsequently, the epoxy equivalent of the sizing agent, the X-ray photoelectron spectrum of the sizing agent surface, and the interfacial shear strength (IFSS) and ΔTg of the sizing agent-coated carbon fibers were determined. As shown in Table 2, the result indicated that all of the epoxy equivalent of the sizing agent, the chemical composition of the sizing agent surface, and ΔTg were as expected. The IFSS measurement also revealed a sufficiently high adhesiveness.

Process III

Production, Molding, and Evaluation of Unidirectional Prepreg

A prepreg was produced, molded, and evaluated in the same manner as in Example 1. The result revealed a sufficiently high 0° tensile strength translation rate and a sufficiently low volume resistivity at the initial state and a small decrease in the tensile strength translation rate after 20 days. Table 2 shows the results.

Example 15

Process I

Process for Producing Carbon Fibers as Raw Material

Carbon fibers were produced in the same manner as in Example 1.

Process II

Process for Bonding Sizing Agent to Carbon Fibers

In DMF, 60 parts by mass of (A-3) as the component (A) and 40 parts by mass of (B-2) as the component (B1) were dissolved to yield a sizing solution. The epoxy equivalent of the sizing agent except the solutions in the sizing solution is as shown in Table 2. In the same manner as in Example 1, the sizing agent was applied onto surface-treated carbon fibers by immersing. The coated carbon fibers were then treated with heat at a temperature of 210° C. for 75 seconds to yield sizing agent-coated carbon fiber bundles. The amount of the sizing agent adhered was adjusted so as to be 1.0 part by mass relative to 100 parts by mass of the surface-treated carbon fibers. Subsequently, the epoxy equivalent of the sizing agent, the X-ray photoelectron spectrum of the sizing agent surface, and the interfacial shear strength (IFSS) and ΔTg of the sizing agent-coated carbon fibers were determined. As shown in Table 2, the result indicated that all of the epoxy equivalent of the sizing agent, the chemical composition of the sizing agent surface, and ΔTg were as expected. The IFSS measurement also revealed a sufficiently high adhesiveness.

Process III

Production, Molding, and Evaluation of Unidirectional Prepreg

A prepreg was produced, molded, and evaluated in the same manner as in Example 1. The result revealed a high 0° tensile strength translation rate at the initial state and a small decrease in the tensile strength translation rate after 20 days. Table 2 shows the results.

TABLE 2

| | | | Example 9 | Example 10 | Example 11 | Example 12 | Example 13 | Example 14 | Example 15 |
|---|---|---|---|---|---|---|---|---|---|
| Carbon fibers | | Carbon fibers | A | A | A | A | A | A | A |
| Sizing agent | (A) | EX-810 | | | | | | | |
| | | EX-611 | | | | | | | |
| | | EX-521 | 37 | 35 | 40 | 55 | 60 | 55 | 60 |
| | (B1) | jER152 | | | | | | | |
| | | jER828 | 33 | 45 | 30 | 15 | 15 | 22.5 | 40 |
| | | jER1001 | | | | | | | |
| | | jER807 | | | | | | | |
| | (C) | Aromatic polyester | 20 | 10 | 20 | 20 | 20 | 22.5 | |
| | Others | Emulsifier (nonionic surfactant) | 10 | 10 | 10 | 10 | 5 | | |
| | Ratios | (A) (% by mass) | 53 | 44 | 57 | 79 | 80 | 71 | 60 |
| | | (B1) (% by mass) | 47 | 56 | 43 | 21 | 20 | 29 | 40 |
| | | (A) (% by mass) | 37 | 35 | 40 | 55 | 60 | 55 | 60 |
| | | (B) (% by mass) | 63 | 65 | 60 | 45 | 40 | 45 | 40 |
| | | Epoxy equivalent (g/eq.) | 265 | 230 | 265 | 260 | 245 | 240 | 185 |

TABLE 2-continued

| | | | Example 9 | Example 10 | Example 11 | Example 12 | Example 13 | Example 14 | Example 15 |
|---|---|---|---|---|---|---|---|---|---|
| Thermosetting resin composition | Thermosetting resin (D) | Epikote825 | 50 | 50 | 50 | 50 | 50 | 50 | 50 |
| | | ELM434 | 50 | 50 | 50 | 50 | 50 | 50 | 50 |
| | Thermoplastic resin | PES5003P | 10 | 10 | 10 | 10 | 10 | 10 | 10 |
| | Hardener (E) | 4,4'-Diaminodiphenyl sulfone | 40 | 40 | 40 | 40 | 40 | 40 | 40 |
| | Thermoplastic resin particles or fibers (F) | SP-10 Epoxy-modified nylon particles A | 18 | 18 | 18 | 18 | 18 | 18 | 18 |
| | | TR-55 short fibers | | | | | | | |
| | Conductive particles or fibers (G) | "Micropearl" AU215 | | | | | | | |
| | | "Micropearl" AU225 | | | | | | | |
| | | "Bellpearl" C-2000 | 2 | 2 | 2 | 2 | 2 | 2 | 2 |
| | | "NICABEADS" ICB-2020 | | | | | | | |
| | | Conductive particles A | | | | | | | |
| | | Surface-treated product B of Micropearl AU215 | | | | | | | |
| | Second conductive particles (I) | MLD-30 | | | | | | | |
| | | #3230B | | | | | | | |
| | Amount of [F] (parts by mass)/Amount of [G] (parts by mass) | | 9 | 9 | 9 | 9 | 9 | 9 | 9 |
| Evaluation item | Sizing agent-coated carbon fibers | Epoxy equivalent of sizing agent (g/eq.) | 430 | 370 | 430 | 430 | 400 | 439 | 280 |
| | | X-ray photoelectron spectroscopy analysis of sizing agent surface (a)/(b) | 0.77 | 0.79 | 0.76 | 0.66 | 0.57 | 0.70 | 0.81 |
| | | ΔTg with a hardener | 17 | 16 | 18 | 21 | 22 | 20 | 25 |
| | | Interfacial adhesion: IFSS (MPa) | 41 | 40 | 45 | 45 | 45 | 45 | 45 |
| | Prepreg characteristics | Presence rate of particles present in 20% depth range | 99 | 98 | 97 | 96 | 97 | 99 | 98 |
| | Carbon fiber reinforced composite material | 0° Tensile test (0 days): strength translation rate (%) | 82 | 80 | 84 | 84 | 85 | 84 | 84 |
| | | 0° Tensile test (20 days): strength translation rate (%) | 80 | 79 | 77 | 76 | 77 | 76 | 77 |
| | | Compression after impact (MPa) | 324 | 320 | 351 | 352 | 350 | 352 | 351 |
| | | Volume resistivity (Ωcm) | $1.6 \times 10^3$ | $1.6 \times 10^3$ | $1.6 \times 10^3$ | $1.6 \times 10^3$ | $1.7 \times 10^3$ | $1.6 \times 10^3$ | $1.5 \times 10^3$ |

Examples 16 to 23

Process I

Process for Producing Carbon Fibers as Raw Material

Carbon fibers were produced in the same manner as in Example 1.

Process II

Process for Bonding Unidirectional Sizing Agent to Carbon Fibers

Sizing agent-coated carbon fibers were obtained in the same manner as Example 2. Subsequently, the epoxy equivalent of the sizing agent, the X-ray photoelectron spectrum of the sizing agent surface, and the interfacial shear strength (IFSS) and ΔTg of the sizing agent-coated carbon fibers were determined. All of the epoxy equivalent of the sizing agent, the chemical composition of the sizing agent surface, and ΔTg were as expected, and the IFSS measurement revealed a moderate adhesiveness. Table 3 shows the results.

Process III

Production, Molding, and Evaluation of Unidirectional Prepreg

A target prepreg was produced in the same manner as Example 1 except that the components shown in Table 3 were contained in the ratios shown in Table 3 as the thermoplastic resin particles (F) and the conductive particles or fibers (G). Using the obtained prepreg, the 0° tensile strength test and 0° tensile test after long-term storage of the carbon finer reinforced composite material and the measurement of compression after impact and the volume resistivity of the carbon finer reinforced composite material were performed and measured. Table 3 shows the results. The result revealed a sufficiently high 0° tensile strength translation rate and a sufficiently low volume resistivity at the initial state and a small decrease in the tensile strength translation rate after 20 days.

TABLE 3

| | | | Example 16 | Example 17 | Example 18 | Example 19 | Example 20 | Example 21 | Example 22 | Example 23 |
|---|---|---|---|---|---|---|---|---|---|---|
| Carbon fibers | | Carbon fibers | A | A | A | A | A | A | A | A |
| Sizing agent | (A) | EX-810 | | | | | | | | |
| | | EX-611 | | | | | | | | |
| | | EX-521 | 50 | 50 | 50 | 50 | 50 | 50 | 50 | 50 |
| | (B1) | jER152 | | | | | | | | |
| | | jER828 | 20 | 20 | 20 | 20 | 20 | 20 | 20 | 20 |
| | | jER1001 | | | | | | | | |
| | | jER807 | | | | | | | | |
| | (C) | Aromatic polyester | 20 | 20 | 20 | 20 | 20 | 20 | 20 | 20 |
| | Others | Emulsifier (nonionic surfactant) | 10 | 10 | 10 | 10 | 10 | 10 | 10 | 10 |
| | Ratios | (A) (% by mass) | 71 | 71 | 11 | 71 | 71 | 71 | 71 | 71 |
| | | (B1) (% by mass) | 29 | 29 | 29 | 29 | 29 | 29 | 29 | 29 |
| | | (A) (% by mass) | 50 | 50 | 50 | 50 | 50 | 50 | 50 | 50 |
| | | (B) (% by mass) | 50 | 50 | 50 | 50 | 50 | 50 | 50 | 50 |
| | | Epoxy equivalent (g/eq.) | 265 | 265 | 265 | 265 | 265 | 265 | 265 | 265 |
| Thermosetting resin composition | Thermosetting resin (D) | EpikoteEpikote825 | 50 | 50 | 50 | 50 | 50 | 50 | 50 | 50 |
| | | ELM434 | 50 | 50 | 50 | 50 | 50 | 50 | 50 | 50 |
| | Thermoplastic resin | PES5003P | 10 | 10 | 10 | 10 | 10 | 10 | 10 | 10 |
| | Hardener (E) | 4,4'-Diamino-diphenyl sulfone | 40 | 40 | 40 | 40 | 40 | 40 | 40 | 40 |
| | Thermoplastic resin particles or fibers (F) | SP-10 | | | | | | | | |
| | | Epoxy-modified nylon particles A | 19.98 | 19.6 | 10 | 18 | 18 | 18 | 18 | 18 |
| | | TR-55 short fibers | | | | | | | | |
| | Conductive particles or fibers (G) | "Micropearl" AU215 | | | | 2 | | | | |
| | | "Micropearl" AU225 | | | | | 2 | | | |
| | | "Bellpearl" C-2000 | 0.02 | 0.4 | 10 | | | | | |
| | | "NICABEADS" ICB-2020 | | | | | | 2 | | |
| | | Conductive particles A | | | | | | | 2 | |
| | | Surface-treated product B of Micropearl AU215 | | | | | | | | 2 |
| | Second conductive particles (I) | MLD-30 #3230B | | | | | | | | |
| | | Amount of [F] (parts by mass)/Amount of [G] (parts by mass) | 999 | 49 | 1 | 9 | 9 | 9 | 9 | 9 |
| Evaluation item | Sizing agent-coated carbon fibers | Epoxy equivalent of sizing agent (g/eq.) | 430 | 430 | 430 | 430 | 430 | 430 | 430 | 430 |
| | | X-ray photoelectron spectroscopy analysis of sizing agent surface (a)/(b) | 0.64 | 0.64 | 0.64 | 0.64 | 0.64 | 0.64 | 0.64 | 0.64 |
| | | ΔTg with a hardener | 18 | 20 | 20 | 20 | 18 | 20 | 20 | 20 |
| | | Interfacial adhesion: IFSS (MPa) | 44 | 44 | 44 | 44 | 44 | 44 | 44 | 44 |
| | Prepreg characteristics | Presence rate of particles | 99 | 98 | 96 | 97 | 98 | 99 | 97 | 98 |

TABLE 3-continued

| | | Example 16 | Example 17 | Example 18 | Example 19 | Example 20 | Example 21 | Example 22 | Example 23 |
|---|---|---|---|---|---|---|---|---|---|
| Carbon fiber reinforced composite material | present in 20% depth range 0° Tensile test (0 days): strength translation rate (%) | 84 | 84 | 83 | 84 | 84 | 84 | 85 | 84 |
| | 0° Tensile test (20 days): strength translation rate (%) | 79 | 80 | 78 | 79 | 79 | 79 | 80 | 79 |
| | Compression after impact (MPa) | 341 | 338 | 320 | 337 | 338 | 335 | 335 | 341 |
| | Volume resistivity (Ωcm) | $1.6 \times 10^4$ | $3.8 \times 10^3$ | $9.2 \times 10^2$ | $1.3 \times 10^3$ | $9.5 \times 10^2$ | $1.8 \times 10^3$ | $1.3 \times 10^3$ | $1.4 \times 10^3$ |

Examples 24 to 28

Process I

Process for Producing Carbon Fibers as Raw Material

Carbon fibers were produced in the same manner as in Example 1.

Process II

Process for Bonding Sizing Agent to Carbon Fibers

Sizing agent-coated carbon fibers were obtained in the same manner as Example 2. Subsequently, the epoxy equivalent of the sizing agent, the X-ray photoelectron spectrum of the sizing agent surface, the interfacial shear strength (IFSS) of the sizing agent-coated carbon fibers, and ΔTg were determined. All of the epoxy equivalent of the sizing agent, the chemical composition of the sizing agent surface, and ΔTg were as expected, and the IFSS measurement revealed a moderate adhesiveness. Table 4 shows the results.

Process III

Production, Molding, and Evaluation of Prepreg

A target prepreg was produced in the same manner as Example 1 except that the components shown in Table 4 were contained in the ratios shown in Table 4 as the thermoplastic resin particles (F), the conductive particles or fibers (G), and the conductive particles (H) whose thermoplastic resin nucleus or core is covered with a conductive substance. Using the obtained prepreg, the 0° tensile strength test and 0° tensile test after long-term storage of the carbon finer reinforced composite material and the measurement of compression after impact and the volume resistivity of the carbon finer reinforced composite material were performed and measured. Table 4 shows the results. The result revealed a sufficiently high 0° tensile strength translation rate and a sufficiently low volume resistivity at the initial state and a small decrease in the tensile strength translation rate after 20 days.

Example 29

Process I

Process for Producing Carbon Fibers as Raw Material

Carbon fibers were produced in the same manner as in Example 1.

Process II

Process for Bonding Sizing Agent to Carbon Fibers

Sizing agent-coated carbon fibers were obtained in the same manner as Example 2. Subsequently, the epoxy equivalent of the sizing agent, the X-ray photoelectron spectrum of the sizing agent surface, and the interfacial shear strength (IFSS) and ΔTg of the sizing agent-coated carbon fibers were determined. All of the epoxy equivalent of the sizing agent, the chemical composition of the sizing agent surface, and ΔTg were as expected, and the IFSS measurement revealed a moderate adhesiveness. Table 4 shows the results.

Process III

Production, Molding, and Evaluation of Unidirectional Prepreg

In a kneader, 50 parts by mass of (D-1) and 50 parts by mass of (D-2) as the thermosetting resin components (D), 10 parts by mass of PES5003P as a thermoplastic resin, and a part by mass of (I-1) as the second conductive particles (I) component were mixed, and the whole was dissolved. Then, 40 parts by mass of 4,4'-diaminodiphenyl sulfone (E-1) as the curing agent component (E) was kneaded, producing a primary epoxy resin composition except the thermoplastic resin particles (F) and the conductive particles (G). The obtained primary resin composition was applied onto a release paper with a knife coater so as to give a resin pass per unit area of 32 g/m², thus yielding a primary resin film. The primary resin film was superimposed on each side of sizing agent-coated carbon fibers (an areal weight of 190 g/m²) arranged in one direction, and heat and pressure were applied with a heat roll at a temperature of 100° C. and a pressure of 1 atm to impregnate the sizing agent-coated carbon fibers with the thermosetting resin composition, thus yielding a primary prepreg. Next, a secondary resin composition produced by adding (F-1) as the thermoplastic resin particles (F) and (G-3) as the conductive particles (G) so that the thermoplastic resin composition of a final prepreg for a carbon fiber reinforced composite material has the amounts listed in Table 1 was applied onto a release paper with a knife coater so as to give a resin pass per unit area of 20 g/m², thus yielding a secondary resin film. The secondary resin film was superimposed on each side of the first prepreg, and heat and pressure were applied with a heat roll at a temperature of 100° C. and a pressure of 1 atm to impregnate with a thermosetting resin composition for a carbon fiber reinforced composite material, thus yielding a target prepreg. Using the obtained prepreg, the 0° tensile strength test and 0° tensile test after long-term storage of the carbon finer reinforced composite material and the measurement of compression after impact and the volume resistivity of the carbon finer reinforced composite material were performed and measured. Table 4 shows the results. The result revealed a sufficiently high 0° tensile strength translation rate and a sufficiently low volume resistivity at the initial state and a small decrease in the tensile strength translation rate after 20 days.

TABLE 4

| | | | Example 24 | Example 25 | Example 26 | Example 27 | Example 28 | Example 29 |
|---|---|---|---|---|---|---|---|---|
| Carbon fibers | | Carbon fibers | A | A | A | A | A | A |
| Sizing agent | (A) | EX-810 | | | | | | |
| | | EX-611 | | | | | | |
| | | EX-521 | 50 | 50 | 50 | 50 | 50 | 50 |
| | (B1) | jER152 | | | | | | |
| | | jER828 | 20 | 20 | 20 | 20 | 20 | 20 |
| | | jER1001 | | | | | | |
| | | jER807 | | | | | | |
| | (C) | Aromatic polyester | 20 | 20 | 20 | 20 | 20 | 20 |
| | Others | Emulsifier (nonionic surfactant) | 10 | 10 | 10 | 10 | 10 | 10 |
| | Ratios | (A) (% by mass) | 71 | 71 | 71 | 71 | 71 | 71 |
| | | (B1) (% by mass) | 29 | 29 | 29 | 29 | 29 | 29 |
| | | (A) (% by mass) | 50 | 50 | 50 | 50 | 50 | 50 |
| | | (B) (% by mass) | 50 | 50 | 50 | 50 | 50 | 50 |
| | | Epoxy equivalent (g/eq.) | 265 | 265 | 265 | 265 | 265 | 265 |
| Thermosetting resin composition | Thermosetting resin (D) | Epikote825 | 50 | 50 | 50 | 50 | 50 | 50 |
| | | ELM434 | 50 | 50 | 50 | 50 | 50 | 50 |
| | Thermoplastic resin | PES5003P | 10 | 10 | 10 | 10 | 10 | 10 |
| | Hardener (E) | 4,4'-Diaminodiphenyl sulfone | 40 | 40 | 40 | 40 | 40 | 40 |
| | Thermoplastic resin particles or fibers (F) | SP-10 | 18 | | | | 18 | 18 |
| | | Epoxy-modified nylon particles A | | | | | | |
| | | TR-55 short fibers | | | 18 | 18 | | |
| | Conductive particles or fibers (G) | "Micropearl" AU215 | | | | | | |
| | | "Micropearl" AU225 | | | | | | |
| | | "Bellpearl" C-2000 | 2 | | | 2 | | 2 |
| | | "NICABEADS" ICB-2020 | | | | | | |
| | | Conductive particles A | | 20 | | | | |
| | | Surface-treated product B of Micropearl AU215 | | | | | | |
| | | MLD-30 | | | 2 | | 2 | |
| | Second conductive particles (I) | #3230B | | | | | | 1 |
| | | Amount of [F] (parts by mass)/Amount of [G] (parts by mass) | 9 | — | 9 | 9 | 9 | 9 |
| Evaluation item | Sizing agent-coated carbon fibers | Epoxy equivalent of sizing agent (g/eq.) | 430 | 430 | 430 | 430 | 430 | 430 |
| | | X-ray photoelectron spectroscopy analysis of sizing agent surface (a)/(b) | 0.64 | 0.64 | 0.64 | 0.64 | 0.64 | 0.64 |
| | | ΔTg with a hardener | 18 | 20 | 20 | 20 | 20 | 20 |
| | | Interfacial adhesion: IFSS (MPa) | 44 | 44 | 44 | 44 | 44 | 44 |

TABLE 4-continued

| | | Example 24 | Example 25 | Example 26 | Example 27 | Example 28 | Example 29 |
|---|---|---|---|---|---|---|---|
| Prepreg characteristics | Presence rate of particles present in 20% depth range | 99 | 98 | 97 | 96 | 97 | 98 |
| Carbon fiber reinforced composite material | 0° Tensile test (0 days): strength translation rate (%) | 84 | 83 | 84 | 84 | 84 | 83 |
| | 0° Tensile test (20 days): strength translation rate (%) | 79 | 78 | 79 | 79 | 79 | 79 |
| | Compression after impact (MPa) | 340 | 325 | 315 | 320 | 322 | 324 |
| | Volume resistivity (Ωcm) | $1.8 \times 10^3$ | $9.0 \times 10^2$ | $5.2 \times 10^3$ | $3.2 \times 10^3$ | $4.9 \times 10^3$ | $4.1 \times 10^1$ |

Comparative Examples 1 to 3

Process I

Process for Producing Carbon Fibers as Raw Material

Carbon fibers were produced in the same manner as in Example 1.

Process II

Process for Bonding Sizing Agent to Carbon Fibers

Sizing agent-coated carbon fibers were obtained in the same manner as in Example 2 except that the sizing agent had the mass ratio shown in Table 5. Subsequently, the epoxy equivalent of the sizing agent, the X-ray photoelectron spectrum of the sizing agent surface, and the interfacial shear strength (IFSS) and ΔTg of the sizing agent-coated carbon fibers were determined. In the $C_{1s}$ core spectrum of the surface of the sizing agent analyzed by X-ray photoelectron spectroscopy at a photoelectron takeoff angle of 15°, the (a)/(b) ratio was larger than 0.90 where (a) is the height (cps) of a component at a binding energy (284.6 eV) assigned to CHx, C—C, and C=C and (b) is the height (cps) of a component at a binding energy (286.1 eV) assigned to C—O, and the ratio was out of the range in the present invention. The IFSS measurement revealed a low adhesiveness.

Process III

Production, Molding, and Evaluation of Unidirectional Prepreg

A prepreg was produced, molded, and evaluated in the same manner as in Example 1. The result revealed a low volume resistivity and a small decreasing rate of the tensile strength after 20 days but a low 0° tensile strength translation rate at the initial state and a low compression after impact.

Comparative Example 4

Process I

Process for Producing Carbon Fibers as Raw Material

Carbon fibers were produced in the same manner as in Example 1.

Process II

Process for Bonding Sizing Agent to Carbon Fibers

Sizing agent-coated carbon fibers were obtained in the same manner as in Example 2 except that the sizing agent had the mass ratio shown in Table 5. Subsequently, the epoxy equivalent of the sizing agent, the X-ray photoelectron spectrum of the sizing agent surface, and the interfacial shear strength (IFSS) and ΔTg of the sizing agent-coated carbon fibers were determined. In the $C_{1s}$ core spectrum of the surface of the sizing agent analyzed by X-ray photoelectron spectroscopy at a photoelectron takeoff angle of 15°, the (a)/(b) ratio was less than 0.50 where (a) is the height (cps) of a component at a binding energy (284.6 eV) assigned to CHx, C—C, and C=C and (b) is the height (cps) of a component at a binding energy (286.1 eV) assigned to C—O, and the ratio was out of the range in the present invention. The IFSS measurement revealed a sufficiently high adhesiveness.

Process III

Production, Molding, and Evaluation of Unidirectional Prepreg

A prepreg was produced, molded, and evaluated in the same manner as in Example 1. The result revealed a high 0° tensile strength translation rate at the initial state and a high compression after impact but a large decreasing rate of the 0° tensile strength after 20 days.

Comparative Examples 5 and 6

Process I

Process for Producing Carbon Fibers as Raw Material

Carbon fibers were produced in the same manner as in Example 1.

Process II

Process for Bonding Sizing Agent to Carbon Fibers

Sizing agent-coated carbon fibers were obtained in the same manner as in Example 1 except that no aromatic epoxy compound (B1) was used but an aliphatic epoxy compound (A) alone was used as the epoxy compound in the sizing agent. Subsequently, the epoxy equivalent of the sizing agent, the X-ray photoelectron spectrum of the sizing agent surface, and the interfacial shear strength (IFSS) and ΔTg of the sizing agent-coated carbon fibers were determined. In the $C_{1s}$ core spectrum of the surface of the sizing agent analyzed by X-ray photoelectron spectroscopy at a photoelectron takeoff angle of 15°, the (a)/(b) ratio was less than 0.50 where (a) is the height (cps) of a component at a binding energy (284.6 eV) assigned to CHx, C—C, and C=C and (b) is the height (cps) of a component at a binding energy (286.1 eV) assigned to C—O, and the ratio was out of the range in the present invention. The IFSS measurement revealed a sufficiently high adhesiveness.

Process III

Production, Molding, and Evaluation of Unidirectional Prepreg

A prepreg was produced, molded, and evaluated in the same manner as in Example 1. The result revealed a high 0° tensile strength translation rate at the initial state and a high compression after impact but a large decreasing rate of the 0° tensile strength after 20 days.

Comparative Example 7

Process I

Process for Producing Carbon Fibers as Raw Material

Carbon fibers were produced in the same manner as in Example 1.

Process II

Process for Bonding Sizing Agent to Carbon Fibers

Sizing agent-coated carbon fibers were obtained in the same manner as in Example 2 except that no aliphatic epoxy compound (A) was used but an aromatic epoxy compound (B1) alone was used as the epoxy compound in the sizing agent. Subsequently, the epoxy equivalent of the sizing agent, the X-ray photoelectron spectrum of the sizing agent surface, and the interfacial shear strength (IFSS) and ΔTg of the sizing agent-coated carbon fibers were determined. In the $C_{1s}$ core spectrum of the surface of the sizing agent analyzed by X-ray photoelectron spectroscopy at a photoelectron takeoff angle of 15°, the (a)/(b) ratio was larger than 0.90 where (a) is the height (cps) of a component at a binding energy (284.6 eV) assigned to CHx, C—C, and C=C and (b) is the height (cps) of a component at a binding energy (286.1 eV) assigned to C—O, and the ratio was out of the range in the present invention. The IFSS measurement revealed a low adhesiveness.

Process III

Production, Molding, and Evaluation of Unidirectional Prepreg

A prepreg was produced, molded, and evaluated in the same manner as in Example 1. The result revealed a low volume resistivity and a small decreasing rate of the tensile strength after 20 days but an insufficient tensile strength translation rate at the initial state and an insufficient compression after impact.

Comparative Example 8

Process I

Process for Producing Carbon Fibers as Raw Material

Carbon fibers were produced in the same manner as in Example 1.

Process II

Process for Bonding Sizing Agent to Carbon Fibers

Sizing agent-coated carbon fibers were obtained in the same manner as Example 2. Subsequently, the epoxy equivalent of the sizing agent, the X-ray photoelectron spectrum of the sizing agent surface, and the interfacial shear strength (IFSS) and ΔTg of the sizing agent-coated carbon fibers were determined. All of the epoxy equivalent of the sizing agent, the chemical composition of the sizing agent surface, and ΔTg were as expected, and the IFSS measurement revealed a moderate adhesiveness. Table 5 shows the results.

Process III

Production, Molding, and Evaluation of Unidirectional Prepreg

A prepreg was produced, molded, and evaluated in the same manner as the Example 1 except that the conductive particles or fibers (G) were not contained and the amount of the thermoplastic resin particles (F) was as shown in Table 5 as the thermosetting resin composition. The result revealed a high 0° tensile strength translation rate at the initial state, a high post-impact compressive strength, and a small decreasing rate of the tensile strength after 20 days but an extremely high volume resistivity.

Comparative Example 9

Process I

Process for Producing Carbon Fibers as Raw Material

Carbon fibers were produced in the same manner as in Example 1.

Process II

Process for Bonding Sizing Agent to Carbon Fibers

Sizing agent-coated carbon fibers were obtained in the same manner as Example 2. Subsequently, the epoxy equivalent of the sizing agent, the X-ray photoelectron spectrum of the sizing agent surface, and the interfacial shear strength (IFSS) and ΔTg of the sizing agent-coated carbon fibers were determined. All of the epoxy equivalent of the sizing agent, the chemical composition of the sizing agent surface, and ΔTg were as expected, and the IFSS measurement revealed a moderate adhesiveness. Table 5 shows the results.

Process III

Production, Molding, and Evaluation of Unidirectional Prepreg

A prepreg was produced, molded, and evaluated in the same manner as the Example 1 except that the thermoplastic resin particles or fibers (F) were not contained and the amount of the conductive particle or fibers (G) was as shown in Table 5 as the thermosetting resin composition. The result revealed a low volume resistivity, a high 0° tensile strength translation rate at the initial state, and a small decrease in the tensile strength translation rate after 20 days but a small post-impact compressive strength.

Comparative Examples 10 and 11

Process I

Process for Producing Carbon Fibers as Raw Material

Carbon fibers were produced in the same manner as in Example 1.

Process II

Process for Bonding Sizing Agent to Carbon Fibers

Sizing agent-coated carbon fibers were obtained in the same manner as Example 2. Subsequently, the epoxy equivalent of the sizing agent, the X-ray photoelectron spectrum of the sizing agent surface, and the interfacial shear strength (IFSS) and ΔTg of the sizing agent-coated carbon fibers were determined. All of the epoxy equivalent of the sizing agent, the chemical composition of the sizing agent surface, and ΔTg were as expected, and the IFSS measurement revealed a moderate adhesiveness. Table 5 shows the results.

Process III

Production, Molding, and Evaluation of Unidirectional Prepreg

A prepreg was produced, molded, and evaluated in the same manner as the Example 1 except that the thermoplastic resin particles (F) and the conductive particle (G) shown in Table 5 were contained in the mass ratio as shown in Table 5 as the thermosetting resin composition. The result of Comparative Example 10 revealed a high 0° tensile strength translation rate at the initial state, a high post-impact compressive strength, and a small decrease in the tensile strength translation rate after 20 days but an extremely high volume resistivity. The result of Comparative Example 11 revealed a low volume resistivity, a high 0° tensile strength translation rate at the initial state, and a small decrease in the tensile strength translation rate after 20 days but a small post-impact compressive strength.

TABLE 5

| | | | Comparative Example 1 | Comparative Example 2 | Comparative Example 3 | Comparative Example 4 | Comparative Example 5 | Comparative Example 6 | Comparative Example 7 | Comparative Example 8 | Comparative Example 9 | Comparative Example 10 | Comparative Example 11 |
|---|---|---|---|---|---|---|---|---|---|---|---|---|---|
| Carbon fibers | | Carbon fibers | A | A | A | A | A | A | A | A | A | A | A |
| Sizing agent | (A) | EX-810 | 20 | 30 | 50 | 70 | | | | | | | |
| | | EX-611 | | | | | 50 | | | | | | |
| | | EX-521 | | | | | | 50 | | 50 | 50 | 50 | 50 |
| | (B1) | jER152 | 35 | 60 | 50 | 12 | | | 45 | 20 | 20 | 20 | 20 |
| | | jER828 | | | | | | | | | | | |
| | | jER1001 | | | | | | | | | | | |
| | | jER807 | | | | | | | | | | | |
| | (C) | Aromatic polyester | 35 | 5 | | 12 | | | 45 | 20 | 20 | 20 | 20 |
| | | Emulsifier (nonionic surfactant) | 10 | 5 | | 6 | | | 10 | 10 | 10 | 10 | 10 |
| | Ratios | (A) (% by mass) | 36 | 33 | 50 | 85 | 100 | 100 | 0 | 71 | 71 | 71 | 71 |
| | | (B1) (% by mass) | 64 | 67 | 50 | 15 | 0 | 0 | 100 | 29 | 29 | 29 | 29 |
| | | (A) (% by mass) | 20 | 30 | 50 | 70 | 100 | 100 | 0 | 50 | 50 | 50 | 50 |
| | | (B) (% by mass) | 80 | 70 | 50 | 30 | 0 | 0 | 100 | 50 | 50 | 50 | 50 |
| | | Epoxy equivalent (g/eq.) | 270 | 210 | 230 | 224 | 180 | 180 | 420 | 265 | 265 | 265 | 265 |
| Thermosetting resin composition | Thermosetting resin (D) | Epikote825 | 50 | 50 | 50 | 50 | 50 | 50 | 50 | 50 | 50 | 50 | 50 |
| | | ELM434 | | | | | | | | | | | |
| | Thermoplastic resin | PES5003P | 10 | 10 | 10 | 10 | 10 | 10 | 10 | 10 | 10 | 10 | 10 |
| | Hardener (E) | 4,4′-Diaminodiphenyl sulfone | 40 | 40 | 40 | 40 | 40 | 40 | 40 | 40 | 40 | 40 | 40 |
| | Thermoplastic resin particles or fibers (F) | Epoxy-modified nylon particles A | 18 | 18 | 18 | 18 | 18 | 18 | 18 | | | | |
| | | SP-10 | | | | | | | | 20 | | 19.99 | |
| | | TR-55 short fibers | | | | | | | | | | | |
| | Conductive particles or | "Micropearl" AD215 | | | | | | | | | | | 8 |
| | | "Micropearl" A0225 | | | | | | | | | | | |

TABLE 5-continued

| | | Comparative Example 1 | Comparative Example 2 | Comparative Example 3 | Comparative Example 4 | Comparative Example 5 | Comparative Example 6 | Comparative Example 7 | Comparative Example 8 | Comparative Example 9 | Comparative Example 10 | Comparative Example 11 |
|---|---|---|---|---|---|---|---|---|---|---|---|---|
| | fibers (G) "Bellpearl" C-2000 "NICABEADS" ICB-2020 Conductive particles A Surface-treated product B of Micropearl AU215 MLD-30 | 2 | 2 | 2 | 2 | 2 | 2 | 2 | | | | 12 |
| | Second conductive particles (I) #3230B | | | | | | | | | | | |
| | Amount of [F] (parts by mass)/Amount of [G] (parts by mass) | 9 | 9 | 9 | 9 | 9 | 9 | 9 | | 20 | 1999 | 0.7 |
| Evaluation item | Sizing agent-coated carbon fibers | Epoxy equivalent of sizing agent (g/eq.) | 430 | 320 | 370 | 350 | 270 | 260 | 900 | 430 | 430 | 430 | 430 |
| | | X-ray photoelectron spectroscopy analysis of sizing agent surface (a)/(b) | 0.91 | 0.93 | 0.91 | 0.49 | 0.29 | 0.26 | 1.01 | 0.64 | 0.64 | 0.64 | 0.64 |
| | | ΔTg with a hardener | 15 | 17 | 18 | 26 | 32 | 26 | 10 | 18 | 20 | 20 | 20 |
| | | Interfacial adhesion: IFSS (MPa) | 34 | 34 | 36 | 45 | 46 | 41 | 25 | 44 | 44 | 44 | 44 |
| | Prepreg characteristics | Presence rate of particles present in 20% depth range | 99 | 98 | 97 | 96 | 97 | 99 | 98 | 97 | 98 | 99 | 97 |
| | Carbon fiber reinforced composite material | 0° Tensile test (0 days): strength translation rate (%) | 74 | 74 | 75 | 84 | 83 | 84 | 67 | 84 | 83 | 84 | 83 |
| | | 0° Tensile test (20 days): strength translation rate (%) | 72 | 72 | 73 | 69 | 66 | 70 | 66 | 79 | 79 | 79 | 78 |
| | | Compression after impact (MPa) | 279 | 281 | 284 | 360 | 365 | 339 | 268 | 341 | 261 | 341 | 255 |
| | | Volume resistivity (Ωcm) | $1.6 \times 10^3$ | $1.6 \times 10^3$ | $1.6 \times 10^3$ | $1.6 \times 10^3$ | $1.5 \times 10^3$ | $1.6 \times 10^3$ | $1.6 \times 10^3$ | $1.3 \times 10^6$ | $9.4 \times 10^2$ | $4.1 \times 10^5$ | $9.3 \times 10^2$ |

Example 30

In 50 ml of acetone, 2 g of the sizing agent-coated carbon fibers obtained in Example 1 were collected, and immersed and subjected to ultrasonic cleaning for 30 minutes three times. Next, the carbon fibers were immersed in 50 ml of methanol, then subjected to ultrasonic cleaning for 30 minutes once, and dried. The adhesion amount of sizing agent remaining after the cleaning were determined. The results are as shown in Table 6.

Subsequently, the surface of the sizing agent on the sizing agent-coated carbon fibers before cleaning and the surface of the sizing agent on the sizing agent-coated carbon fibers obtained after the cleaning were analyzed by X-ray photoelectron spectroscopy at 400 eV. The height (b) of the peak at a binding energy of 286.1 eV assigned to a C—O component and the height (a) (cps) of the component at a binding energy of 284.6 eV assigned to CHx, C—C, and C=C were determined. The ratio (I) of (a)/(b) of the surface of the sizing agent on the sizing agent-coated carbon fibers before cleaning and the ratio (II) of (a)/(b) of the surface of the sizing agent on the sizing agent-coated carbon fibers after cleaning were calculated. (I) and (II)/(I) are as shown in Table 6.

Examples 31 to 34

In the same manner as in Example 30, the sizing agent-coated carbon fibers obtained in Example 2, Example 6, Example 10, and Example 13 were used, and X-ray photoelectron spectroscopic analysis was carried out by using an X ray at 400 eV before and after the cleaning. The (a)/(b) ratio was calculated where (a) is the height (cps) of a component at a binding energy (284.6 eV) assigned to CHx, C—C, and C=C and (b) is the height (cps) of a component at a binding energy (286.1 eV) assigned to C—O in the $C_{1s}$ core spectrum. Table 6 shows the results.

Comparative Example 12

In the same manner as in Example 30, the sizing agent-coated carbon fibers obtained in Comparative Example 5 were used, and X-ray photoelectron spectroscopic analysis was carried out by using an X ray at 400 eV before and after the cleaning. The (a)/(b) ratio was calculated where (a) is the height (cps) of a component at a binding energy (284.6 eV) assigned to CHx, C—C, and C=C and (b) is the height (cps) of a component at a binding energy (286.1 eV) assigned to C—O in the $C_{1s}$ core spectrum. Table 6 shows the results, which indicates a large (II/I) ratio. This revealed that no inclined structure was achieved in the sizing agent.

Comparative Example 13

In the same manner as in Example 30, the sizing agent-coated carbon fibers obtained in Comparative Example 7 were used, and X-ray photoelectron spectroscopic analysis was carried out by using an X ray at 400 eV before and after the cleaning. The (a)/(b) ratio was calculated where (a) is the height (cps) of a component at a binding energy (284.6 eV) assigned to CHx, C—C, and C=C and (b) is the height (cps) of a component at a binding energy (286.1 eV) assigned to C—O in the $C_{1s}$ core spectrum. Table 6 shows the results, which indicates a large (II/I) ratio. This revealed that no inclined structure was achieved in the sizing agent.

TABLE 6

|  |  | Example 30 | Example 31 | Example 32 | Example 33 | Example 34 | Comparative Example 12 | Comparative Example 13 |
|---|---|---|---|---|---|---|---|---|
| Sizing agent-coated carbon fibers | | Example 1 | Example 2 | Example 6 | Example 10 | Example 13 | Comparative Example 5 | Comparative Example 7 |
| | Adhesion amount of sizing agent after cleaning of sizing agent | 0.18 | 0.18 | 0.18 | 0.18 | 0.18 | 0.18 | 0.12 |
| XPS (400 eV) | (I) | 0.67 | 0.67 | 0.57 | 0.8 | 0.58 | 0.29 | 1.01 |
| | (II)/(I) | 0.7 | 0.7 | 0.8 | 0.74 | 0.74 | 1 | 1 |

INDUSTRIAL APPLICABILITY

The prepreg of the present invention has excellent adhesiveness between the carbon fibers and the matrix resin, impact resistance, volume resistivity and also has high long-term storage stability and thus are suitably used in various fields including aircraft members, spacecraft members, automobile members, ship members, constructional materials, and sporting goods.

REFERENCE SIGNS LIST

1 Carbon fibers
2 Thermosetting resin
3 Thermoplastic resin particles
4 Conductive particles
41 Second conductive particles
10 Carbon fiber layer
50 Interlayer formative layer
100, 200 Prepreg
300 Prepreg cured product

The invention claimed is:
1. A prepreg formed by impregnating sizing agent-coated carbon fibers coated with a sizing agent with a thermosetting resin composition, wherein
the sizing agent contains an aliphatic epoxy compound (A) and an aromatic compound (B) at least containing an aromatic epoxy compound (B1),
the sizing agent-coated carbon fibers have an (a)/(b) ratio of 0.50 to 0.90 where (a) is a height (cps) of a component at a binding energy (284.6 eV) assigned to CHx, C—C, and C=C and (b) is a height (cps) of a component at a binding energy (286.1 eV) assigned to C—O in a $C_{1s}$ core spectrum of a surface of the sizing agent applied onto the carbon fibers analyzed by X-ray photoelectron spectroscopy using Al $K_{\alpha 1,2}$ as an X-ray source at a photoelectron takeoff angle of 15°,
the thermosetting resin composition contains a thermosetting resin (D), a latent curing agent (E), and at least one of the following [1] and [2]:

[1] thermoplastic resin particles or fibers (F) and conductive particles or fibers (G); and

[2] conductive particles or fibers (H) whose thermoplastic resin nucleus or core is covered with a conductive substance, when containing [1], the thermosetting resin composition contains the thermoplastic resin particles or fibers (F) and the conductive particles or fibers (G) in a mass ratio of 1:1 to 1,000, and the prepreg includes an interlayer formative layer containing (F) and (G) and/or (H) on a surface of a layer formed of the carbon fibers, wherein the aliphatic epoxy compound (A) is a polyether polyepoxy compound having two or more epoxy groups in a molecule and/or a polyol polyepoxy compound having two or more epoxy groups in a molecule, and wherein the aliphatic epoxy compound (A) is a glycidyl ether epoxy compound obtained by a reaction of epichlorohydrin with one or more compounds selected from the group consisting of ethylene glycol, diethylene glycol, triethylene glycol, tetraethylene glycol, polyethylene glycol, propylene glycol, dipropylene glycol, tripropylene glycol, tetrapropylene glycol, polypropylene glycol, trimethylene glycol, 1,2-butanediol, 1,3-butanediol, 1,4-butanediol, 2,3-butanediol, polybutylene glycol, 1,5-pentanediol, neopentyl glycol, 1,6-hexanediol, 1,4-cyclohexanedimethanol, glycerol, diglycerol, polyglycerol, trimethylolpropane, pentaerythritol, sorbitol, and arabitol.

2. The prepreg according to claim 1, wherein
the thermosetting resin composition contains [1] and,
the prepreg includes an interlayer formative layer containing (F) and (G) on the surface of the layer formed of the carbon fibers.

3. The prepreg according to claim 2, wherein an average diameter of a particle diameter or a fiber diameter of the conductive particles or fibers (G) is equal to or larger than a particle diameter or a fiber diameter of the thermoplastic resin particles or fibers (F) and is 150 µm or less.

4. The prepreg according to claim 2, wherein the conductive particles or fibers (G) are at least one selected from the group consisting of: carbon particles; particles whose inorganic material nucleus is covered with a conductive substance; particles whose organic material nucleus is covered with a conductive substance; carbon fibers; fibers whose inorganic material core is covered with a conductive substance; and fibers whose organic material core is covered with a conductive substance.

5. The prepreg according to claim 1, wherein
the thermosetting resin composition contains [2], and
the prepreg includes an interlayer formative layer containing (H) on the surface of the layer formed of the carbon fibers.

6. The prepreg according to claim 1, wherein
an average diameter of the thermoplastic resin particles or fibers (F), the conductive particles or fibers (G), and the conductive particles or fibers (H) whose thermoplastic resin nucleus or core is covered with a conductive substance is 5 to 150 µm, and
the thermosetting resin composition contains second conductive particles (I) having an average diameter of 1 µm or less.

7. The prepreg according to claim 6, wherein 90 to 100% by mass of the second conductive particles (I) are localized inside carbon fibers positioned closest to both sides in the thickness direction of the prepreg.

8. The prepreg according to claim 1, wherein 90 to 100% by mass of the thermoplastic resin particles or fibers (F), the conductive particles or fibers (G), and the conductive particles or fibers (H) whose thermoplastic resin nucleus or core is covered with a conductive substance are localized within a depth range of 20% from both sides in a thickness direction of the prepreg.

9. The prepreg according to claim 1, wherein the total mass of the thermoplastic resin particles or fibers (F), the conductive particles or fibers (G), and the conductive particles or fibers (H) whose thermoplastic resin nucleus or core is covered with a conductive substance is 1 to 20% by mass relative to the prepreg.

10. The prepreg according to claim 1, wherein the latent curing agent (E) is an aromatic amine curing agent (E1), and the aromatic amine curing agent (E1) contains a diphenyl sulfone skeleton.

11. The prepreg according to claim 10, wherein the sizing agent and the aromatic amine curing agent (E1) are used in a combination to give an increase in glass transition point of 25° C. or less after the sizing agent and the aromatic amine curing agent (E1) are mixed in an amine equivalent/epoxy equivalent ratio of 0.9 and then are stored in an atmosphere at 25° C. and 60% RH for 20 days.

12. The prepreg according to claim 1, wherein the epoxy equivalent of the applied sizing agent is 350 to 550 g/eq.

13. The prepreg according to claim 1, wherein the sizing agent at least contains the aliphatic epoxy compound (A) in an amount of 35 to 65% by mass and the aromatic compound (B) in an amount of 35 to 60% by mass relative to a total amount of the sizing agent except a solvent.

14. The prepreg according to claim 1, wherein a mass ratio of the aliphatic epoxy compound (A) and the aromatic epoxy compound (B1) is 52/48 to 80/20.

15. The prepreg according to claim 1, wherein the aromatic epoxy compound (B1) is a bisphenol A epoxy compound or a bisphenol F epoxy compound.

16. The prepreg according to claim 1, wherein the sizing agent contains an ester compound (C) having no epoxy group in a molecule in an amount of 2 to 35% by mass relative to the total amount of the sizing agent except the solvent.

17. The prepreg according to claim 1, wherein relation (III) is satisfied with (I) and (II) obtained from (a) and (b):

$$0.50 \leq (I) \leq 0.90 \text{ and } 0.60 < (II)/(I) < 1.0 \qquad (III)$$

where (I) is a value of (a)/(b) of surfaces of the sizing agent-coated carbon fibers before ultrasonication, (II) is the value of (a)/(b) of the surfaces of the sizing agent-coated carbon fibers in which an adhesiveness amount of the sizing agent is reduced to 0.09 to 0.20% by mass by ultrasonication on the sizing agent-coated carbon fibers in an acetone solvent, and in a $C_{1s}$ core spectrum of the sizing agent-coated carbon fibers analyzed by X-ray photoelectron spectroscopy using an X-ray at 400 eV at a photoelectron takeoff angle of 55°, (a) is the height (cps) of a component at a binding energy (284.6 eV) assigned to CHx, C—C, and C=C, and (b) is the height (cps) of a component at a binding energy (286.1 eV) assigned to C—O.

18. A carbon fiber reinforced composite material formed by molding the prepreg according to claim 1.

* * * * *